(12) United States Patent
Mimura et al.

(10) Patent No.: US 11,565,713 B2
(45) Date of Patent: Jan. 31, 2023

(54) VEHICLE CONTROL SYSTEM, VEHICLE CONTROL METHOD, AND VEHICLE CONTROL PROGRAM

(71) Applicant: HONDA MOTOR CO., LTD., Tokyo (JP)

(72) Inventors: Yoshitaka Mimura, Wako (JP); Tatsuya Iwasa, Wako (JP); Fue Kubota, Wako (JP); Naohiro Sakamoto, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 159 days.

(21) Appl. No.: 16/611,233

(22) PCT Filed: Jun. 2, 2017

(86) PCT No.: PCT/JP2017/020655
§ 371 (c)(1),
(2) Date: Nov. 6, 2019

(87) PCT Pub. No.: WO2018/220834
PCT Pub. Date: Dec. 6, 2018

(65) Prior Publication Data
US 2020/0156662 A1 May 21, 2020

(51) Int. Cl.
*B60W 50/16* (2020.01)
*B60K 35/00* (2006.01)
(Continued)

(52) U.S. Cl.
CPC ............ *B60W 50/16* (2013.01); *B60K 35/00* (2013.01); *B60W 30/0956* (2013.01); *B60W 2050/146* (2013.01)

(58) Field of Classification Search
CPC ............. B60W 50/16; B60W 30/0956; B60W 2050/146; B60K 35/00; B60K 2370/191; B60K 2370/175; G08G 1/16
See application file for complete search history.

(56) References Cited

U.S. PATENT DOCUMENTS

| 5,694,116 A | 12/1997 | Kojima | |
| 6,621,471 B1 * | 9/2003 | Ozaki | B60K 35/00 345/4 |

(Continued)

FOREIGN PATENT DOCUMENTS

| CN | 102596627 A * | 7/2012 | ............... G01D 7/02 |
| CN | 105452044 | 3/2016 | |

(Continued)

OTHER PUBLICATIONS

CN-102596627-A translation (Year: 2012).*

(Continued)

*Primary Examiner* — Jeff A Burke
*Assistant Examiner* — Kyle T Johnson
(74) *Attorney, Agent, or Firm* — Amin, Turocy & Watson, LLP

(57) ABSTRACT

There are provided an outputter provided in a vehicle and configured to output information, a controller configured to execute driving support for the vehicle, and an output controller configured to provide a notification for requesting an occupant of the vehicle to perform a predetermined action when the driving support is being executed by the controller, cause a form of the notification to be changed so that the notification is emphasized in accordance with a passage of time from a start of the notification, and cause the outputter to output the notification.

16 Claims, 35 Drawing Sheets

(51) Int. Cl.
  *B60W 30/095* (2012.01)
  *B60W 50/14* (2020.01)

(56) References Cited

U.S. PATENT DOCUMENTS

| | | | | |
|---|---|---|---|---|
| 7,639,148 | B2* | 12/2009 | Victor | B60K 31/04 |
| | | | | 340/576 |
| 8,433,470 | B1* | 4/2013 | Szybalski | B60W 50/14 |
| | | | | 701/23 |
| 8,781,170 | B2* | 7/2014 | Mathieu | G01C 21/365 |
| | | | | 382/104 |
| 9,421,908 | B2* | 8/2016 | McQueen | B60N 2/986 |
| 9,493,116 | B2* | 11/2016 | Kiefer | B60N 2/986 |
| 9,527,441 | B2* | 12/2016 | Matsumura | B60W 10/04 |
| 9,827,904 | B2* | 11/2017 | Modarres | B60W 50/16 |
| 10,895,875 | B2* | 1/2021 | Hashimoto | B60K 28/02 |
| 10,935,974 | B1* | 3/2021 | Fields | G05D 1/0088 |
| 11,059,481 | B2* | 7/2021 | Kokaki | B60W 60/0015 |
| 11,061,399 | B2* | 7/2021 | Bhalla | B60W 50/16 |
| 2016/0191859 | A1* | 6/2016 | Lisseman | B60K 35/00 |
| | | | | 348/148 |
| 2016/0224227 | A1* | 8/2016 | Brush | B60K 35/00 |
| 2016/0347324 | A1* | 12/2016 | Yoshitomi | B60W 40/06 |
| 2017/0282717 | A1* | 10/2017 | Jang | G06F 3/04817 |
| 2018/0017969 | A1* | 1/2018 | Nagy | B60W 50/082 |
| 2018/0093676 | A1* | 4/2018 | Emura | G06F 3/048 |
| 2018/0319281 | A1* | 11/2018 | Nishizaki | B60K 35/00 |
| 2018/0329414 | A1* | 11/2018 | Igarashi | B60W 40/08 |
| 2019/0329791 | A1* | 10/2019 | Oba | B60W 50/14 |
| 2020/0282984 | A1* | 9/2020 | Mizoguchi | G05D 1/0061 |
| 2021/0209922 | A1* | 7/2021 | Yang | G05D 1/0061 |
| 2022/0242442 | A1* | 8/2022 | McNeely | G06K 9/6278 |

FOREIGN PATENT DOCUMENTS

| | | | |
|---|---|---|---|
| CN | 105564441 | 5/2016 | |
| DE | 102011085656 A1 * | 5/2013 | ............ B60W 50/16 |
| FR | 3060500 B1 * | 10/2019 | ............ B60W 50/14 |
| JP | 05-008656 | 1/1993 | |
| JP | 39-132052 | 5/1997 | |
| JP | 2008-123112 | 5/2008 | |
| JP | 2008-185401 | 8/2008 | |
| JP | 2010-186227 | 8/2010 | |
| JP | 2010-247656 | 11/2010 | |
| JP | 2015-221642 | 12/2015 | |
| JP | 2016-038768 | 3/2016 | |
| JP | 2016-196285 | 11/2016 | |
| JP | 2017-001563 | 1/2017 | |
| JP | 2017-007478 | 1/2017 | |
| WO | WO-2016013153 A1 * | 1/2016 | ............... G08G 1/16 |
| WO | 2016/096701 | 6/2016 | |
| WO | 2016/184725 | 11/2016 | |

OTHER PUBLICATIONS

What Happens If You Don't Touch the Wheel With Tesla AutoPilot AutoSteer??? I Find Out . . . (Year: 2017).*
This is what happens when you ignore Tesla Autopilot warnings (Year: 2016).*
FR-3060500-B1 translation (Year: 2019).*
International Search Report and Written Opinion for International Application Serial No. PCT/JP2017/020655 dated Aug. 22, 2017, 8 pages.
Chinese Office Action for Chinese Patent Application No. 201780090201.7 dated May 7, 2022.

* cited by examiner

VEHICLE CONTROL SYSTEM, VEHICLE CONTROL METHOD, AND VEHICLE CONTROL PROGRAM

TECHNICAL FIELD

The present invention relates to a vehicle control system, a vehicle control method, and a vehicle control program.

BACKGROUND ART

Conventionally, there is provided a vehicle control device in which switching from automated travel of a vehicle to manual travel is enabled by a driver, including: a driver state detector configured to detect a driver state of the driver of the vehicle; a calculator configured to calculate a degree of manual driving adaptation (a degree of wakefulness) of the driver during the automated travel of the vehicle on the basis of the driver state detected by the driver state detector; and a notifier configured to provide an automated travel end notification to the driver before the vehicle arrives at an automated travel ending point set in advance, wherein the notifier provides the automated travel end notification at an earlier timing when the degree of manual driving adaptation becomes lower (for example, see Patent Document 1).

CITATION LIST

Patent Literature

[Patent Document 1]
Japanese Unexamined Patent Application, First Publication No. 2016-38768

SUMMARY OF INVENTION

Technical Problem

However, a notification of switching from automated travel to manual travel may not be appropriate in a device of the conventional technology.

The present invention has been made in view of such circumstances and an objective of the present invention is to provide a vehicle control system, a vehicle control method, and a vehicle control program capable of providing a notification of switching from automated driving to manual driving more appropriately.

Solution to Problem (1) There is provided a vehicle control system including: an outputter configured to output information; a controller configured to execute driving support for a vehicle; and an output controller configured to provide a notification for requesting an occupant of the vehicle to perform a predetermined action when the driving support is being executed by the controller, cause a form of the notification to be changed so that the notification is emphasized in accordance with a passage of time from a start of the notification, and cause the outputter to output the notification.

(2) In the vehicle control system according to (1), the output controller is configured to cause the form of the notification to be changed step by step.

(3) The vehicle control system according to (2) includes a plurality of outputters, wherein the output controller increases the number of outputters that output the notification in accordance with progress of a step of the notification.

(4) In the vehicle control system according to (2) or (3), the outputter includes a display configured to display an image and the output controller is configured to cause the outputter to output a notification of a first step in a state in which an image displayed before the notification of the first step is displayed on the display in the notification of the first step of requesting the occupant of the vehicle to perform a predetermined action.

(5) In the vehicle control system according to (4), the output controller is configured to cause at least some of details included in the image displayed on the display in the notification of the first step to be omitted in a notification of a second step and cause the display to display an image including details showing the predetermined action required to be performed by the occupant.

(6) In the vehicle control system according to claim 5), the image displayed on the display in the notification of the first step includes details showing a scheduled trajectory along which the vehicle travels according to the driving support, and the omitted details are the details showing the scheduled trajectory along which the vehicle travels.

(7) In the vehicle control system according to (5) or (6), the outputter further includes a vibrator configured to vibrate a seat of the vehicle or a seat belt for restraining the occupant, and the output controller is configured to cause the vibrator to be operated in a notification of a third step which is a notification after the notification of the second step.

(8) In the vehicle control system according to any one of (4) to (7), the predetermined action is a state in which the occupant grips a steering wheel of the vehicle.

(9) There is provided a vehicle control method including: executing, by an in-vehicle computer, driving support for a vehicle; providing, by the in-vehicle computer, a notification for requesting an occupant of the vehicle to perform a predetermined action when the driving support is being executed; and causing, by the in-vehicle computer, a form of the notification to be changed so that the notification is emphasized in accordance with a passage of time from a start of the notification and causing an outputter to output the notification.

(10) There is provided a vehicle control program for causing an in-vehicle computer to: execute driving support for a vehicle; provide a notification for requesting an occupant of the vehicle to perform a predetermined action when the driving support is being executed; and cause a form of the notification to be changed so that the notification is emphasized in accordance with a passage of time from a start of the notification and cause an outputter to output the notification.

Advantageous Effects of Invention

According to (1) to (3) and (5) to (10), it is possible to provide a notification of switching from automated driving to manual driving more appropriately.

According to (4), the convenience for a user is improved because an occupant can visually recognize a displayed image before a notification of a first step.

DESCRIPTION OF EMBODIMENTS

Hereinafter, embodiments of a vehicle control system, a vehicle control method, and a vehicle control program of the present invention will be described with reference to the drawings. In the embodiment, a vehicle control system is applied to an automated driving vehicle in which automated driving (autonomous driving) is possible. The automated driving means that the vehicle travels in a state in which an operation of an occupant is not required in principle and is considered as a type of driving support. Also, the automated driving vehicle may also be driven by manual driving. In the following description, the "occupant" is assumed to be an occupant sitting in a seat of a driver, i.e., a seat where a driving operation element is provided.

In the present embodiment, for example, degrees of driving support include a first degree at which the driving support is executed by an operation of a driving support device such as an adaptive cruise control system (ACC) or a lane keeping assistance system (LKAS), a second degree which has a higher degree of control than the first degree and at which a surroundings monitoring obligation is imposed on the occupant to a certain degree although the automated driving is executed by automatically controlling at least one of acceleration/deceleration and steering of the vehicle in a state the occupant does not perform an operation on a driving operation element of the vehicle, and a third degree which has a higher degree of control than the second degree and at which no surroundings monitoring obligation is imposed on the occupant (or at which the surroundings monitoring obligation is lower than at the second degree). In the present embodiment, the driving support of the second degree and the third degree corresponds to the automated driving.

[Overall Configuration]

Figure 1:
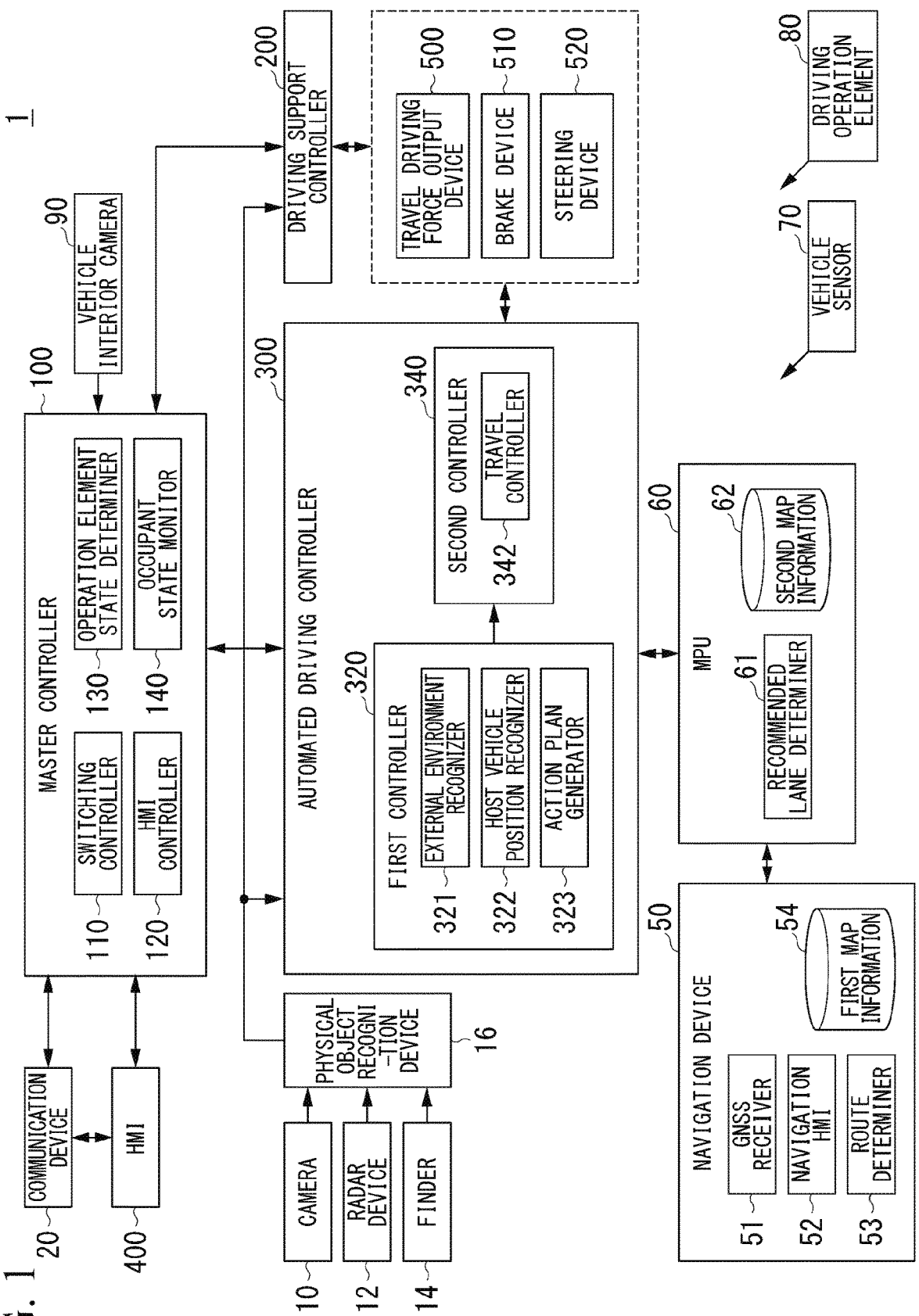
FIG. 1 is a configuration diagram of a vehicle system 1 including a vehicle control system according to an embodiment.

FIG. 1 is a configuration diagram of a vehicle system 1 including a vehicle control system according to an embodiment. For example, a vehicle on which the vehicle system 1 is mounted (hereinafter referred to as a host vehicle M) is, for example, a two-wheeled vehicle, a three-wheeled vehicle, or a four-wheeled vehicle. A driving source of the vehicle is an internal combustion engine such as a diesel engine or a gasoline engine, an electric motor, or a combination thereof. The electric motor is operated using electric power from an electric power generator connected to the internal combustion engine or discharge electric power of a secondary battery or a fuel cell.

For example, the vehicle system 1 includes a camera 10, a radar device 12, a finder 14, a physical object recognition device 16, a communication device 20, a navigation device 50, a map positioning unit (MPU) 60, a vehicle sensor 70, a driving operation element 80, a vehicle interior camera 90, a master controller 100, a driving support controller 200, an automated driving controller 300, a human machine interface (HMI) 400, a travel driving force output device 500, a brake device 510, and a steering device 520. Such devices and equipment are connected to each other by a multiplex communication line such as a controller area network (CAN) communication line, a serial communication line, or a wireless communication network. The configuration shown in FIG. 1 is merely an example, a part of the configuration may be omitted, and another configuration may be added.

In the embodiment, for example, the "vehicle control system" includes the master controller 100, the driving support controller 200, the automated driving controller 300, and the HMI 400. The HMI 400 is an example of an "outputter". The master controller 100, the driving support controller 200, and the automated driving controller 300 are examples of a "controller". An HMI controller 120 is an example of an "output controller".

For example, the camera 10 is a digital camera using a solid imaging element such as a charge coupled device (CCD) or a complementary metal oxide semiconductor (CMOS). One or more cameras 10 are attached to any positions on the host vehicle M on which the vehicle system 1 is mounted. When the view in front of the vehicle M is imaged, the camera 10 is attached to an upper part of a front windshield, a rear surface of a rearview mirror, or the like. When the view to the rear is imaged, the camera 10 is attached to an upper part of a rear windshield, a back door, or the like. When the view to the side is imaged, the camera 10 is attached to a door mirror or the like. For example, the camera 10 periodically and iteratively images the surroundings of the host vehicle M. The camera 10 may be a stereo camera.

The radar device 12 radiates radio waves such as millimeter waves around the host vehicle M and detects at least a position (a distance to and a direction) of a physical object by detecting radio waves (reflected waves) reflected by the physical object. One or more radar devices 12 are attached to any positions on the host vehicle M. The radar device 12 may detect a position and speed of the physical object in a frequency modulated continuous wave (FM-CW) scheme.

The finder 14 is a light detection and ranging or laser imaging detection and ranging (LIDAR) finder in which scattered light from irradiation light is measured and a distance to an object is detected. One or more finders 14 are attached to any positions on the host vehicle M.

The physical object recognition device 16 performs a sensor fusion process on detection results from some or all of the camera 10, the radar device 12, and the finder 14 so that a position, a type, a speed, and the like of a physical object are recognized. The physical object recognition device 16 outputs recognition results to the driving support controller 200 and the automated driving controller 300.

For example, the communication device 20 communicates with another vehicle that is present in the surroundings of the host vehicle M using a cellular network, a Wi-Fi network, Bluetooth (registered trademark), a dedicated short range communication (DSRC), or the like, or communicates with various server devices via a wireless base station. Also, the communication device 20 communicates with a terminal possessed by a person outside the vehicle.

For example, the navigation device 50 includes a global navigation satellite system (GNSS) receiver 51, a navigation HMI 52, and a route determiner 53, and stores first map information 54 in a storage device such as a hard disk drive (HDD) or a flash memory. The GNSS receiver 51 identifies the position of the host vehicle M on the basis of a signal received from a GNSS satellite. The position of the host vehicle M may be identified or supplemented by an inertial navigation system using an output of the vehicle sensor 70. The navigation HMI 52 includes a display device, a speaker, a touch panel, a key, and the like. A part or all of the navigation HMI 52 may be shared with the HMI 400 that will be described below. For example, the route determiner 53 may determine a route from the position of the host vehicle M identified by the GNSS receiver 51 (or any input position) to a destination input by the occupant using the navigation HMI 52 (for example, including information about a via-point when the vehicle travels to the destination) by referring to the first map information 54. For example, the first map information 54 is information in which a road shape is expressed by a link indicating a road and nodes connected by the link. The first map information 54 may include a curvature of the road, point of interest (POI) information, or the like. The route determined by the route determiner 53 is output to the MPU 60. Also, the navigation device 50 may perform route guidance using the navigation HMI 52 on the basis of the route determined by the route determiner 53. Also, for example, the navigation device 50 may be implemented by a function of a terminal device such as a smartphone or a tablet terminal possessed by the user. Also, the navigation device 50 may transmit the current position and the destination to a navigation server via the communication device 20 and acquire the route returned from the navigation server.

For example, the MPU 60 functions as a recommended lane determiner 61 and holds second map information 62 in the storage device such as an HDD or a flash memory. The recommended lane determiner 61 divides the route provided from the navigation device 50 into a plurality of blocks (for example, divides the route into intervals of 100 [m] with respect to a vehicle progress direction), and determines a recommended lane for each block by referring to second map information 62. The recommended lane determiner 61 determines what number lane the vehicle travels on from the left. When a branching position, a merging position, or the like is present on the route, the recommended lane determiner 61 determines the recommended lane so that the host vehicle M may travel on a reasonable travel route for progressing to a branch destination.

The second map information 62 is map information with accuracy higher than that of the first map information 54. For example, the second map information 62 may include information about the center of a lane or information about a boundary of a lane. The second map information 62 may include road information, traffic regulations information, address information (an address and a postal code), facility information, telephone number information, and the like. The road information includes information indicating a type of a road such as an expressway, a toll road, a national highway, a prefectural road, or information about the number of lanes on the road, the area of an emergency parking zone, the width of each lane, a gradient of the road, the position of the road (three-dimensional coordinates including the longitude, the latitude, and the height), the curvature of a curve of a lane, the positions of merging and branching points of a lane, a sign provided on the road, and the like. The second map information 62 may be updated at any time by accessing another device using the communication device 20.

The vehicle sensors 70 include a vehicle speed sensor that detects the speed of the host vehicle M, an acceleration sensor that detects the acceleration, a yaw rate sensor that detects the angular speed around a vertical axis, a direction sensor that detects the direction of the host vehicle M, and the like.

For example, the driving operation elements 80 may include an accelerator pedal, a brake pedal, a shift lever, a steering wheel, and other operation elements. An operation sensor that detects an operation amount or the presence or absence of an operation is attached to the driving operation elements 80. A detection result of the operation sensor is output to any one or more of the master controller 100, the driving support controller 200, the automated driving controller 300, the travel driving force output device 500, the brake device 510, and the steering device 520.

For example, the vehicle interior camera 90 may image a face of the occupant (in particular, the occupant sitting in the seat of the driver) sitting in the seat installed in the interior of the vehicle. The vehicle interior camera 90 is a digital camera using a solid imaging element such as a CCD or a CMOS. For example, the vehicle interior camera 90 may periodically image the occupant. A captured image of the vehicle interior camera 90 is output to the master controller 100.

[Various Types of Control Devices]

For example, the vehicle system 1 includes the master controller 100, the driving support controller 200, and the automated driving controller 300 as a part of a configuration of a control system. Also, the master controller 100 may be integrated into either one of the driving support controller 200 and the automated driving controller 300.

[Master Controller]

The master controller 100 performs switching of a degree of driving support, control of the HMI 400 related thereto, and the like. For example, the master controller 100 includes a switching controller 110, an HMI controller 120, an operation element state determiner 130, and an occupant state monitor 140. Each of the switching controller 110, the HMI controller 120, the operation element state determiner 130, and the occupant state monitor 140 is implemented by a processor such as a central processing unit (CPU) executing a program. Some or all of such functional parts may be implemented by hardware such as large scale integration (LSI), an application specific integrated circuit (ASIC), a field-programmable gate array (FPGA), or may be implemented by cooperation between software and hardware.

For example, the switching controller 110 performs switching of the degree of driving support on the basis of an operation signal input from a predetermined switch (for example, a main switch and an auto switch that will be described below) included in the HMI 400. Also, for example, the switching controller 110 may cancel the driving support and perform switching to manual driving on the basis of an acceleration, deceleration, or steering instruction operation on the driving operation element 80 such as the acceleration pedal, the brake pedal, or the steering wheel. Details of a function of the switching controller 110 will be described below.

Also, the switching controller 110 may perform switching of the degree of driving support on the basis of an action plan generated by an action plan generator 323. For example, the switching controller 110 may end the driving support at a scheduled end point of the automated driving specified by the action plan.

The HMI controller 120 causes the HMI 400 to output a notification or the like related to switching of the degree of driving support. Also, the HMI controller 120 may cause the HMI 400 to output information about determination results from one or both of the operation element state determiner 130 and the occupant state monitor 140. Also, the HMI controller 120 may output information received by the HMI 400 to one or both of the driving support controller 200 and the automated driving controller 300. Details of a function of the HMI controller 120 will be described below.

For example, the operation element state determiner 130 determines whether or not the steering wheel included in the driving operation elements 80 is being operated (specifically, a state is assumed to be an immediately operable state or a gripped state when the driver is actually intentionally performing an operation). Details of a function of the operation element state determiner 130 will be described below.

The occupant state monitor 140 monitors a state of at least the occupant sitting in the seat of the driver of the host vehicle M on the basis of a captured image of the vehicle interior camera 90. For example, the occupant state monitor 140 may determine whether or not the occupant is monitoring the surroundings of the host vehicle M as one type of monitoring. Details of a function of the occupant state monitor 140 will be described below.

[Driving Support Controller]

The driving support controller 200 executes driving support of a first degree. For example, the driving support controller 200 executes ACC, LKAS, and other driving support control. For example, when ACC is executed, the driving support controller 200 controls the travel driving force output device 500 and the brake device 510 so that the host vehicle M travels in a state in which an inter-vehicle distance is uniformly maintained between the host vehicle M and a preceding traveling vehicle on the basis of information input from the camera 10, the radar device 12, and the finder 14 via the physical object recognition device 16. That is, the driving support controller 200 performs acceleration and deceleration control (speed control) based on the inter-vehicle distance from the preceding traveling vehicle. Also, when LKAS is executed, the driving support controller 200 controls the steering device 520 so that the host vehicle M travels while maintaining a travel lane in which the host vehicle M is currently traveling (lane keeping). That is, the driving support controller 200 performs steering control for the lane keeping. The driving support of the first degree may include various types of control other than the automated driving (the second degree and the third degree) that do not request the occupant to operate the driving operation element 80.

[Automatic Driving Controller]

The automated driving controller 300 executes the driving support of the second degree and the third degree. For example, the automated driving controller 300 includes a first controller 320 and a second controller 340. Each of the first controller 320 and the second controller 340 is implemented by a processor such as a CPU executing a program. Some or all of such functional parts may be implemented by hardware such as LSI, an ASIC, or an FPGA, or may be implemented by cooperation between software and hardware.

For example, the first controller 320 includes an external environment recognizer 321, a host vehicle position recognizer 322, and the action plan generator 323.

The external environment recognizer 321 recognizes a state such as the position, the speed, or the acceleration of a nearby vehicle on the basis of information input from the camera 10, the radar device 12, and the finder 14 via the physical object recognition device 16. The position of a nearby vehicle may be indicated by a representative point such as a center of gravity or a corner of the nearby vehicle or may be indicated by a region expressed by an outline of the nearby vehicle. The "state" of the nearby vehicle may include acceleration or jerk of the nearby vehicle, or an "action state" (for example, whether or not a lane change is being made or intended).

The external environment recognizer 321 may recognize at least one of the above-described nearby vehicle, an obstacle (for example, a guardrail, a utility pole, a parked vehicle, a person such as a pedestrian, or the like), a road shape, and other physical objects.

For example, the host vehicle position recognizer 322 recognizes a lane (a travel lane) in which the host vehicle M is traveling and a relative position and an orientation of the host vehicle M related to the travel lane. For example, the host vehicle position recognizer 322 may recognize the travel lane by comparing a pattern of a road dividing line (for example, an arrangement of solid lines and broken lines) obtained from the second map information 62 with a pattern of a road dividing line in the vicinity of the host vehicle M recognized from an image captured by the camera 10. For the recognition, a position of the host vehicle M acquired from the navigation device 50 and a processing result from the INS may be added.

Figure 2:
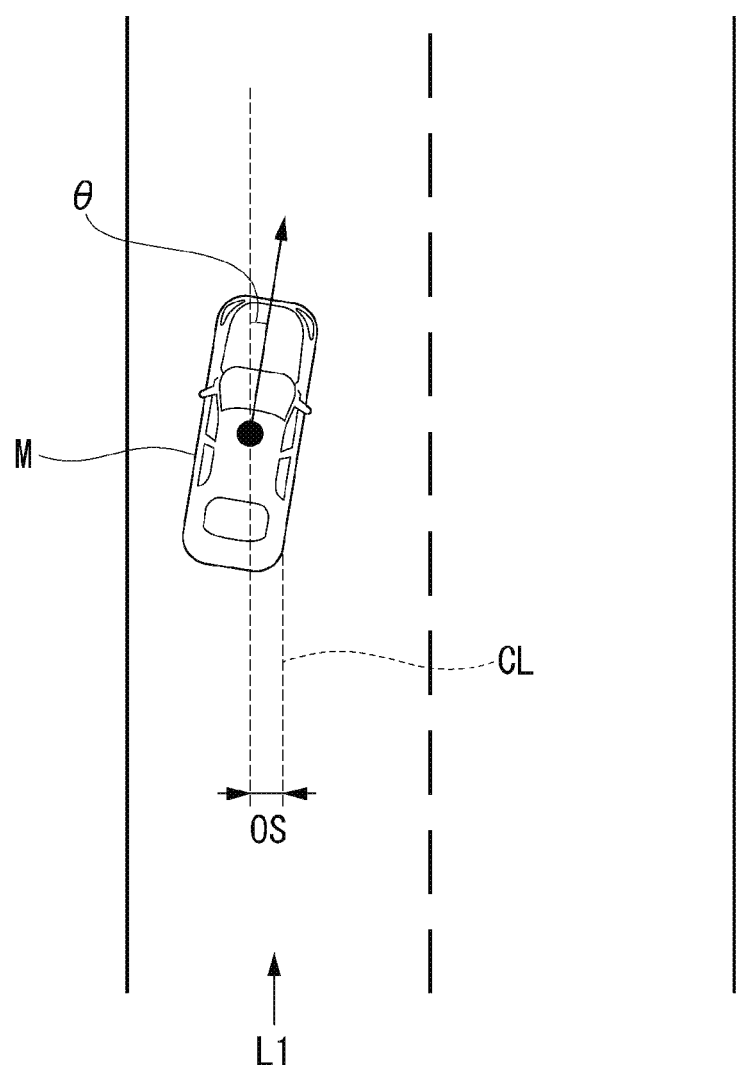
FIG. 2 is a diagram showing a state in which a relative position and an orientation of a host vehicle M related to a travel lane L1 are recognized by a host vehicle position recognizer 322.

For example, the host vehicle position recognizer 322 recognizes the position and the orientation of the host vehicle M with respect to the travel lane. FIG. 2 is a diagram showing a state in which a relative position and an orientation of the host vehicle M related to a travel lane L1 are recognized by the host vehicle position recognizer 322. For example, the host vehicle position recognizer 322 recognizes a deviation OS from a travel lane center CL of a reference point (for example, a center of gravity) of the host vehicle M and an angle θ formed with respect to a line connecting the travel lane center CL to a traveling direction of the host vehicle M as the relative position and the orientation of the host vehicle M with respect to the travel lane L1. Also, alternatively, the host vehicle position recognizer 322 may recognize the position or the like of the reference point of the host vehicle M with respect to a side end of the travel lane L1 as the relative position of the host vehicle M related to the travel lane. The relative position of the host vehicle M recognized by the host vehicle position recognizer 322 is provided to the recommended lane determiner 61 and the action plan generator 323.

The action plan generator 323 generates an action plan for the host vehicle M to perform automated driving to a destination, or the like. For example, the action plan generator 323 may determine events to be sequentially executed in automated driving control so that the host vehicle M can travel in a recommended lane determined by the recommended lane determiner 61 and adapt to a surrounding situation with respect to the host vehicle M. For example, in the automated driving of the embodiment, the event includes a constant-speed travel event for traveling in the same travel lane at a constant speed, a low-speed following event for following the preceding traveling vehicle in the condition of a low speed (for example, 60 [km/h] or less), a lane change event for changing the travel lane of the host vehicle M, an overtaking event for overtaking the preceding traveling vehicle, a merging event for merging a vehicle at a merge point, a branching event for causing the host vehicle M to travel in a target direction at a branch point of the road, an emergency stop event for performing emergency stopping of the host vehicle M, and the like. In some cases, during the execution of such events, an action for avoidance may be planned on the basis of the surrounding situation (the presence of a nearby vehicle or a pedestrian, lane narrowing due to a roadwork, or the like) of the host vehicle M.

The action plan generator 323 generates a target trajectory along which the host vehicle M will travel in the future. The target trajectory is expressed by sequentially arranging points (trajectory points) which the host vehicle M will reach. A trajectory point is a point which the host vehicle M is required to reach at each of predetermined travel distances. Alternatively, a target speed and target acceleration for each of predetermined sampling times (for example, about every one tenth of a second [sec]) may be generated as a part of the target trajectory. Also, the trajectory point may be a position which the host vehicle M is required to reach at a sampling time of each predetermined sampling time. In this case, information about the target speed and the target acceleration is expressed by an interval between the trajectory points.

Figure 3:
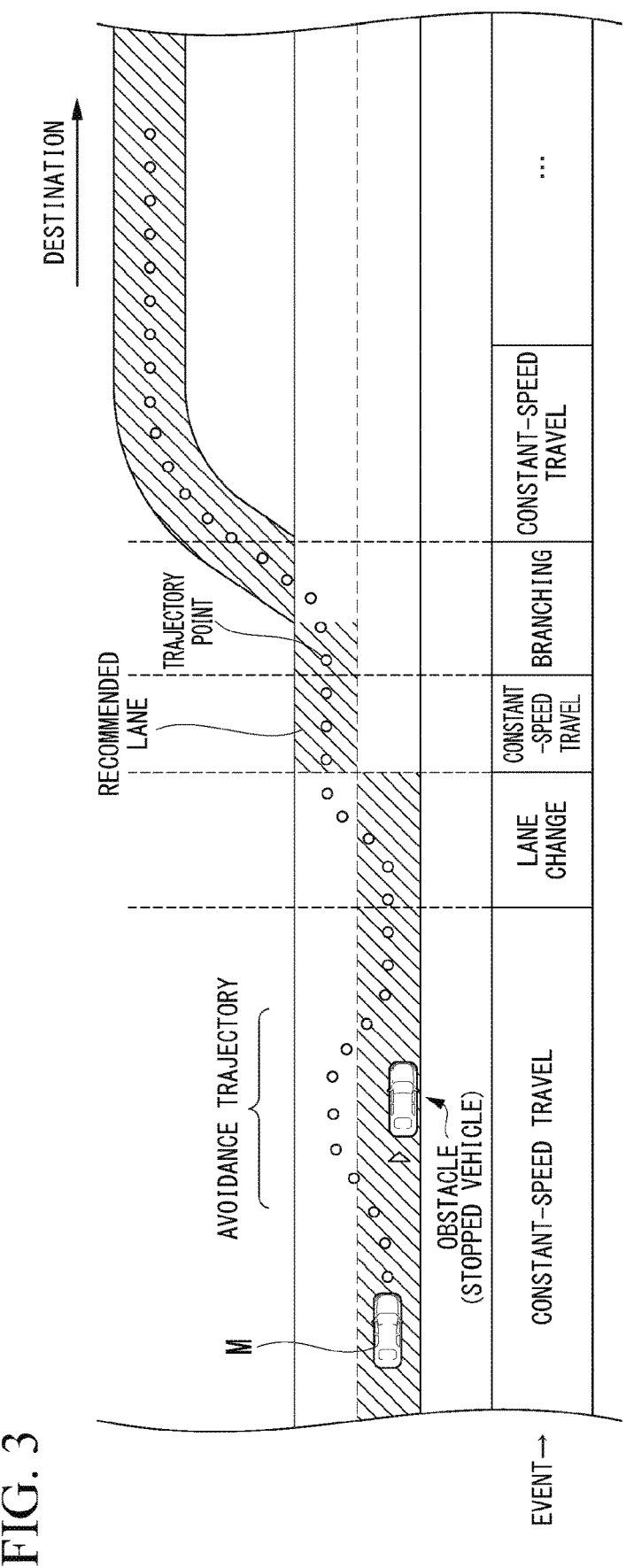
FIG. 3 is a diagram showing a state in which a target trajectory is generated on the basis of a recommended lane.

FIG. 3 is a diagram showing a state in which the target trajectory is generated on the basis of the recommended lane. As shown in FIG. 3, the recommended lane is set so that traveling to the destination along the route is convenient. When the vehicle reaches a position at a predetermined distance before a point of switching to the recommended lane (the position may be determined according to the type of event), the action plan generator 323 may start a lane change event, a branching event, a merging event, or the like. During the execution of each event, when it is necessary to avoid an obstacle, an avoidance trajectory is generated as shown in FIG. 3.

Figure 4:
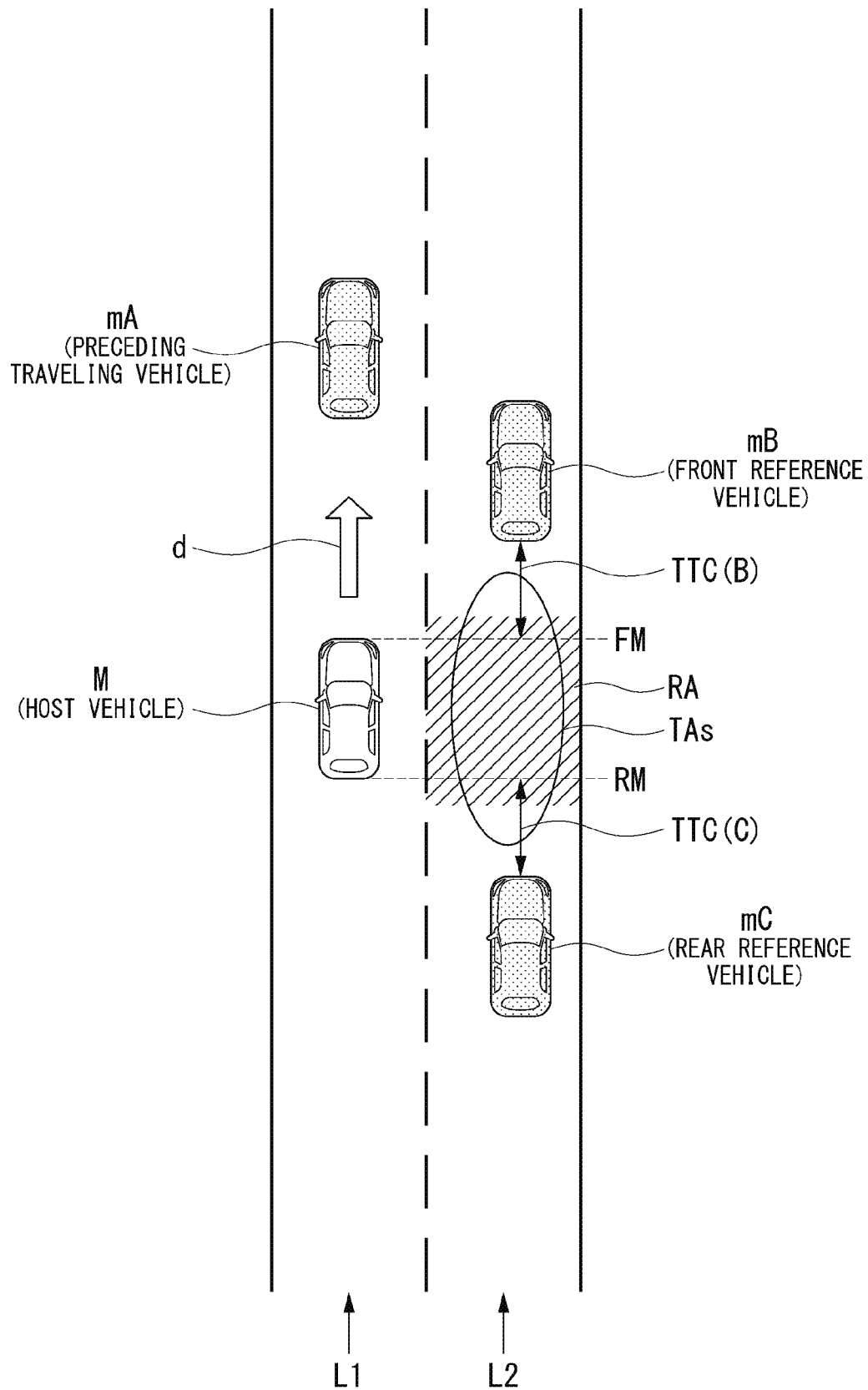
FIG. 4 is an explanatory diagram (part 1) showing a process at the time of a lane change.
Figure 5:
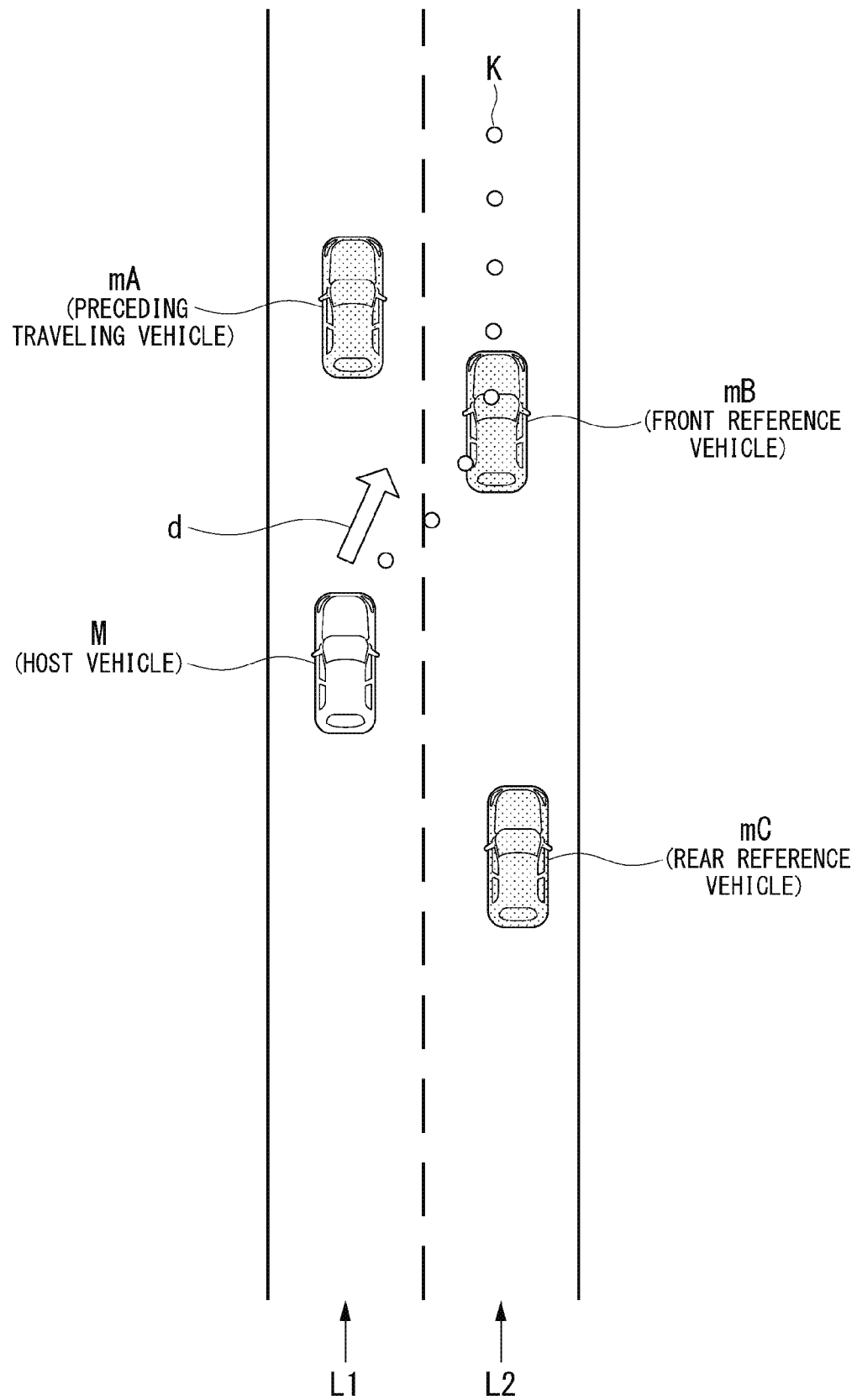
FIG. 5 is an explanatory diagram (part 2) showing the process at the time of a lane change.

Also, when a lane change event is started, the action plan generator 323 generates the target trajectory for the lane change. FIGS. 4 and 5 are explanatory diagrams showing a process when the lane is changed. First, the action plan generator 323 selects two nearby vehicles which are traveling in an adjacent lane L2 with respect to a lane change destination that is an adjacent lane adjacent to the lane (host vehicle lane) L1 in which the host vehicle M travels, from nearby vehicles, and sets a lane change target position TAs between these two nearby vehicles. In the following description, a nearby vehicle that travels immediately before the lane change target position TAs in the adjacent lane will be referred to as a front reference vehicle mB, and a nearby vehicle that travels immediately after the lane change target position TAs in the adjacent lane will be referred to as a rear reference vehicle mC. The lane change target position TAs is a relative position based on a positional relationship between the host vehicle M, the front reference vehicle mB, and the rear reference vehicle mC.

In the example of FIG. 4, a state in which the action plan generator 323 sets the lane change target position TAs is shown. In FIG. 4, a reference sign mA denotes the preceding traveling vehicle, a reference sign mB denotes the front reference vehicle, and a reference sign mC denotes the rear reference vehicle. Also, an arrow d denotes a progress (traveling) direction of the host vehicle M. In the case of the example of FIG. 4, the action plan generator 323 sets the lane change target position TAs between the front reference vehicle mB and the rear reference vehicle mC in the adjacent lane L2.

Next, the action plan generator 323 determines whether or not a primary condition for determining whether or not the lane change is possible has been satisfied at the lane change target position TAs (i.e., the position between the front reference vehicle mB and the rear reference vehicle mC).

For example, the primary condition may be a condition in which there is no part of the nearby vehicle in a prohibition area RA provided in the adjacent lane and TTC values between the host vehicle M and the front reference vehicle mB and between the host vehicle M and the rear reference vehicle mC are larger than a threshold value. Also, this determination condition is an example of a case in which the lane change target position TAs is set to the side of the host vehicle M. When the primary condition has not been satisfied, the action plan generator 323 resets the lane change target position TAs. At this time, the host vehicle M may wait until a timing at which the lane change target position TAs satisfying the primary condition can be set or perform speed control for moving to the side of the lane change target position TAs by changing the lane change target position TAs.

As shown in FIG. 4, for example, the action plan generator 323 projects the host vehicle M onto the lane L2 of the lane change destination of the host vehicle M and sets the prohibition area RA having a slight margin distance in front of and behind the prohibition area RA. The prohibition area RA is set as an area extending from one end to the other end in a lateral direction of the lane L2.

When there is no nearby vehicle in the prohibition area RA, for example, the action plan generator 323 assumes an extension line FM and an extension line RM that respectively extend virtually from the front end and the rear end of the host vehicle M to the side of the lane L2 which is the lane change destination. The action plan generator 323 calculates collision margin time TTC(B) between the extension line FM and the front reference vehicle mB and collision margin time TTC(C) between the extension line RM and the rear reference vehicle mC. The collision margin time TTC(B) is time derived by dividing the distance between the extension line FM and the front reference vehicle mB by a relative speed of the host vehicle M and the front reference vehicle mB. The collision margin time TTC(C) is time derived by dividing the distance between the extension line RM and the rear reference vehicle mC by a relative speed of the host vehicle M and the rear reference vehicle mC. When the collision margin time TTC(B) is larger than a threshold value Th(B) and the collision margin time TTC(C) is larger than a threshold value Th(C), a trajectory generator 118 determines that the primary condition is satisfied. The threshold values Th(B) and Th(C) may be the same value or different values.

When the primary condition is satisfied, the action plan generator 323 generates a trajectory candidate for the lane change. In the example of FIG. 5, the action plan generator 323 assumes that the preceding traveling vehicle mA, the front reference vehicle mB, and the rear reference vehicle mC travel in a predetermined speed model, and generates trajectory candidates so that the host vehicle M does not interfere with the preceding traveling vehicle mA and is positioned between the front reference vehicle mB and the rear reference vehicle mC at a certain future time on the basis of the speed model of these three vehicles and the speed of the host vehicle M. For example, the action plan generator 323 may smoothly connect the current position of the host vehicle M, the position of the front reference vehicle mB at any future time, the center of the lane of the lane change destination, and an end point of the lane change to each other, using a polynomial curve such as a spline curve, and dispose a predetermined number of trajectory points K on the curve at equal intervals or unequal intervals. At this time, the action plan generator 323 generates a trajectory so that at least one of the trajectory points K is disposed at the lane change target position TAs.

In various types of scenes, the action plan generator 323 generates a plurality of target trajectory candidates and selects an optimum target trajectory appropriate for the route to the destination at that time point.

For example, the second controller 340 may include a travel controller 342. The travel controller 342 controls the travel driving force output device 500, the brake device 510, and the steering device 520 so that the host vehicle M passes through the target trajectory generated by the action plan generator 323 according to a scheduled time.

The HMI 400 presents various types of information to the occupant in the vehicle and receives an input operation from the occupant. For example, the HMI 400 may include some or all of various types of display devices, a light emitter, a speaker, a buzzer, a touch panel, various types of operation switches, a key, and the like. Also, the HMI 400 may include a part of a seat belt device that holds the occupant by means of a seat belt in a state in which the occupant sits on the seat. Details of a function of the HMI 400 will be described below.

The travel driving force output device 500 outputs a travel driving force (torque) for enabling the vehicle to travel to driving wheels. For example, the travel driving force output device 500 may include a combination of an internal combustion engine, an electric motor, a transmission, and the like, and an electronic control unit (ECU) that controls the internal combustion engine, the electric motor, the transmission, and the like. The ECU controls the above-described components in accordance with the information input from the travel controller 342 or information input from the driving operation element 80.

For example, the brake device 510 includes a brake caliper, a cylinder that transfers oil pressure to the brake caliper, an electric motor that generates the oil pressure in the cylinder, and a brake ECU. The brake ECU controls the electric motor in accordance with information input from the travel controller 342 or information input from the driving operation element 80, so that the brake torque according to the control operation is output to each wheel. The brake device 510 may include a mechanism for transferring the oil pressure generated by the operation of the brake pedal included in the driving operation element 80 to the cylinder via a master cylinder as a backup. Also, the brake device 510 is not limited to the configuration described above and may be an electronically controlled hydraulic brake device that controls an actuator in accordance with the information input from the travel controller 342 or the information input from the driving operation element 80 to transfer the oil pressure of the master cylinder to the cylinder. Also, the brake device 510 includes a plurality of types of brake devices using oil pressure, electric power, and the like.

For example, the steering device 520 includes a steering ECU and an electric motor. For example, the electric motor changes the direction of steerable wheels by applying a force to a rack and pinion mechanism. The steering ECU changes the direction of the steerable wheels by driving the electric motor in accordance with the information input from the travel controller 342 or the information input from the driving operation element 80.

Also, during the manual driving, the information input from the driving operation element 80 is directly output to the travel driving force output device 500, the brake device 510, and the steering device 520. Also, the information input from the driving operation element 80 may be output to the travel driving force output device 500, the brake device 510, and the steering device 520 via the automated driving controller 300. Each ECU of the travel driving force output device 500, the brake device 510, and the steering device 520 performs each of operations on the basis of the information input from the driving operation element 80 and the like.

[Configuration of HMI 400]

Figure 6:
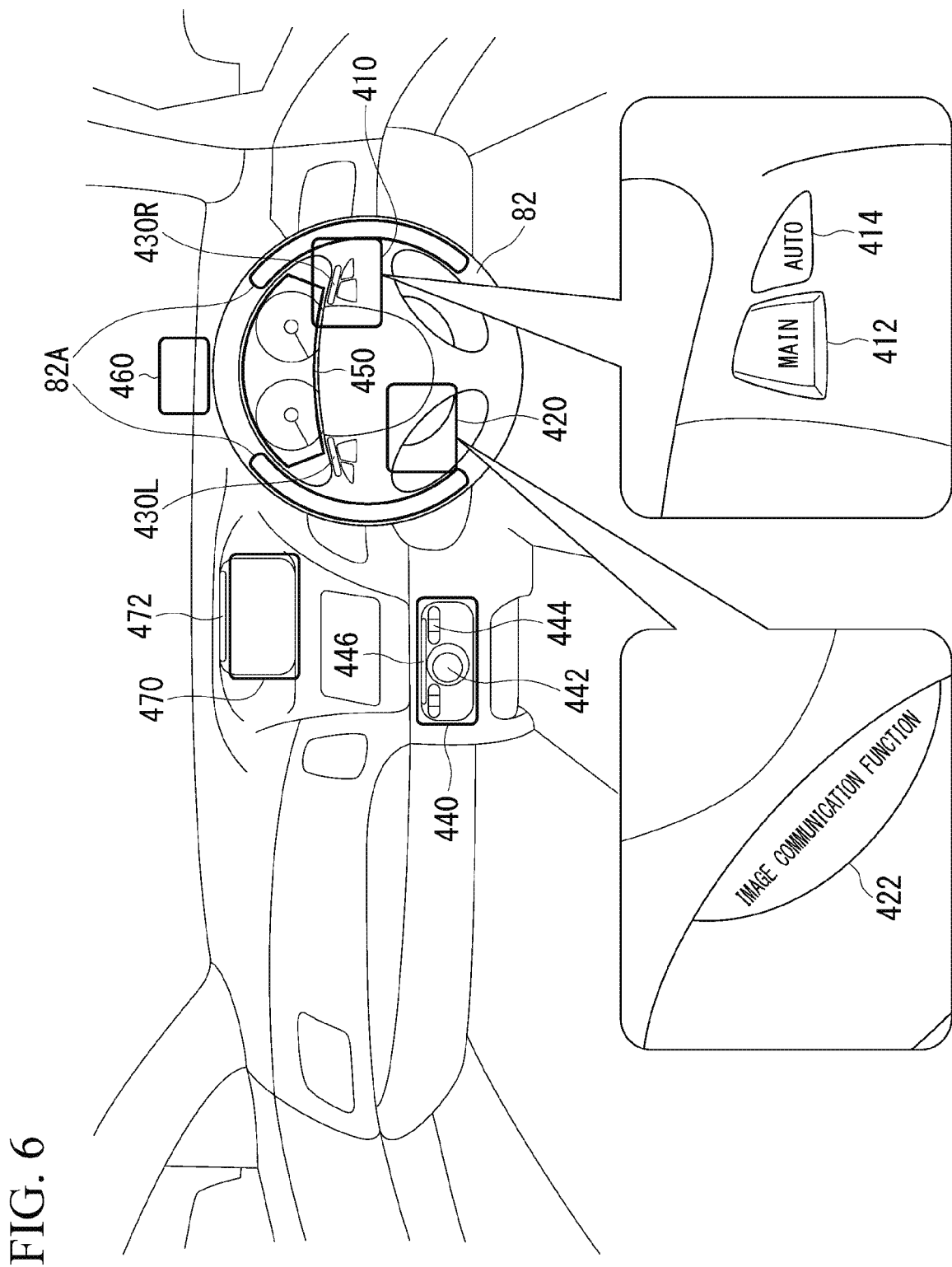
FIG. 6 is a diagram showing an example of an HMI 400 in the host vehicle M.

Hereinafter, a configuration example of the HMI 400 according to an embodiment will be described. FIG. 6 is a diagram showing an example of the HMI 400 in the host vehicle M. For example, the HMI 400 includes a first operation element 410, a second operation element 420, light emitters 430R and 430L, a third operation element 440, a first display 450, a head-up display (HUD) (a second display) 460, and a third display 470.

The first operation element 410, the second operation element 420, and the light emitters 430R and 430L are provided in a steering wheel 82 that is one of the driving operation elements 80. Also, the steering wheel 82 is provided with a grip sensor 82A. For example, the grip sensor 82A may be an electrostatic capacitance sensor provided in a circumferential direction of the steering wheel 82. The grip sensor 82A detects a physical object approaching or coming into contact with an area of a detection target as a change in electrostatic capacitance. When the electrostatic capacitance is equal to or greater than a threshold value, the grip sensor 82A outputs a predetermined detection signal to the operation element state determiner 130 of the master controller 100. For example, the threshold value may be set as a value less than electrostatic capacitance generated when the occupant grips the steering wheel 82. Also, the grip sensor 82A may output the detection signal indicating the electrostatic capacitance to the operation element state determiner 130 regardless of whether or not the electrostatic capacitance is equal to or greater than the threshold value.

For example, the first operation element 410 includes a main switch 412 and an auto switch 414. The main switch 412 is a switch for setting the driving support in a state in which the driving support can be started. In other words, the main switch 412 is a switch for starting a process (an internal process) in a preparation step before the driving support is executed to be described below or a switch for determining whether or not it is possible to start the driving support.

When the main switch 412 is operated, the host vehicle M performs the process in the preparation step before executing the driving support without immediately starting the execution of the driving support. For example, the process in the preparation step is a start of a process of physical object recognition (specifically, a start of an operation of a Kalman filter, or the like). In a state in which the main switch 412 is operated and the driving support can be started (i.e., when a certain period of time has elapsed from the operation thereon), a control for the driving support is started if the auto switch 414 is operated. That is, the auto switch 414 is a switch for actually starting the driving support of the first degree in a state in which the driving support may be started.

The second operation element 420 includes an operation switch 422 for starting provision of an image communication function (also referred to as a video phone function). For example, the light emitters 430R and 430L are disposed on a spoke portion extending from a center boss portion of the steering wheel 82 toward an annular rim portion. A lighting state of the light emitters 430R and 430L is controlled according to control of the HMI controller 120.

For example, the third operation element 440 includes a rotation operation element 442 that protrudes to a front side from a viewpoint of the occupant and a switch operation element 444. The rotation operation element 442 is formed in a substantially cylindrical shape and may be rotated around an axis line. The switch operation element 444 is provided near the rotation operation element 442 or on a top surface of the rotation operation element 442. The third operation element 440 includes a rotation sensor (not shown) such as an encoder that detects a rotation angle and a rotation speed of the rotation operation element 442, and a displacement sensor (not shown) that detects the displacement of the switch operation element 444. The third operation element 440 outputs detection values output from the sensors to the master controller 100. The detection values output to the master controller 100 are used in operations of an arrow or selection button, a confirmation button, and the like output to a screen of the third display 470, or selection or confirmation of an input character, and the like.

Also, the third operation element 440 may be a so-called touch panel type operation element that performs selection, confirmation operation, or the like by touching a display screen with a fingertip. Also, the third operation element 440 is provided with a light emitter 446 capable of emitting light in a predetermined color.

For example, the first display 450 is a display device that is provided in the vicinity of the front of the seat of the driver in an instrument panel and can be visually recognized by the occupant through a gap next to the steering wheel 82 or through the steering wheel 82. For example, the first display 450 is a liquid crystal display (LCD), an organic electroluminescence (EL) display device, or the like. Information necessary for the travel at the time of the manual driving or at the time of the automated driving of the host vehicle M or information about an instruction to the occupant are displayed on the first display 450. For example, the information necessary for the travel at the time of the manual driving of the host vehicle M is a speed, an engine speed, the remaining amount of fuel, a radiator water temperature, a travel distance, and other information of the host vehicle M. On the other hand, for example, the information necessary for the travel at the time of the automated driving of the host vehicle M is information about a future trajectory of the host vehicle M, a degree of driving support, an instruction to the occupant, and the like.

For example, the HUD 460 is disposed at a position higher than that of the first display 450. The HUD 460 projects an image on a predetermined image forming portion. For example, the HUD 460 projecting an image on a portion of a front windshield in front of the seat of the driver, a virtual image can be visually recognized from the viewpoint of an occupant sitting in the seat of the driver. A display area of the image projected by the HUD 460 is smaller than a display area of the image on the first display 450. This is for preventing the occupant from missing a real physical object located in front of the image due to the image projected by the HUD 460. Also, in the embodiment, instead of the HUD 460, the front windshield of the host vehicle M may be used as the second display. In this case, for example, a light emitting diode (LED) incorporated in the instrument panel may emit light and the light emission of the LED may be reflected on the front windshield.

For example, the third display 470 is attached to the central portion of the instrument panel. For example, the third display 470 is an LCD, an organic EL display device, or the like. For example, the third display 470 displays an image corresponding to a navigation process executed by the navigation device 50, a video of a communication partner in a video phone, or the like. Also, the third display 470 may display a television program, reproduce a DVD, or display content of a downloaded movie or the like.

Figure 7:
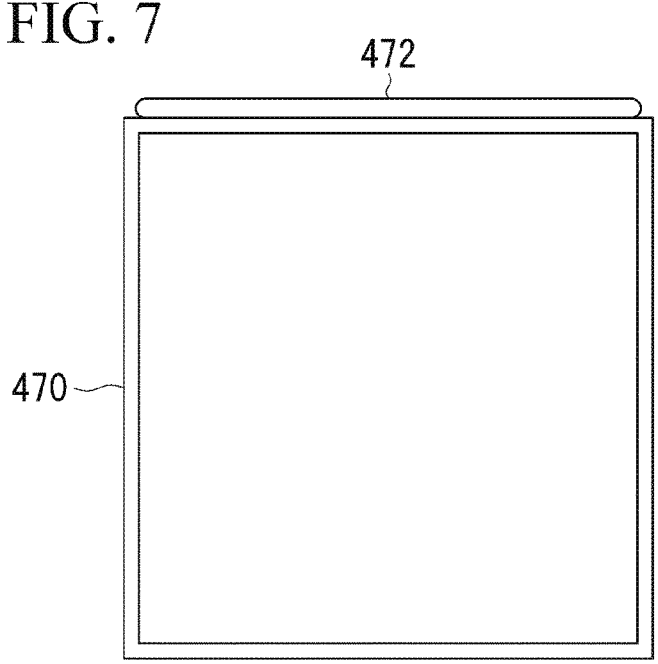
FIG. 7 is an illustrative diagram showing one aspect of a positional relationship between a third display 470 and a light emitter 472.

Also, the third display 470 may be provided with a light emitter 472. FIG. 7 is an illustrative diagram showing one aspect of a first positional relationship between the third display 470 and the light emitter 472. For example, the light emitter 472 is provided in a part of the third display 470 or in the vicinity thereof. For example, the vicinity is a range in which the shortest distance between the light emitter 472 and the third display 470 is equal to or less than several centimeters [cm] (more specifically, about 3 [cm]). In the example of FIG. 7, the light emitter 472 extending along at least one side forming a screen shape of the third display 470 is attached.

Figure 8:
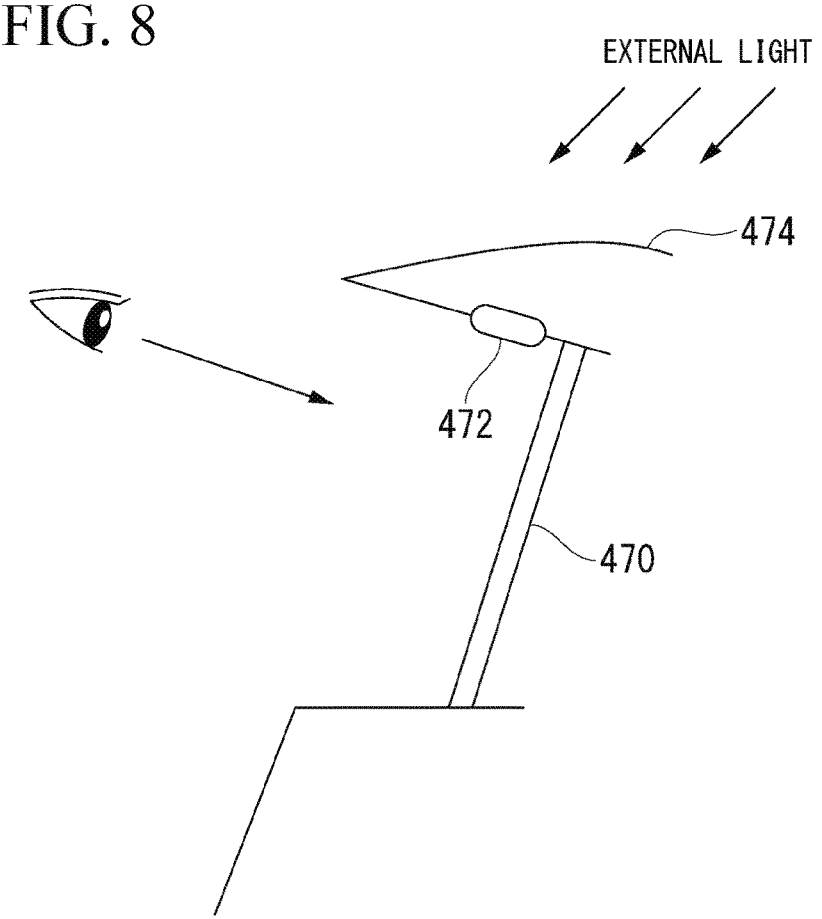
FIG. 8 is an illustrative diagram showing another aspect of the positional relationship between the third display 470 and the light emitter 472.

FIG. 8 is an illustrative diagram showing another aspect of the positional relationship between the third display 470 and the light emitter 472. In the example of FIG. 8, the third display 470 is provided at a portion below a visor portion 474 of the instrument panel portion at the upper portion in front of the third display 470. Also, the light emitted by the light emitter 472 is not blocked by the visor portion 474 and can be visually recognized by the occupant. By adopting this form, because the visor portion 474 may minimize irradiation of external light such as sunlight on the third display 470 and shield at least a part of the external light entering the light emitter 472, visibility of light emission for the occupant can be improved.

The light emitter 472 is controlled by the HMI controller 120 so that the light emitter 472 emits light when the third display 470 is usable. For example, the term "usable" means that a screen related to the image communication function can be displayed on the third display 470 by operating the second operation element 420 or a movie or an image related to a television program can be displayed on the third display 470 according to an operation on the third operation element 440.

Figure 9:
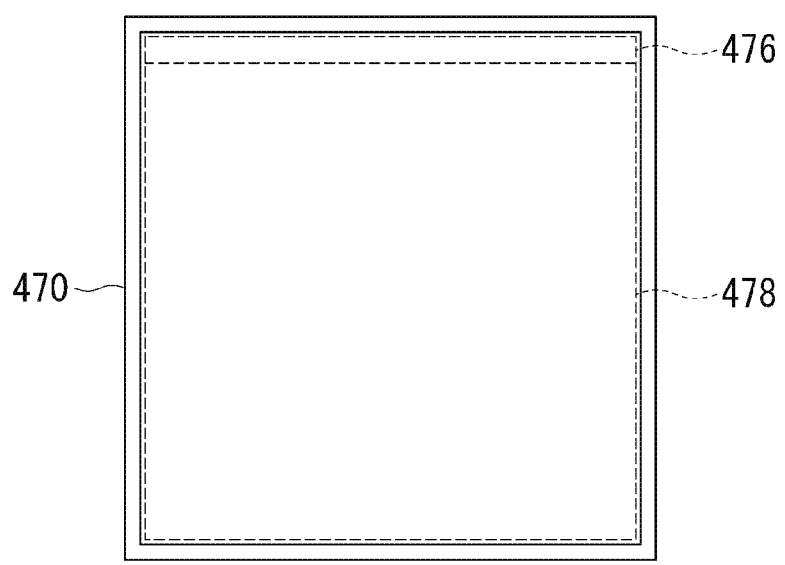
FIG. 9 is an explanatory diagram showing a notification indicating that the third display 470 is usable using an area of a part of a screen of the third display 470.

FIG. 9 is an explanatory diagram showing a notification indicating that the third display 470 is usable using an area of a part of a screen of the third display 470. The HMI controller 120 allocates a first display area 476 and a second display area 478 to the entire screen area of the third display 470. The first display area 476 is a pixel area extending along any one side of the entire screen of the third display 470. When the third display 470 is usable, the HMI controller 120 turns on the light of the first display area 476 and causes the first display area 476 to blink using one or both of a predetermined color or a predetermined shape. Thereby, it is possible to notify the occupant that the third display 470 is in a usable state without providing the light emitter 472.

Also, the HMI controller 120 displays details of an operation of the second operation element 420 or the third operation element 440 or details of execution according to an operation on the second display area 478.

[Display Control of HMI 400 Related to Automated Driving]

Next, the display control of the HMI 400 related to the automated driving will be described. Also, a layout on a display screen to be described below is merely an example and may be arbitrarily changed. The layout refers to a disposition, a color, a size, and others.

Figure 10:
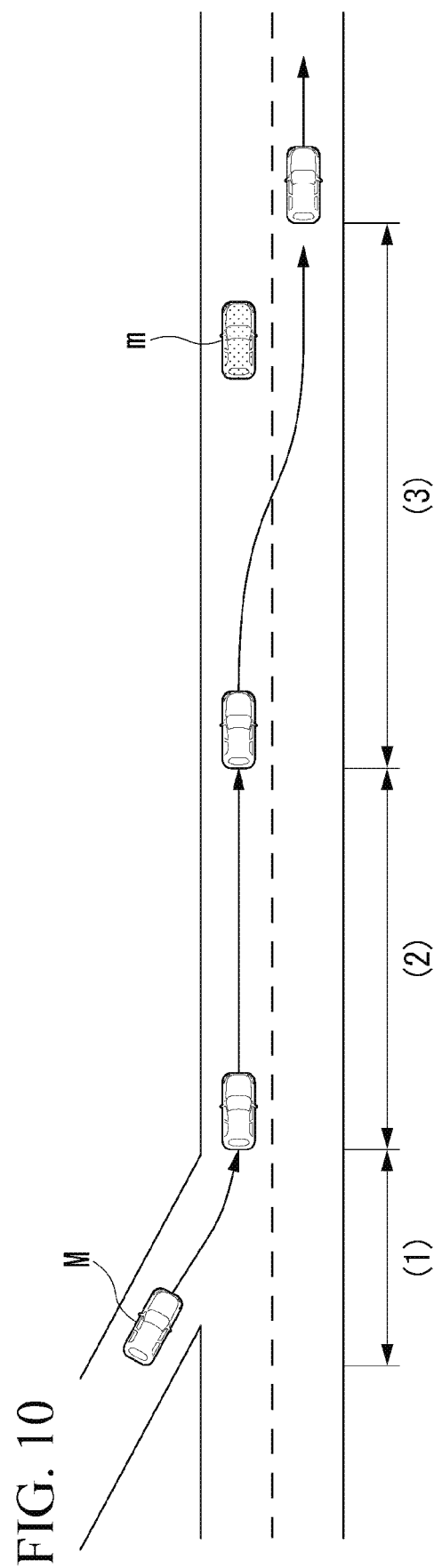
FIG. 10 is a diagram showing various types of scenes until the lane change by automated driving is executed after the host vehicle M starts the automated driving from manual driving.

FIG. 10 is a diagram showing various types of scenes in which the host vehicle M starts the automated driving from the manual driving and the lane change is executed by the automated driving. In an example of FIG. 10, a scene (1) is a scene in which the host vehicle M enters an expressway from a general road according to manual driving. A scene (2) is a scene in which the host vehicle M performs switching from the manual driving to the automated driving. A scene (3) is a scene in which the host vehicle M executes the lane change according to the automated driving. Hereinafter, display control corresponding to each of the scenes (1) to (3) will be described.

<Scene (1)>

For example, the scene (1) is a scene before entry into the expressway. In this scene, because the main switch 412 and the auto switch 414 of the first operation element 410 have not been operated, the driving support is not executed and the manual driving is performed. When the manual driving is performed, the HMI controller 120 causes the first display 450 to display the information necessary for the occupant of the seat of the driver to manually drive the host vehicle M using the driving operation element 80. The HMI controller 120 causes the HUD 460 to display a part of the information displayed on the first display 450. A screen of this case is shown in FIG. 11.

Figure 11:
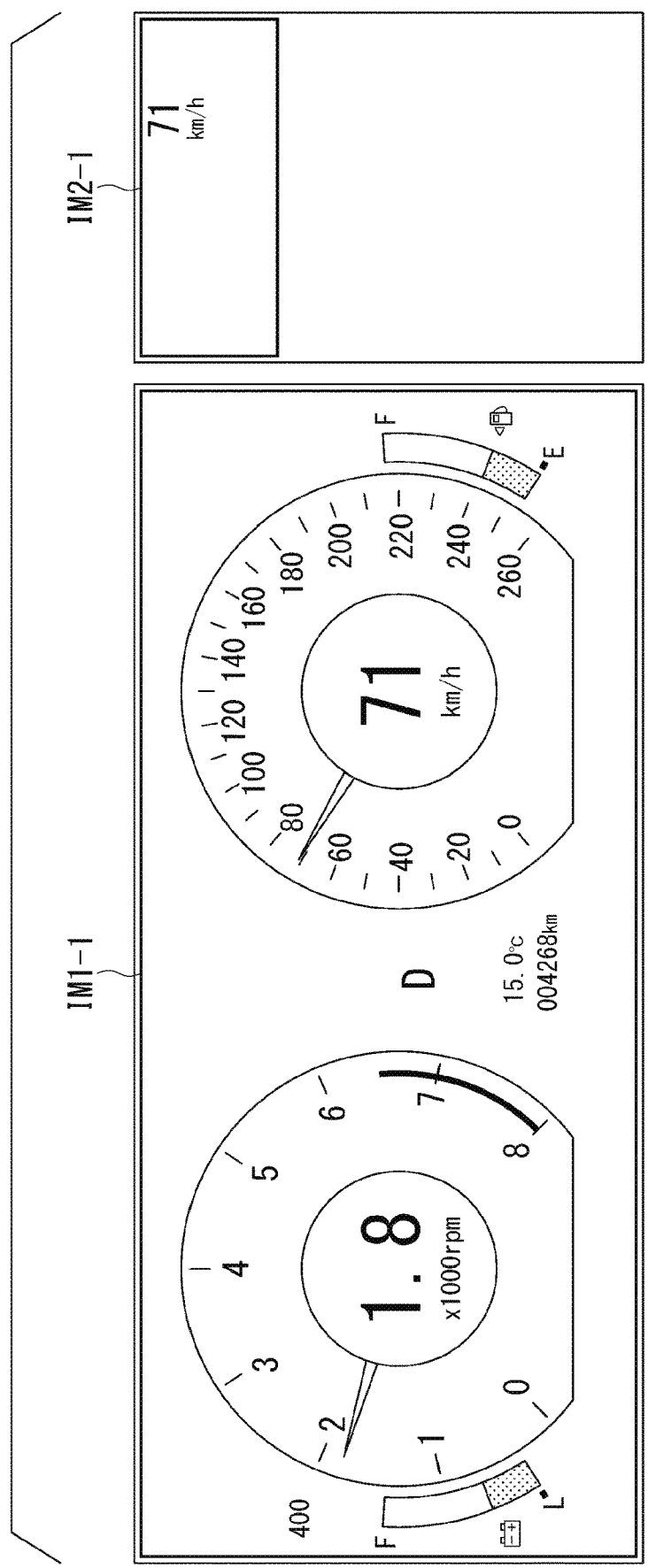
FIG. 11 is a diagram showing an example of a first screen IM1-1 and a second screen IM2-1 displayed at the time of the manual driving.

FIG. 11 is a diagram showing an example of a first screen IM1-1 and a second screen IM2-1 displayed at the time of the manual driving. The first screen IM1-1 is a screen displayed by the first display 450 and the second screen IM2-1 is a screen viewed by the eyes of the occupant due to the projection by the HUD 460. For example, the HMI controller 120 causes information about the remaining amount of battery power, a rotation speed, a shift position, an interior temperature, a travel distance, a travel speed, the remain amount of fuel, and the like of the host vehicle M as the information necessary for the travel of the host vehicle M at the time of the manual driving to be displayed on the first screen IM1-1. Also, the HMI controller 120 causes the second screen IM2-1 to display information about a speed within an image displayed on the first screen IM1-1 so that a display size of the second screen IM2-1 is smaller than that of the first screen IM1-1. As described above, because the necessary information is projected by the HUD 460, a recognition area of the image viewed by the eyes of the occupant is smaller than a display area of the image of the first display 450. Thus, the HMI controller 120 causes the first display 450 to display first information that is relatively detailed (detailed information) related to the driving support of the host vehicle M and causes the HUD 460 to display second information (simple information) which is simpler than the detailed information and is related to the driving support. For example, the simple information is information having an amount of information smaller than that of the detailed information. Also, for example, the simple information may be information in which the number of types of items to be displayed or the number of items to be displayed is smaller than the number of types of items to be displayed or the number of items to be displayed as the detailed information. Also, the simple information may be an image with low resolution, a simplified image, or a deformed image with respect to an image displayed as the detailed information. Also, the second information may be information with high importance or information with high urgency within the first information.

For example, the HMI controller 120 may cause the HUD 460 to display information obtained by extracting a part of the detailed information as the simple information. For example, in FIG. 11, the HMI controller 120 extracts information indicating the speed of the host vehicle M from the detailed information displayed on the first screen IM1-1 and causes the second screen IM2-1 to display the extracted information. As described above, the detailed information is displayed on the first display 450 and the simple information is displayed on the HUD 460, so that it is possible to appropriately provide the information about the driving support and prevent the eyes of the occupant from becoming tired.

<Scene (2)>

In the scene (2), the host vehicle M enters the expressway. When the HMI controller 120 receives an operation on the main switch 412 performed by the occupant, the HMI controller 120 changes screens to be displayed on the first display 450 and the HUD 460. The screen after the change is shown in FIG. 12.

Figure 12:
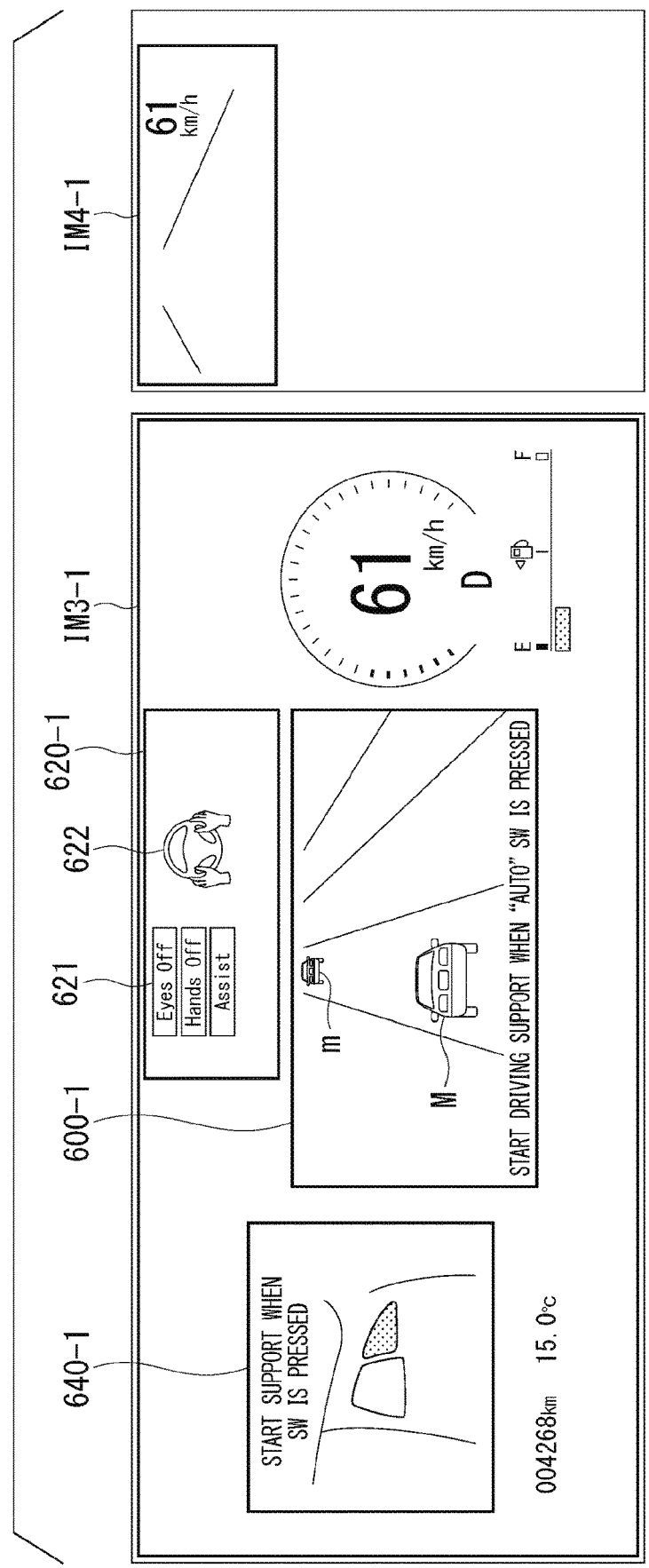
FIG. 12 is a diagram showing an example of a third screen IM3-1 and a fourth screen IM4-1 displayed by operating a main switch 412.

FIG. 12 is a diagram showing an example of a third screen IM3-1 and a fourth screen IM4-1 displayed by operating the main switch 412. The third screen IM3-1 is a screen displayed by the first display 450, and the fourth screen IM4-1 is a screen viewed by the eyes of the occupant by the projection from the HUD 460. The same applies to a third screen IM3-X (X is any natural number) and a fourth screen IM4-X shown in the following drawings. The third screen IM3-X and the fourth screen IM4-X are continuously displayed in a state in which the driving support is executable and in a state in which the driving support is being executed.

The third screen IM3-1 includes a surroundings detection information display area 600-1, a driving support state display area 620-1, and a driving support start operation guide area 640-1 as areas for displaying the information about the driving support. Hereinafter, areas in the third screen IM3-X are referred to as a surroundings detection information display area 600-X, a driving support state display area 620-X, and a driving support start operation guide area 640-X.

The HMI controller 120 causes an image showing a road shape in front of the host vehicle M acquired from the second map information 62, an image showing the host vehicle M recognized by the host vehicle position recognizer 322, and an image showing a nearby vehicle m recognized by the external environment recognizer 321 to be displayed in the surroundings detection information display area 600-1. Also, the HMI controller 120 causes the first display 450 to display an image showing all nearby vehicles m recognized by the external environment recognizer 321. Also, the HMI controller 120 may cause the first display 450 to display only nearby vehicles m that affect a future trajectory of the host vehicle M among all nearby vehicles m recognized by the external environment recognizer 321. Thereby, it is possible to reduce the number of vehicles to be monitored by the occupant and it is possible to reduce a burden of monitoring.

Also, the HMI controller 120 causes all information indicating candidates for the state of the driving support (including the automated driving) executable by the host vehicle M to be displayed in the driving support state display area 620-1. In the example of FIG. 12, an image 621 indicating three indicators "Assist", "Hands Off", and "Eyes Off" is shown as information indicating candidates for the state of the driving support. For example, the degree of driving support is expressed by each indicator alone or a combination of a plurality of indicators.

The indicator "Assist" indicates that the host vehicle M is executing the driving support at the first degree of the ACC, the LKAS, or the like, or the host vehicle M is in a state in which the host vehicle M can transition to the driving support of the first degree. Information about whether the host vehicle M is executing driving support at the first degree or can transition to driving support of the first degree may be ascertained from a requested action notification image 622 that will be described below.

The indicator "Hands Off" indicates that the host vehicle M is in a state in which it is not necessary for the occupant to operate the driving operation element 80 but the host vehicle M is executing the driving support of the second degree at which the surroundings monitoring obligation is imposed on the occupant or the host vehicle M is in a state in which the host vehicle M can transition to the driving support of the second degree. Whether the host vehicle M is executing the driving support at the second degree or can transition to the driving support of the second degree can be ascertained from the requested action notification image 622.

The indicator "Eyes Off" indicates that the host vehicle M is in a state in which it is not necessary for the occupant to operate the driving operation element 80 and the host vehicle M is executing the driving support of the third degree at which no surroundings monitoring obligation is imposed on the occupant or the host vehicle M is in a state in which the host vehicle M may transition to the driving support of the third degree. Whether the host vehicle M is executing the driving support at the third degree or can transition to the driving support of the third degree can be ascertained from the requested action notification image 622. Also, in an example of FIG. 12, the state in which the driving support of the host vehicle M is not being executed (a manual driving state) is shown.

Also, the HMI controller 120 displays the requested action notification image 622 at a display position corresponding to the image 621 showing the three indicators "Assist", "Hands Off", and "Eyes Off" in the driving support state display area 620-1. The term "corresponding" refers to a form in which a corresponding relationship such as a guideline indicating horizontal alignment, vertical alignment, or association can be recognized by a person. As an example, the "display position corresponding to the image 621" is a display position adjacent to the image 621 and is a display position several centimeters [cm] or less (for example, 3 [cm] or less) away from the display position of the image 621 which is a reference in at least one of upward, downward, right, and left directions. For example, the requested action notification image 622 is an image showing a predetermined action performed on the driving operation element 80 by the occupant. For example, the requested action notification image 622 includes an image showing the driving operation element 80 and an image showing a predetermined portion of the occupant. For example, the requested action notification image 622 is an image schematically showing a positional relationship between the steering wheel 82 and hands of the occupant.

The HMI controller 120 causes information for guiding the occupant with respect to his/her operation of starting the driving support to be displayed in the driving support start operation guide area 640-1. In an example of FIG. 12, the occupant is guided in the driving support start operation guide area 640-1 so that the driving support is started by the occupant operating the auto switch 414.

In addition to or instead of displaying that the driving support is started by the occupant operating the auto switch 414 in the driving support start operation guide area 640-1, the HMI controller 120 may cause a sound indicating that the driving support is started by the occupant operating the auto switch 414 to be output from the speaker included in the HMI 400.

At least a part of the information displayed in the surroundings detection information display area 600-1, the driving support state display area 620-1, and the driving support start operation guide area 640-1 may be displayed in another display area. Also, information about a travel distance, a temperature inside the vehicle, fuel, a speed, and a shift position of the host vehicle M may be displayed on the third screen IM3-1.

The HMI controller 120 causes simple information obtained by extracting the part of the detailed information to be displayed on the fourth screen IM4-1 of the HUD 460 with respect to the detailed information displayed on the third screen IM3-1. Information related to a road shape in front of the host vehicle M and information indicating a speed of the host vehicle M within information related to the driving support displayed on the display screen IM3-1 of the first display 450 are displayed on the fourth screen M4-1 of the HUD 460.

In a state shown in FIG. 12, when it is detected that the auto switch 414 has been operated by the occupant, the master controller 100 causes the driving support controller 200 to execute the driving support of the first degree. Also, for example, the HMI controller 120 changes the screens to be displayed on the first display 450 and the HUD 460 to screens shown in FIG. 13.

Figure 13:
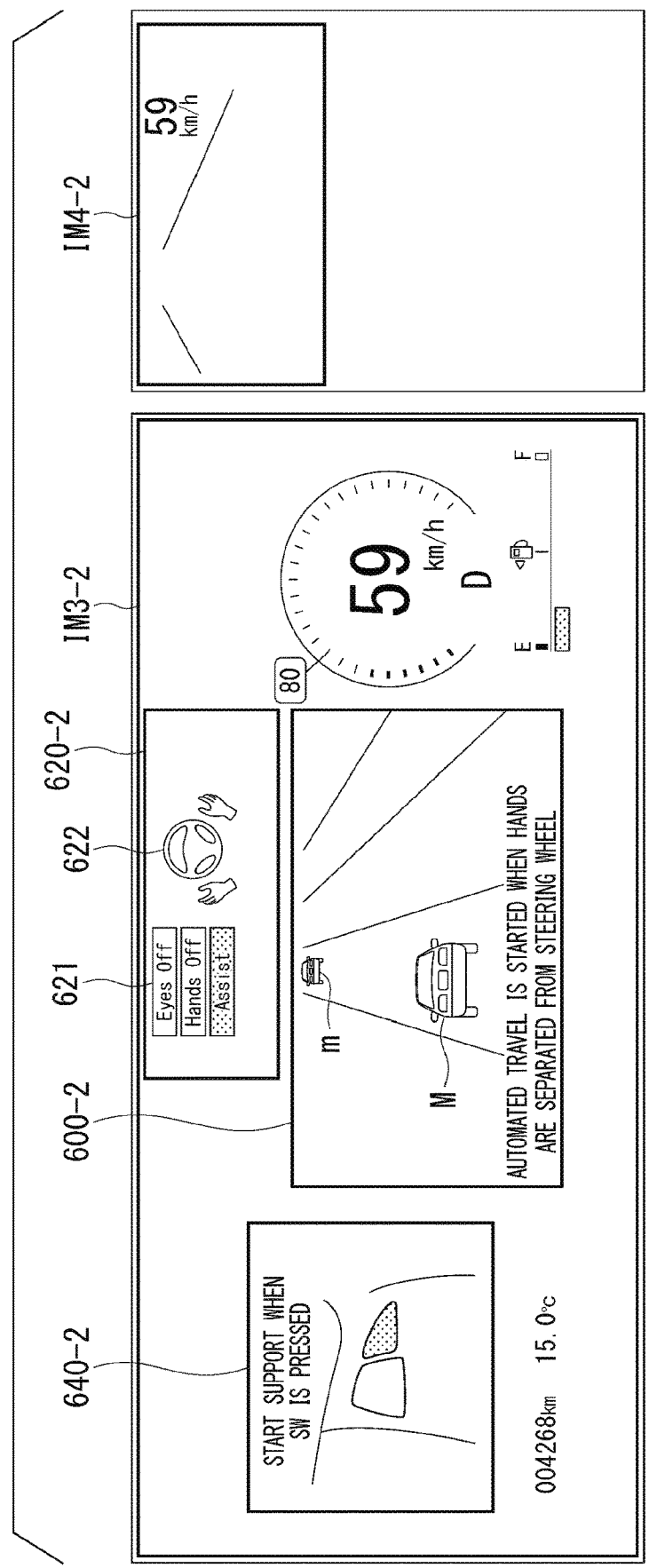
FIG. 13 is a diagram showing an example of screens IM3-2 and IM4-2 displayed on a first display 450 and a head-up display (HUD) 460 when an auto switch 414 is being operated.

FIG. 13 is a diagram showing an example of screens IM3-2 and IM4-2 displayed on the first display 450 and the HUD 460 when the auto switch 414 is operated. The HMI controller 120 causes the image showing the degree of driving support that is being executed to be displayed so that the image showing the degree of driving support that is being executed is distinguishable from an image showing a degree of other driving support. For example, the HMI controller 120 causes the image of the indicator "Assist" to be highlighted and displayed in a driving support state display area 620-2 of the third screen IM3-2. Thereby, the occupant may ascertain that the driving support of the first degree is being performed.

Here, as the requested action notification image 622, the HMI controller 120 causes a moving image for requesting the occupant to perform an operation necessary for the transition to the degree of driving support corresponding to "Hands Off" (automated driving) to be displayed as the requested action notification image 622. For example, the moving image is an image including a dynamic object in which a predetermined physical object dynamically moves according to a passage of time. Also, the moving image may include an animation.

For example, when the driving support of the first degree is being executed and the driving support of the second degree is executable, the HMI controller 120 causes the requested action notification image 622 schematically showing operation details of the occupant for a state in which the hands of the occupant are removed from the steering wheel 82 to be displayed in the driving support state display area 620-2 of the third screen IM3-2 as information about an operation method of the occupant for switching the driving support to the driving support of the second degree.

Figure 14:
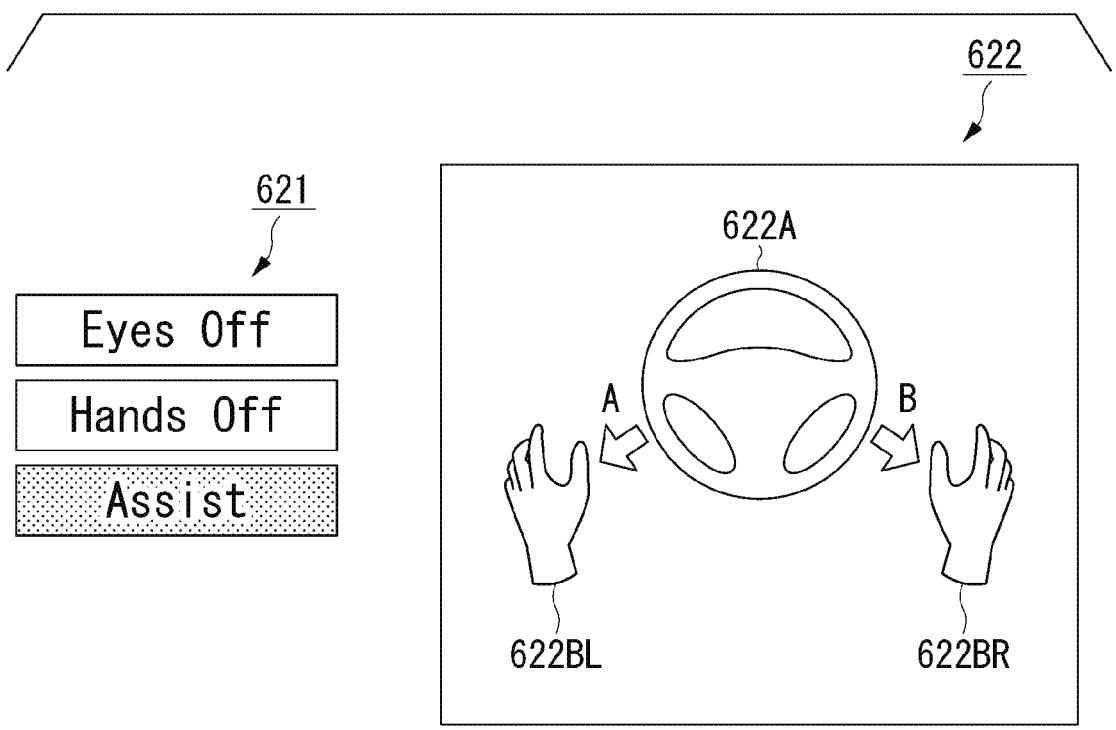
FIG. 14 is a diagram showing an example of an image displayed in a driving support state display area 620-2 when driving support of a first degree is executed.

FIG. 14 is a diagram showing an example of an image displayed in the driving support state display area 620-2 when the driving support of the first degree is executed. The HMI controller 120 causes the image 621 showing the three indicators and the requested action notification image 622 to be displayed in the driving support state display area 620-2. For example, the requested action notification image 622 includes an image 622A showing the steering wheel 82 and images 622BL and 622BR showing the hands of the occupant.

For example, the HMI controller 120 causes an animation in which the images 622BL and 622BR showing the hands of the occupant are removed from the image 622A showing the steering wheel 82 in directions of arrows A and B to be displayed. Also, the HMI controller 120 may cause the image 622A showing the steering wheel 82 and the images 622BL and 622BR showing the hands of the occupant to be emphasized and displayed. Thereby, because the image showing the indicator "Assist" is highlighted and displayed within the image 621 showing the three indicators, the occupant may intuitively ascertain that the driving support of the first degree is being executed. In addition, the occupant may intuitively ascertain that an action of separating the hands from the steering wheel 82 is requested from the animation of the requested action notification image 622.

Also, in addition to or instead of the requested action notification image 622 of the image 622A showing the steering wheel 82 and the images 622BL and 622BR showing the hands of the occupant, the HMI controller 120 may cause an image schematically showing a positional relationship between the accelerator pedal and a foot of the occupant or an image schematically showing a positional relationship between the brake pedal and the foot of the occupant to be displayed as the requested action notification image 623 in the driving support state display area 620-2 of the third screen IM3-2.

Figure 15:
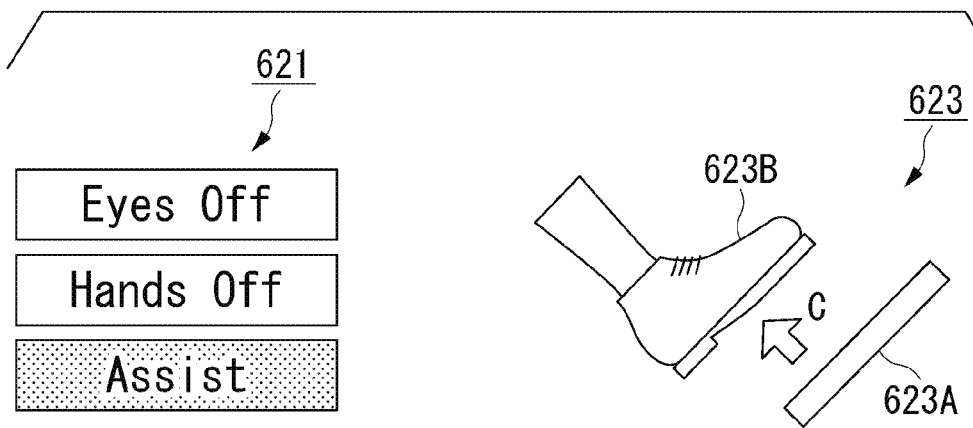
FIG. 15 is a diagram showing a display example of a requested action notification image 623 including an accelerator pedal and a foot of an occupant.

FIG. 15 is a diagram showing a display example of the requested action notification image 623 including the accelerator pedal and the foot of the occupant. The HMI controller 120 causes the image 621 showing the three indicators and the requested action notification image 623 to be displayed in the driving support state display area 620-2 shown in FIG. 15. The requested action notification image 623 includes an image 623A showing the accelerator pedal and an image 623B showing the foot of the occupant. For example, when the driving support of the first degree is being executed and the driving support of the second degree is executable, the HMI controller 120 causes an animation in which the image 623B showing the foot of the occupant has been separated from the image 623A showing the accelerator pedal in a direction of an arrow C to be displayed in order to switch the driving support to the driving support of the second degree. Also, the HMI controller 120 may cause the image 623A showing the accelerator pedal and the image 623B showing the foot of the occupant to be emphasized and displayed. Thereby, the occupant can intuitively ascertain that an action of separating the foot from the accelerator pedal is being requested.

Also, the HMI controller 120 may cause information indicating that driving support is started by the occupant executing the action corresponding to the requested action notification image 622 to be displayed in a surroundings detection information display area 600-2. In an example of FIG. 13, information indicating that the driving support ("automated travel" in FIG. 13") is started when the hands of the occupant are separated from the steering wheel 82 (the "steering wheel" in FIG. 13) is displayed in the surroundings detection information display area 600-2.

Also, when the occupant is requested to perform an action of separating his/her hands from the steering wheel 82, the HMI controller 120 may cause the light emitters 430R and 430L provided on the steering wheel 82 to be turned on or blinked.

Also, when the occupant is requested to perform the action of separating his/her hands from the steering wheel 82, the HMI controller 120 may cause a sound indicating the request to be output from the speaker included in the HMI 400. The HMI controller 120 may combine a plurality of notifications such as displaying of the requested action notification image 622, turning on or blinking of the light emitters 430R and 430L, and outputting of the sound corresponding to the action of separating the hand from the steering wheel 82 and cause the plurality of notifications to be output from various types of equipment.

The HMI controller 120 causes information similar to that of the fourth screen IM4-1 to be displayed on a fourth screen IM4-2 of the HUD 460.

Here, the operation element state determiner 130 determines whether or not the steering wheel 82 has been gripped by the occupant. For example, the operation element state determiner 130 determines whether or not the steering wheel 82 has been operated on the basis of an output from the grip sensor 82A described above.

After the auto switch 414 is operated by the occupant, the switching controller 110 causes the driving support controller 200 to continue the driving support of the first degree when the operation element state determiner 130 determines that the steering wheel 82 is gripped by the occupant.

Also, when the operation element state determiner 130 determines that all conditions for the transition to the driving support of the second degree are satisfied and the steering wheel 82 is not gripped by the occupant in a state in which the auto switch 414 is operated, the switching controller 110 causes the automated driving controller 300 to execute the driving support of the second degree (i.e., the automated driving).

Figure 16:
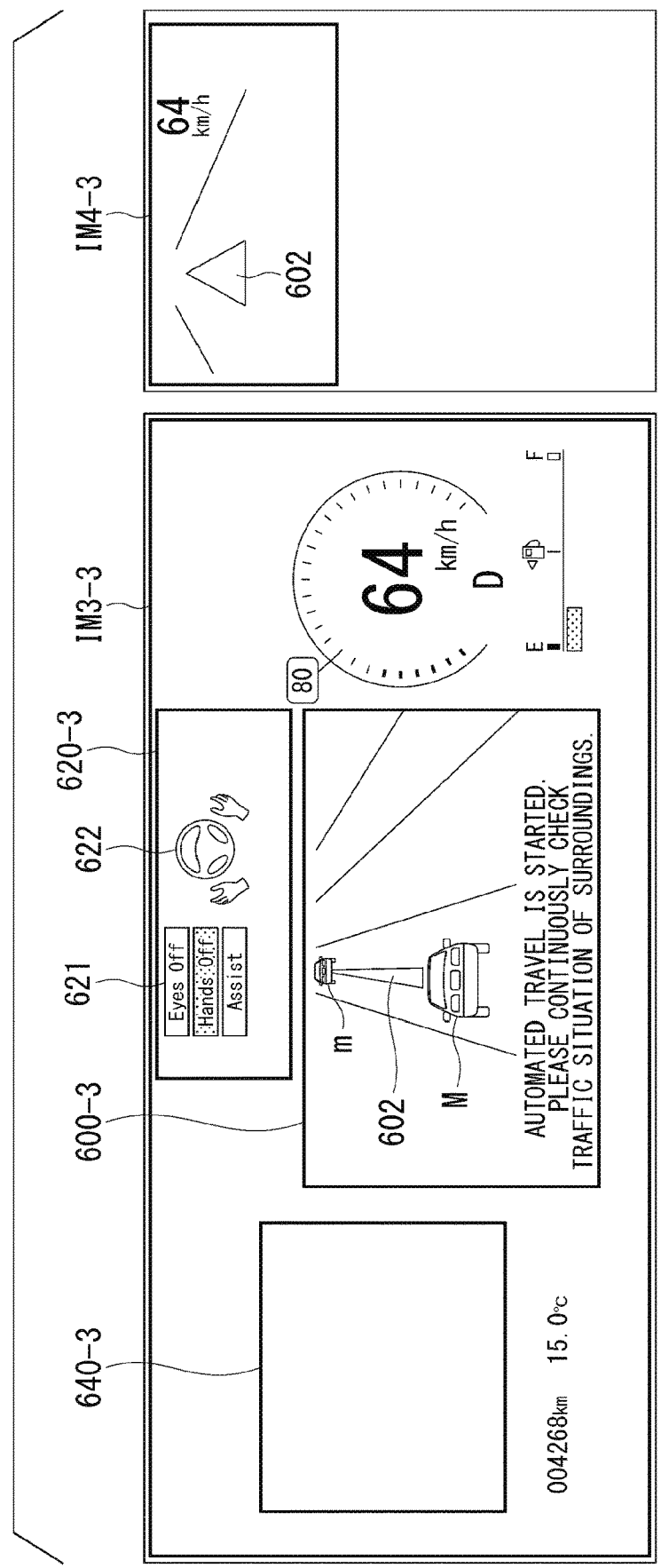
FIG. 16 is a diagram showing an example of the screens displayed on the first display 450 and the HUD 460 during driving support of a second degree.

Also, when the automated driving controller 300 executes the driving support of the second degree, the HMI controller 120 changes the screens displayed on the first display 450 and the HUD 460 to, for example, screens shown in FIG. 16.

FIG. 16 is a diagram showing an example of the screens displayed on the first display 450 and the HUD 460 during the driving support of the second degree. The HMI controller 120 causes the indicator for "Hands Off" corresponding to the driving support of the second degree to be highlighted and displayed in a driving support state display area 620-3 of a third screen IM3-3. Thereby, the occupant may ascertain that the driving support of the second degree is being performed.

Also, for example, the HMI controller 120 causes the image showing the road shape in front of the host vehicle M acquired from the second map information 62, the image showing the host vehicle M recognized by the host vehicle position recognizer 322, the image showing the nearby vehicle m recognized by the external environment recognizer 321, and a future trajectory image 602 showing the future trajectory of the host vehicle M generated by the action plan generator 323 to be displayed in a surroundings detection information display area 600-3. Also, although the driving support of the second degree (the automated travel in FIG. 16) is started, the HMI controller 120 causes information for causing the occupant to continuously monitor a traffic situation of surroundings to be displayed in the surroundings detection information display area 600-3.

The occupant state monitor 140 of the master controller 100 monitors that the occupant is continuously monitoring the traffic situation of the surroundings. For example, the occupant state monitor 140 acquires a face image of the occupant sitting in the seat of the driver from the image captured by the vehicle interior camera 90 and acquires a line-of-sight direction from the acquired face image. For example, the occupant state monitor 140 may acquire the line-of-sight direction of the occupant from the captured image of the vehicle interior camera 90 by means of deep learning using a neural network or the like. For example, a neural network that is learned to output the line-of-sight direction by inputting feature information of the eyes, the nose, the mouth, or the like or positions of irises of the eyeballs obtained by analyzing an unspecified large number of face images may be constructed in advance. In addition, the occupant state monitor 140 acquires the line-of-sight direction of the occupant by inputting the face image of the occupant of the host vehicle M to the neural network.

Also, the occupant state monitor 140 determines whether or not the occupant is monitoring the surroundings of the host vehicle M according to whether or not the line-of-sight direction of the occupant is included in a predetermined range of a direction in which the surroundings can be monitored. When the line-of-sight direction of the occupant is not included in the predetermined range of the direction in which the surroundings can be monitored or when the line-of-sight direction of the occupant cannot be acquired, the occupant state monitor 140 determines that the occupant is not monitoring the surroundings. When it is determined that the occupant is not monitoring the surroundings, the HMI controller 120 may issue a warning by sound or the like so as to cause the occupant to monitor the surroundings.

Also, when the line-of-sight direction of the occupant is not included in the predetermined range of the direction in which the surroundings can be monitored, the occupant state monitor 140 determines that the occupant is monitoring the surroundings. In this case, the automated driving controller 300 continues the driving support of the second degree. Also, when the driving support of the host vehicle M is being started, nothing is displayed in a driving support start operation guide area 640-3.

The HMI controller 120 causes the future trajectory image 602 showing the future trajectory of the host vehicle M to be displayed on the fourth screen IM4-3 of the HUD 460 in addition to information similar to that of the fourth screen IM4-2.

<Scene (3)>

In the scene (3), the automated driving controller 300 performs the lane change of the host vehicle M according to the driving support of the second degree. In this case, the HMI controller 120 causes a screen corresponding to the driving support to be displayed on one or both of the first display 450 and the HUD 460.

For example, the HMI controller 120 causes the image showing the occurrence of the lane change event of the host vehicle M executed by the automated driving controller 300 to be displayed in a first form at a first timing before behavior of the host vehicle M changes (for example, five seconds before the behavior changes).

Figure 17:
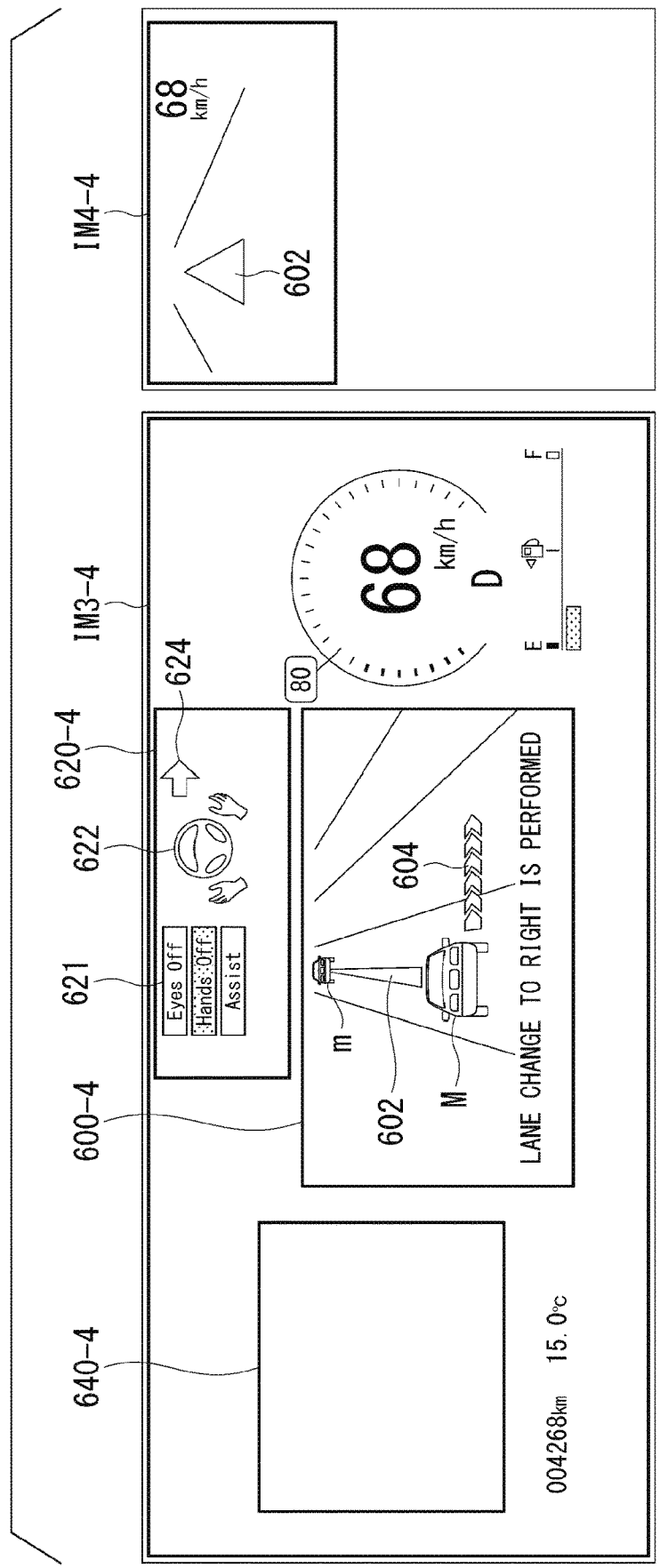
FIG. 17 is a diagram showing an example of a third screen IM3-4 and a fourth screen IM4-4 displayed at the time of a start of a lane change.

FIG. 17 is a diagram showing an example of a third screen IM3-4 and a fourth screen IM4-4 displayed at the first timing before the behavior of the host vehicle M changes. In addition to details displayed in the surroundings detection information display area 600-3, for example, the HMI controller 120 causes an image 604 showing a direction in which the host vehicle M performs the lane change to be displayed in a surroundings detection information display area 600-4 of the third screen IM3-4. In an example of FIG. 17, the image 604 in which the host vehicle M performs a lane change to a right lane adjacent to the travel lane is displayed.

For example, the image 604 is an image that does not include text. In an example of FIG. 17, the image 604 is a figure showing a course change direction of the host vehicle M in a road width direction. For example, the HMI controller 120 gives an outer frame to the figure showing the course change direction of the host vehicle M and causes the first display 450 to display an image to which the outer frame has been given. Also, the HMI controller 120 divides the image 604 into a plurality of areas, gives outer frames to the plurality of divided areas, and causes the outer frames of the plurality of divided areas to be displayed. Also, the HMI controller 120 may cause the outer frames of the plurality of divided areas to be displayed as an animation in which the outer frames of the plurality of divided areas are sequentially displayed in the course change direction of the host vehicle M.

Also, the HMI controller 120 causes a direction indicator 624 indicating the course change of the host vehicle M to be displayed in a driving support state display area 620-4. For example, the direction indicator 624 is a figure such as an arrow indicating the course change direction. The HMI controller 120 causes the direction indicator 624 to be displayed on the first display 450 at a timing synchronized with the first timing at which the image 604 is displayed.

The HMI controller 120 causes information similar to that of the fourth screen IM4-3 to be displayed on the fourth screen IM4-4 of the HUD 460.

Also, the HMI controller 120 causes an image in which the image 604 is emphasized and displayed to be displayed in the surroundings detection information display area 600-4 at a second timing which is a timing after the first timing and before the behavior of the host vehicle M changes (for example, two seconds before the behavior changes).

Figure 18:
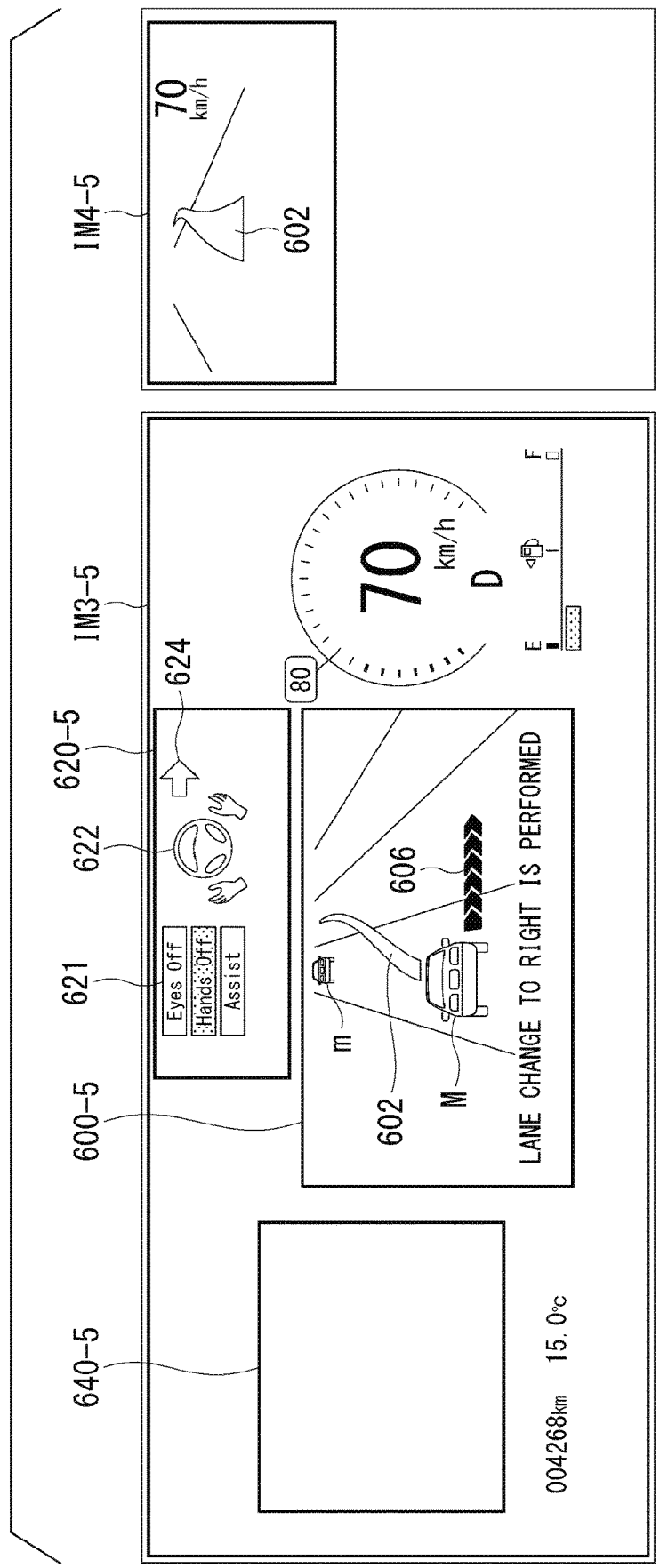
FIG. 18 is a diagram showing an example of a third screen IM3-5 and a fourth screen IM4-5 displayed during execution of the lane change.

FIG. 18 is a diagram showing an example of a third screen IM3-5 and a fourth screen IM4-5 displayed at the second timing before the behavior of the host vehicle M changes. The HMI controller 120 causes an image 606 in which the image 604 is highlighted and displayed to be displayed in a surroundings detection information display area 600-5 of the third screen IM3-5. For example, the HMI controller 120 causes a display form in which the inside of the outer frame of the image 604 is colored to be displayed in the surroundings detection information display area 600-5. Also, the HMI controller 120 may cause the outer frames of the plurality of areas divided in the image 604 to be displayed in an animation so that the outer frames are sequentially highlighted and displayed in the course change direction of the host vehicle M. Also, the HMI controller 120 may cause the image 606 to be displayed at the first timing and may cause the image 606 to be blinked and displayed at the second timing. Also, the HMI controller 120 may cause the image 606 to be displayed at the first timing and cause the image 606 at the second timing to be displayed in a color that is more conspicuous than a color displayed at the first timing. Thereby, the occupant can intuitively ascertain the course change direction.

Also, the HMI controller 120 causes the future trajectory image 602 displayed in the surroundings detection information display area 600-5 to be changed to a direction corresponding to the course change direction at a timing synchronized with the second timing Thereby, the occupant may intuitively ascertain that the change in the behavior is started in the lane change of the host vehicle M.

The HMI controller 120 causes information similar to that of the fourth screen IM4-4 to be displayed on the fourth screen IM4-5 of the HUD 460. Also, the HMI controller 120 causes the future trajectory image 602 displayed on the fourth screen IM4-5 of the HUD 460 to be displayed by making a change to a direction corresponding to the course change direction at a timing synchronized with the second timing.

<Process Flow Corresponding to Scenes (1) to (3)>

Figure 19:
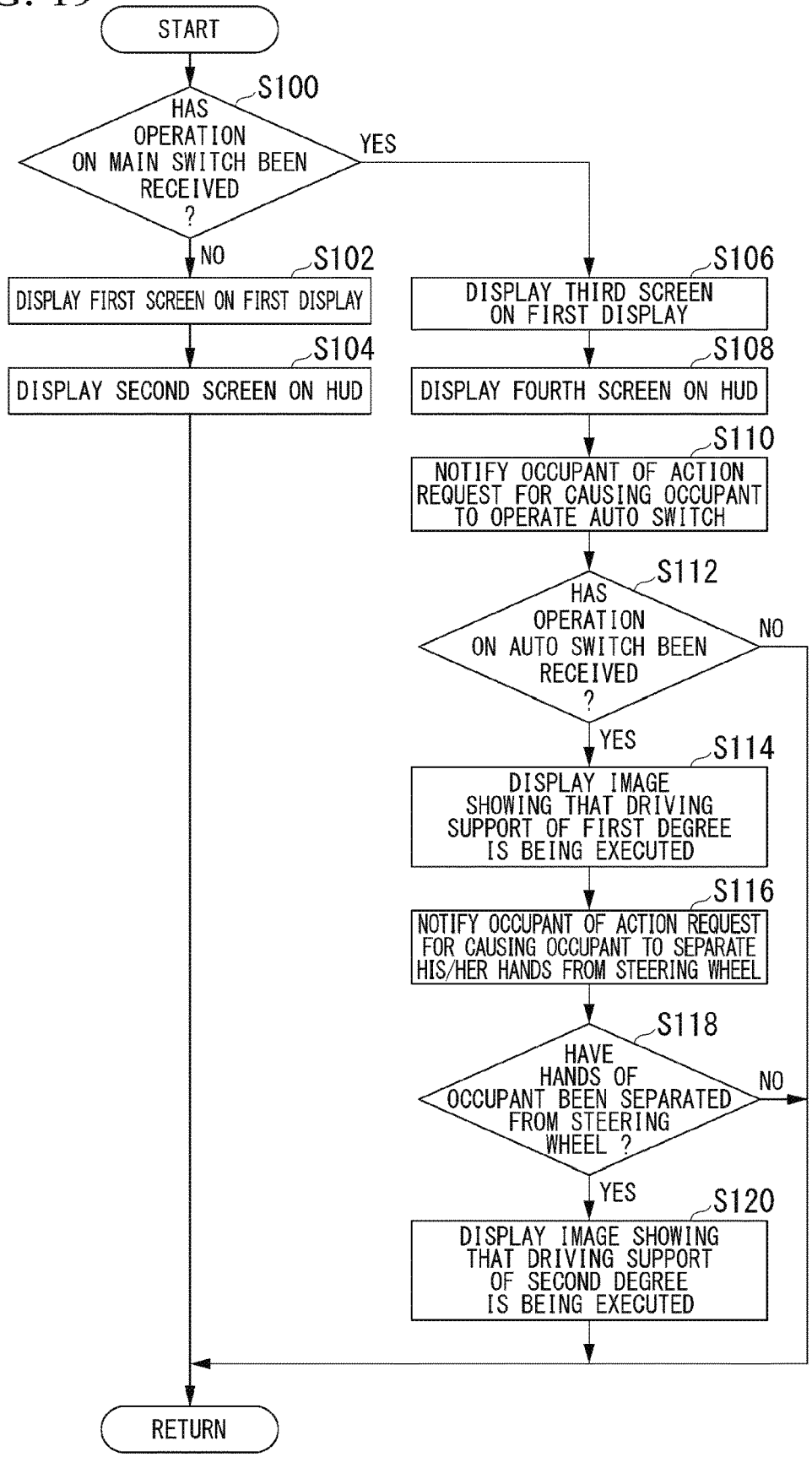
FIG. 19 is a flowchart showing an example of a flow of a process to be executed by an HMI controller 120 in scenes (1) to (3).

FIG. 19 is a flowchart showing an example of the flow of a process to be executed by the HMI controller 120 in the scenes (1) to (3). First, the HMI controller 120 determines whether or not an operation on the main switch 412 has been received (step S100). When the operation on the main switch 412 has not been received, the HMI controller 120 displays the first screen IM1-1 on the first display 450 of the host vehicle M (step S102) and displays the second screen IM2-1 on the HUD 460 (step S104).

Also, when the operation on the main switch 412 has been received, the HMI controller 120 displays the third screen IM3-1 on the first display 450 (step S106) and displays the fourth screen IM4-1 on the HUD 460 (step S108). Details of the process of step S106 will be described below.

Next, the HMI controller 120 notifies the occupant of an action request for causing the occupant to operate the auto switch (step S110). Next, the HMI controller 120 determines whether or not the operation on the auto switch 414 has been received (step S112). When the operation on the auto switch 414 has been received, the HMI controller 120 displays the image showing that the driving support of the first degree is being executed on the third screen IM3-1 and the fourth screen IM4-1 (step S114). Next, the HMI controller 120 notifies the occupant of an action request for causing the occupant to separate his/her hands from the steering wheel 82 (step S116).

Next, the HMI controller 120 determines whether or not the hands of the occupant have been separated from the steering wheel 82 by means of the operation element state determiner 130 (step S118). When the hands of the occupant have been separated from the steering wheel 82, the HMI controller 120 displays the image showing that the driving support of the second degree is being executed on the third screen IM3-3 (step S120). Details of the process of step S120 will be described below. Thereby, the process of the present flowchart is ended.

Figure 20:
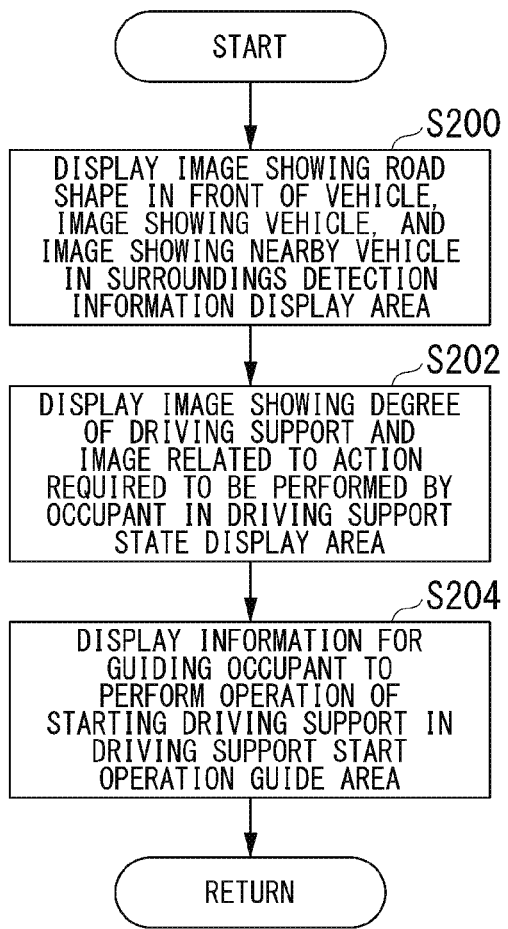
FIG. 20 is a flowchart showing an example of a process in which an HMI controller 120 causes the first display 450 to display the third screen IM3-1.

Next, the details of the process of step S106 will be described. FIG. 20 is a flowchart showing an example of the process in which the HMI controller 120 causes the third screen IM3-1 to be displayed on the first display 450. In the example of FIG. 20, the HMI controller 120 causes an image showing a road shape in front of the vehicle, the image showing the vehicle, and an image showing a nearby vehicle to be displayed in the surroundings detection information display area 600-1 (step S200). Next, the HMI controller 120 causes an image showing a degree of driving support and an image related to an action required to be performed by the occupant to be displayed in the driving support state display area 620-1 (step S202). Next, the HMI controller 120 causes information for guiding the occupant with respect to an operation of starting the driving support to be displayed in the driving support start operation guide area 640-1 (step S204). Thereby, the process of the present flowchart is ended.

Figure 21:
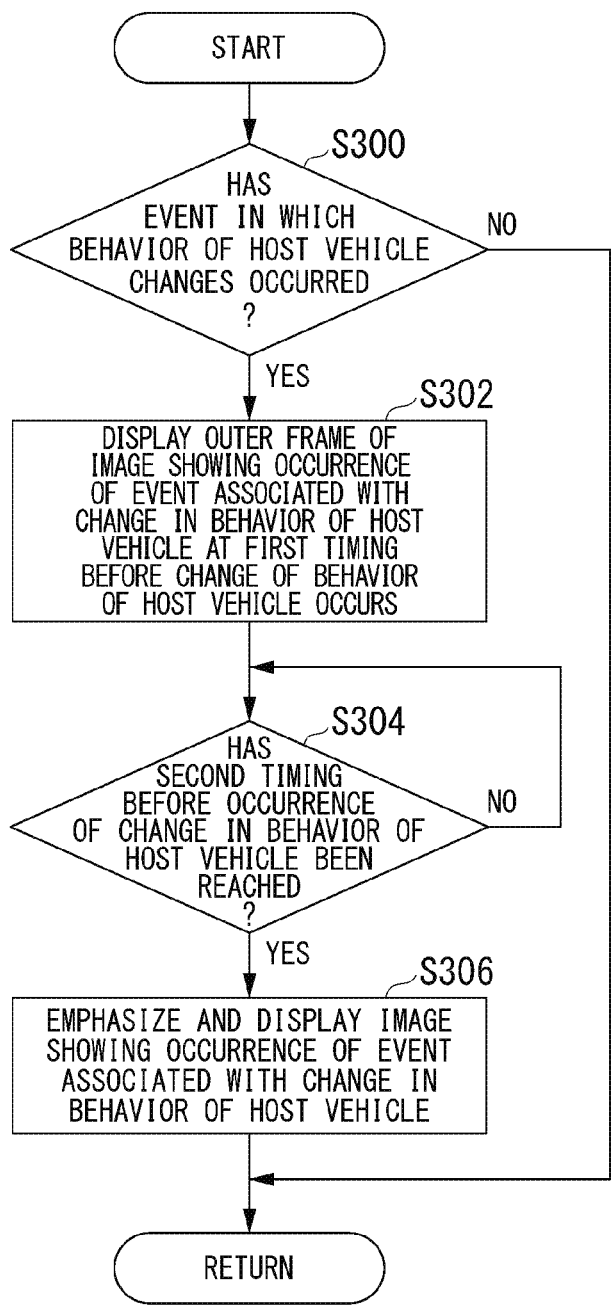
FIG. 21 is a flowchart showing an example of a display control process when an event in which behavior of the host vehicle M changes occurs.

Next, a display control process when an event in which the behavior of the host vehicle M changes occurs in a state in which the image showing that the driving support of the second degree is being executed is displayed in the process of step S120 will be described. FIG. 21 is a flowchart showing an example of the display control process when the event in which the behavior of the host vehicle M changes occurs. The process of FIG. 21 is iteratively executed during the execution of the driving support of the second degree or the third degree. During execution of automated driving, in FIG. 21, the automated driving controller 300 determines whether or not an event in which the behavior of the host vehicle M changes according to the automated driving has occurred (step S300). When the event in which the behavior of the host vehicle M changes has occurred, the HMI controller 120 causes an image showing the occurrence of an event associated with the change in the behavior of the host vehicle M to be displayed at a first timing before the behavior of the host vehicle M occurs (step S302).

Next, the HMI controller 120 determines whether or not the second timing has been reached before the change in the behavior of the host vehicle M occurs (step S304). The HMI controller 120 waits until the second timing has been reached when the second timing has not been reached before the change in the behavior of the host vehicle M occurs and causes an image showing the occurrence of the event associated with the change in the behavior of the host vehicle M to be emphasized and displayed when the second timing has been reached (step S306). Thereby, the process of the present flowchart is ended. The occupant can easily ascertain a timing at which the behavior of the vehicle changes by means of the process of FIG. 21.

Figure 22:
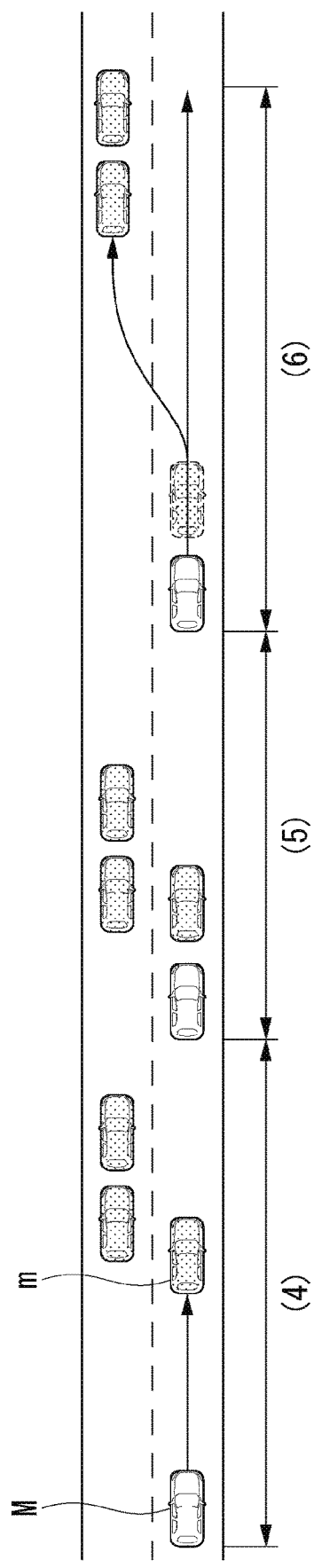
FIG. 22 is a diagram showing various types of scenes until driving support of a second degree is executed from a third degree after driving support of the third degree is executed with respect to the host vehicle M.

Next, scenes (4) to (6) will be described. FIG. 22 is a diagram showing various types of scenes until driving support of a second degree is executed from a third degree after driving support of the third degree is executed with respect to the host vehicle M. In an example of FIG. 22, the scene (4) is a scene in which the host vehicle M follows a nearby vehicle m during a traffic jam and therefore the driving support of the host vehicle M is switched from the second degree to the third degree. The scene (5) is a scene in which the host vehicle M is executing low-speed following travel according to the driving support of the third degree. The low-speed following travel (a traffic jam pilot (TJP)) is a control form for following a preceding traveling vehicle at a predetermined speed or less. The predetermined speed is, for example, 60 [km/h] or less. The low-speed following travel is activated when the speed of the host vehicle M is equal to or less than the predetermined speed and the distance between the host vehicle M and the preceding traveling vehicle m is within a predetermined distance (confirmation). In the low-speed following travel, it is possible to implement the automated driving with high reliability by continuously performing relatively easy control such as following the preceding traveling vehicle on a congested road. In the low-speed following travel, a activation condition may be a condition that the host vehicle M travels at the predetermined speed or less or the host vehicle M follows the preceding traveling vehicle m. The scene (6) is a scene in which the driving support of the host vehicle M is switched from the third degree to the second degree. Hereinafter, display control corresponding to each of the scenes (4) to (6) will be described.

<Scene (4)>

In the scene (4), the automated driving controller 300 performs acceleration control of the host vehicle M in a state in which the host vehicle M has not yet reached low-speed following travel. In this case, the HMI controller 120 displays the image corresponding to the driving support on one or both of the first display 450 and the HUD 460.

Figure 23:
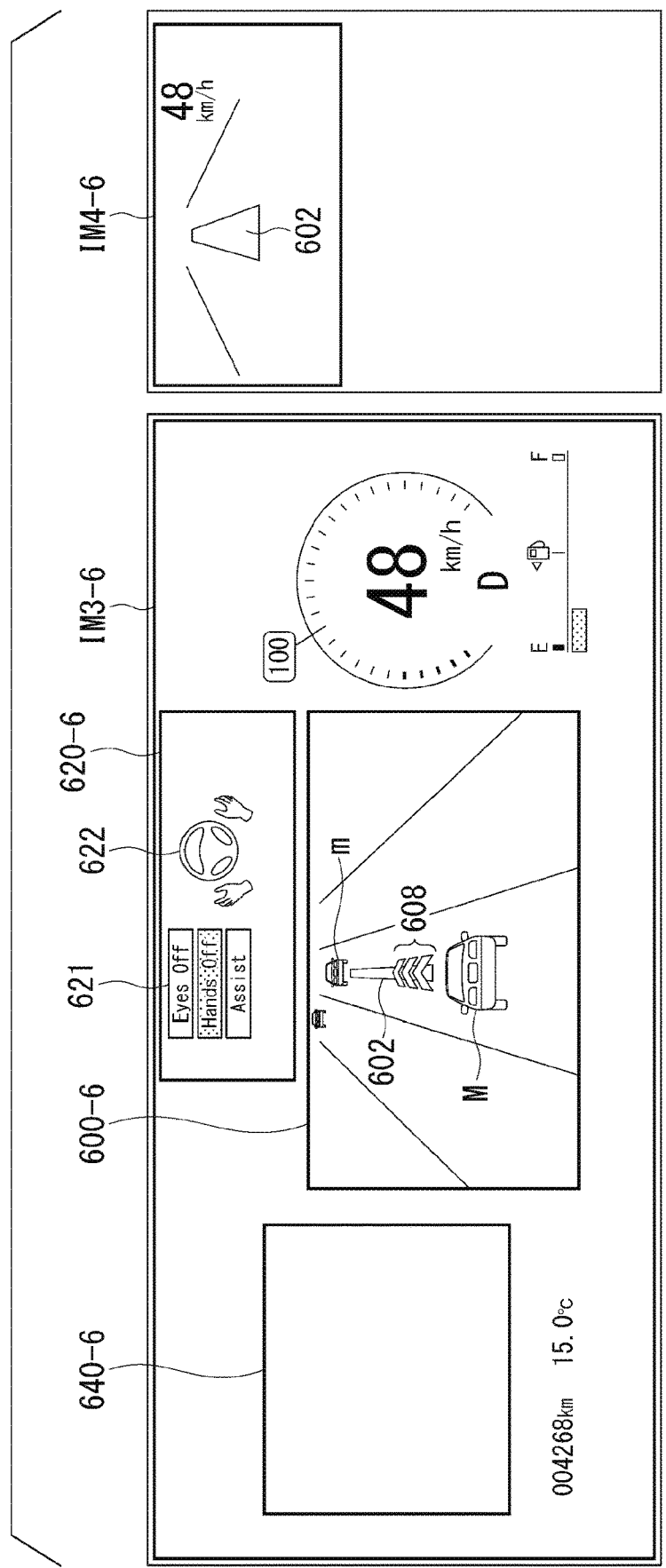
FIG. 23 is a diagram showing an example of a third screen IM3-6 and a fourth screen IM4-6 to be displayed at the time of acceleration control of the host vehicle M.

FIG. 23 is a diagram showing an example of a third screen IM3-6 and a fourth screen IM4-6 displayed at the time of the acceleration control of the host vehicle M. In the screen shown in FIG. 23, the activation condition of the low-speed following travel has not been yet satisfied. The HMI controller 120 causes an image 608 showing that the acceleration control is being executed to be displayed in a surroundings detection information display area 600-6 of the third screen IM3-6. The image 608 is a figure indicating the acceleration of the host vehicle M. The image 608 is displayed in front of the image showing the host vehicle M. In this case, the HMI controller 120 may cause the image 608 to be displayed in a display form in which an outer frame is given to the image 608 at a first timing before the host vehicle M accelerates and cause the image 608 to be displayed in a display form in which the inside of the outer frame of the image is colored at a second timing before the host vehicle M accelerates. Also, at the time of acceleration, the HMI controller 120 may cause an animation in which the image 608 moves to be displayed in the progress direction of the host vehicle. In contrast, at the time of a deceleration, the HMI controller 120 may cause an animation in which the image 608 moves toward the host vehicle to be displayed. Thereby, the occupant can intuitively ascertain that the acceleration control of the host vehicle M is being executed.

The HMI controller 120 causes information similar to that of the fourth screen IM4-5 to be displayed on the fourth screen IM4-6 of the HUD 460.

<Scene (5)>

In the scene (5), the low-speed following travel is executed. In this case, the HMI controller 120 displays a screen corresponding to the low-speed following travel on the first display 450 and the HUD 460.

Figure 24:
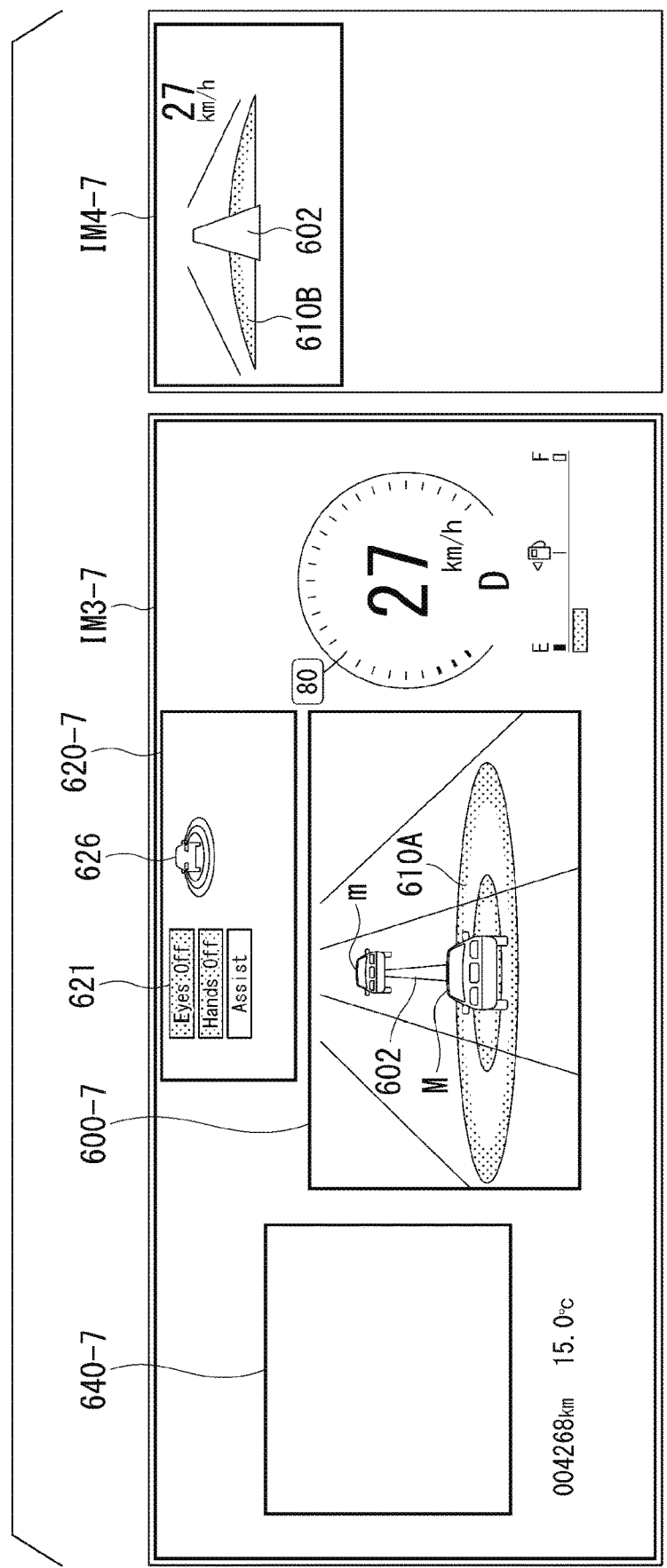
FIG. 24 is a diagram showing an example of a third screen IM3-7 and a fourth screen IM4-7 to be displayed at the time of low-speed following traveling.

FIG. 24 is a diagram showing an example of a third screen IM3-7 and a fourth screen IM4-7 displayed at the time of the low-speed following travel. The HMI controller 120 causes a surroundings detection image 610A indicating that the driving support of the third degree is being executed to be displayed in a surroundings detection information display area 600-7.

For example, the surroundings detection image 610A is an image showing that the monitoring of the surroundings of the host vehicle M is being performed by the camera 10, the radar device 12, the finder 14, the physical object recognition device 16, and the external environment recognizer 321. For example, the surroundings detection image 610A is an animation in which ripples spread outward from the center of the host vehicle M.

Also, the HMI controller 120 causes the images of the indicator "Eyes Off" indicating that no surroundings monitoring obligation is imposed on the occupant of the host vehicle M and the indicator "Hands Off" indicating that the operation on the driving operation element 80 is not requested to be highlighted and displayed in a driving support state display area 620-7 of the third screen IM3-7. Also, the HMI controller 120 causes an image 626 showing that the surroundings of the host vehicle M are being monitored by the camera 10, the radar device 12, the finder 14, the physical object recognition device 16, and the external environment recognizer 321 to be displayed in a driving support state display area 620-7.

Also, in addition to information similar to that of the fourth screen IM4-6, the HMI controller 120 causes a surroundings detection image 610B showing that the driving support of the third degree is being executed to be displayed on the fourth screen IM4-7 of the HUD 460. For example, the surroundings detection image 610B is an animation in which ripples spread outward from the center of the host vehicle M.

Also, the HMI controller 120 causes one or both of an action speed and an action period of the surroundings detection image 610A displayed on the third screen IM3-7 to be linked with the surroundings detection image 610B displayed on the fourth screen IM4-8. Thereby, it is possible to cause the occupant to intuitively ascertain that the surroundings detection image 610A displayed on the third screen IM3-7 and the surroundings detection image 610B displayed on the fourth screen IM4-8 are the same information.

Also, the HMI controller 120 may set a display form thinned out from a display form (a detailed display form) of the animation in the surroundings detection image 610A displayed on the third screen IM3-7 as a display form (a simple display form) of the surroundings detection image 610B displayed on the fourth screen IM4-8. For example, the HMI controller 120 sets a display form in which one or both of the action speed and the action period of a dynamic object (an annular ripple) of the surroundings detection image 610A displayed in the detailed display form are delayed as the simple display form.

Also, the HMI controller 120 may set a display form in which the number of the dynamic objects in the detailed display form is reduced as the simple display form.

Also, the HMI controller 120 may make a range of a field of view of an external environment displayed in the surroundings detection information display area 600-7 of the third screen IM3-7 in the detailed display form different from a range of a field of view of an external environment displayed on a fourth screen IM4-8 in the simple display form. The range of the field of view of the external environment is a range determined by a direction and a degree of zooming when the external environment is viewed from the occupant. For example, a size (for example, a maximum radius) of an annular dynamic object corresponds to a range of a field of view of an external environment in each image.

Also, in a state in which no surroundings monitoring obligation is imposed on the occupant, the HMI controller 120 performs control for notifying the occupant of usable equipment. For example, when the automated driving controller 300 is executing the driving support of the third degree, the third display 470 is set to be usable. In this case, as shown in FIG. 7 or FIG. 8, the HMI controller 120 causes the light emitter 472 provided in a part of the third display 470 or in the vicinity thereof to emit light in a predetermined color.

Also, when the third display 470 is usable, the HMI controller 120 may cause the first display area 476 among the display areas of the screen in the third display 470 to be displayed in one or both of a predetermined color and a predetermined shape as shown in FIG. 9.

Also, when it is necessary to operate the third operation element 440 for performing selection of details to be displayed on the third display 470 or the like, the HMI controller 120 controls the light emitter 446 provided in the third operation element 440 so that light is emitted in a predetermined color. For example, the HMI controller 120 causes the light emitter 472 and the light emitter 446 to emit light in the same color. Thereby, the occupant may intuitively ascertain the usable equipment and an operation element of the equipment.

For example, when the third operation element 440 is operated in a state in which the third display 470 is usable, the HMI controller 120 causes a screen corresponding to operation details to be displayed on the third display 470. Also, when the operation switch 422 of the second operation element 420 is operated in a state in which the third display 470 is usable, the HMI controller 120 causes an image of a communication partner to be displayed on the third display 470. Thereby, the occupant may enjoy the communication while watching the communication partner displayed on the third display 470. That is, the occupant may use the video phone.

Also, the HMI controller 120 associates an image captured by the vehicle interior camera 90 and a sound of the occupant acquired by a microphone (not shown) provided in a vehicle and transmits the image and the sound to a vehicle or a terminal device of the communication partner.

For example, an imaging element included in the vehicle interior camera 90 has sensitivity in wavelength ranges of infrared light and visible light. The vehicle interior camera 90 may include a lens filter that blocks infrared light and transmits visible light in a direction of the imaging element. Under the control of the HMI controller 120, the lens filter is controlled so that the lens filter is at a position where the infrared light entering the vehicle interior camera 90 is blocked (a set position) or a position where the infrared light is not blocked (an unset position) by operating a mechanical mechanism. For example, the HMI controller 120 controls the lens filter so that the lens filter is at the set position when the image is used in the video phone. The HMI controller controls the lens filter so that the lens filter is at the unset position when the image is used for monitoring the occupant. Thereby, an image captured by only the visible light is used in the video phone and an image captured by the visible light and the infrared light is used for monitoring the occupant. Thereby, an image suitable for a field of application is acquired. In particular, when the image is used in the video phone, an image that does not have disharmony is transmitted to a device of the communication partner or the like.

Also, instead of the vehicle interior camera 90, a camera dedicated to a video phone may be provided in the host vehicle M. In this case, the HMI controller 120 associates an image captured by the camera dedicated to the video phone and a sound acquired by the microphone and transmits the image and the sound to a vehicle or a terminal device of the communication partner.

<Scene (6)>

In the scene (6), because there is no preceding traveling vehicle m that the host vehicle M follows at a low speed, the automated driving controller 300 switches the host vehicle M from the driving support of the third degree to the driving support of the second degree. In this case, as shown in FIG. 25, the HMI controller 120 causes information indicating a target to be monitored or operated by the occupant to be displayed on one or both of the first display 450 and the HUD 460 on the basis of the change in the degree of the driving support.

Figure 25:
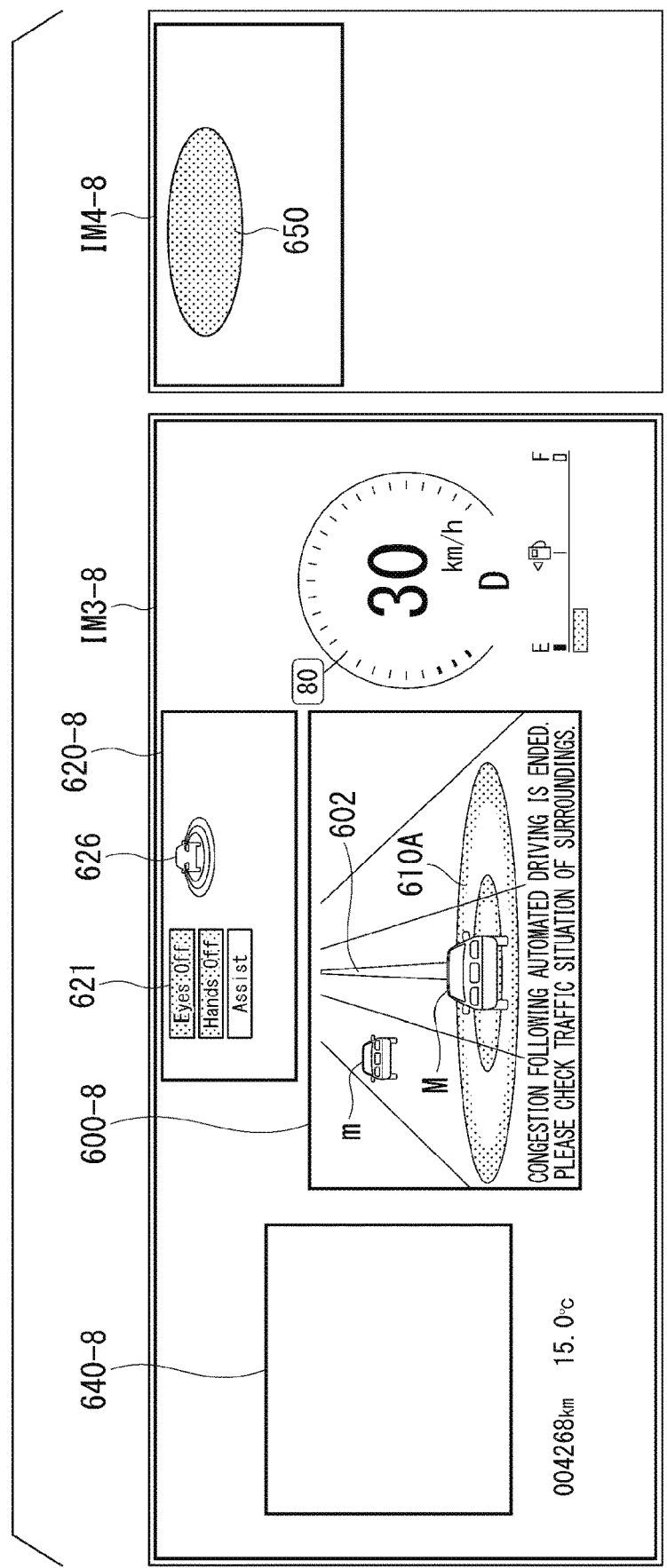
FIG. 25 is a diagram showing an example of a third screen IM3-8 and a fourth screen IM4-8 to be displayed for requesting an occupant to monitor surroundings.

FIG. 25 is a diagram showing an example of a third screen IM3-8 and a fourth screen IM4-8 displayed for requesting the occupant to perform the surroundings monitoring. The HMI controller 120 causes information indicating that the low-speed following travel ("congestion following automated driving" in FIG. 25) is ended and information for causing the occupant to check the traffic situation of the surroundings to be displayed in a surroundings detection information display area 600-8.

Also, the HMI controller 120 causes a forward line-of-sight request image 650 for requesting the line of sight of the occupant to be in front of the host vehicle M to be displayed on the fourth screen IM4-8. The forward line-of-sight request image 650 is an image including an elliptical area showing a predetermined area in front of the vehicle M. Also, the forward line-of-sight request image 650 may be a predetermined shape such as a circle or a quadrangle or may be information such as a mark or a symbol character for prompting the occupant to pay attention. Also, the HMI controller 120 causes the forward line-of-sight request image 650 to be turned on or blinked in a predetermined color. Also, the HMI controller 120 may prompt the occupant to look forward by causing an LED incorporated in the instrument panel to be turned on and causing light emitted from the LED to be reflected on the front windshield.

Figure 26:
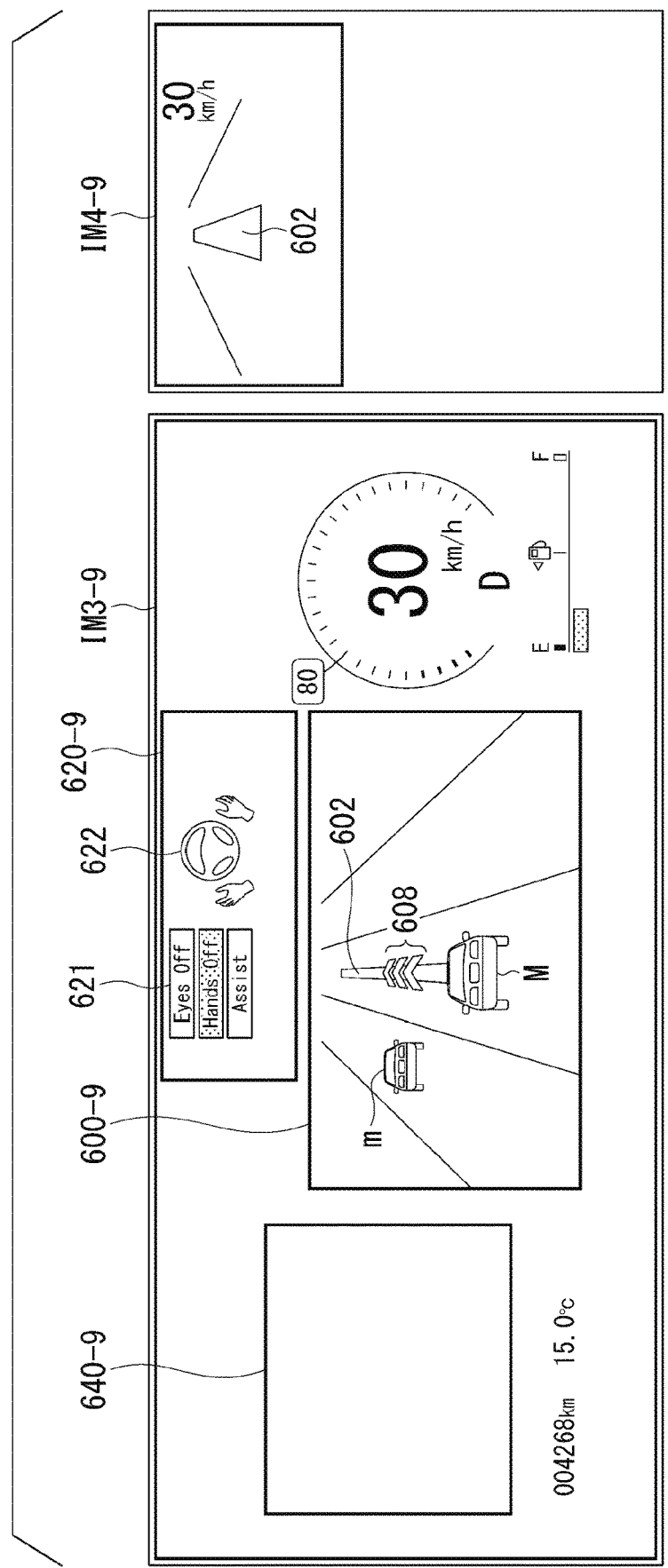
FIG. 26 is a diagram showing an example of a third screen IM3-9 and a fourth screen IM4-9 when the driving support is switched from the third degree to the second degree.

The occupant state monitor 140 determines whether or not the occupant is monitoring the surroundings by means of the captured image of the vehicle interior camera 90. When it is determined that the occupant is monitoring the surroundings, the switching controller 110 causes the automated driving controller 300 to switch the driving support of the host vehicle M from the third degree to the second degree. As shown in FIG. 26, the HMI controller 120 causes a screen corresponding to the driving support of the second degree to be displayed on one or both of the first display 450 and the HUD 460.

FIG. 26 is a diagram showing an example of a third screen IM3-9 and a fourth screen IM4-9 displayed when the driving support is switched from the third degree to the second degree. In the example of FIG. 26, an example in which the host vehicle M accelerates to a target speed (for example, 80 [km/h]) set by the action plan generator 323 according to the driving support of the second degree is shown. For example, the HMI controller 120 causes an image 608 showing that the acceleration control is being executed to be displayed in a surroundings detection information display area 600-9 of the third screen IM3-9.

Also, the HMI controller 120 causes the indicator for "Hands Off" corresponding to the driving support of the second degree of the host vehicle M to be highlighted and displayed in a driving support state display area 620-9 of the third screen IM3-9. Also, the HMI controller 120 causes the requested action notification image 622 showing operation details of the occupant corresponding to the driving support of the second degree to be displayed in the driving support state display area 620-9. Thereby, the occupant may intuitively ascertain that the driving support of the host vehicle M is switched from the third degree to the second degree.

<Process Flow Corresponding to Scenes (4) to (6)>

Figure 27:
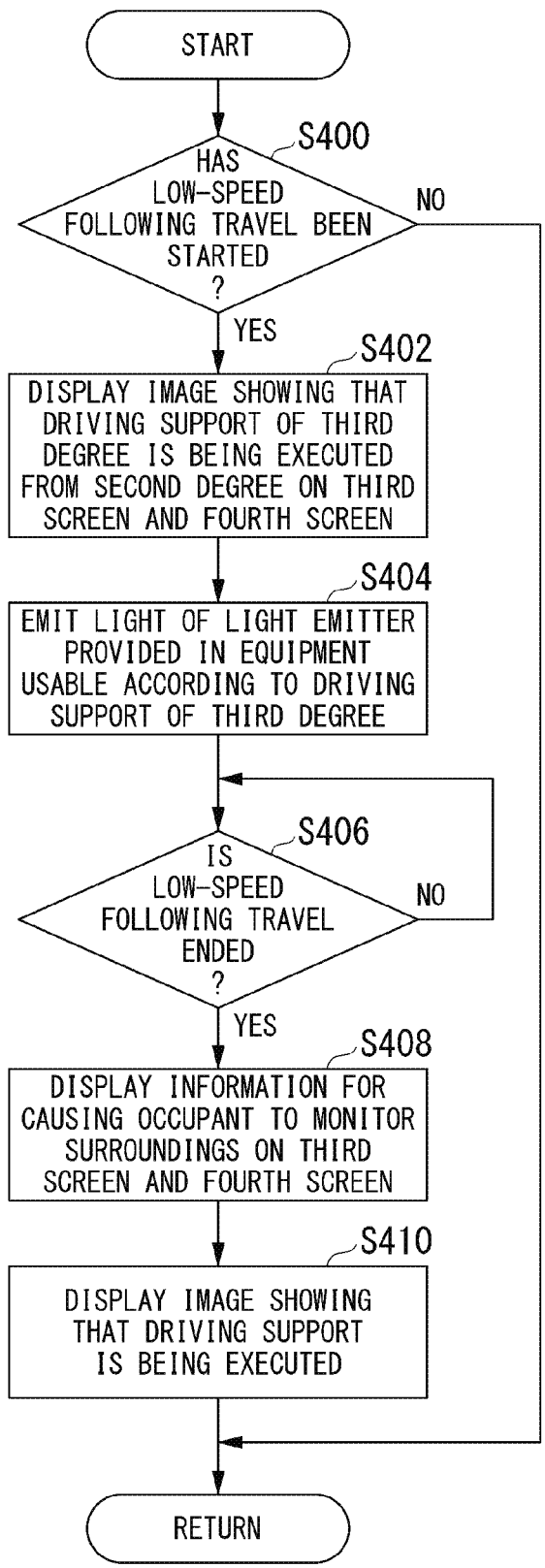
FIG. 27 is a flowchart showing an example of a flow of a process to be executed by the HMI controller 120 in scenes (4) to (6).

FIG. 27 is a flowchart showing an example of a flow of a process to be executed by the HMI controller 120 in the scenes (4) to (6). First, the HMI controller 120 determines whether or not the automated driving controller 300 has started the low-speed following travel (step S400). When the low-speed following travel has been started, the HMI controller 120 displays an image showing that the driving support of the third degree is being executed on a third screen IM3 and a fourth screen IM4 (step S402). Next, the HMI controller 120 causes a light emitter provided in equipment that is usable by the driving support of the third degree to emit light (step S404).

Next, the HMI controller 120 determines whether or not the automated driving controller 300 has ended the low-speed following travel of the host vehicle (step S406). When the low-speed following travel has not been ended, the image display and the light emission of the light emitter are continued by the processing of steps S402 and S404. That is, in the process of step S404, the HMI controller 120 causes the light emission of the light emitter provided in the equipment to be continued while the equipment is usable.

When the low-speed following travel has been ended, the HMI controller 120 displays information for causing the occupant to monitor the surroundings on the third screen IM3 and the fourth screen IM4 (step S408). Next, the HMI controller 120 displays an image showing that the driving support of the second degree is being executed (step S410). Thereby, the process of the present flowchart is ended.

Also, as shown in the scenes (4) to (6), when the vehicle has not been stopped or when the degree of driving support is not the third degree, the HMI controller 120 applies a use restriction on a specific function that causes the line of sight of the occupant to be removed from the surroundings of the vehicle due to the use of the specific function. When the vehicle has been stopped or when the degree of driving support is the third degree, the HMI controller 120 cancels the use restriction on the specific function. The specific function includes, for example, a video phone function, and is a function of displaying content that is not related to the control or the travel of the host vehicle M on the third display 470. The content that is not related to the control or the travel of the host vehicle M is, for example, an image stored in a DVD watched by the occupant as entertainment, an image transmitted from a broadcasting station (an image of a television), an image showing a communication partner in a video phone, or the like.

Figure 28:
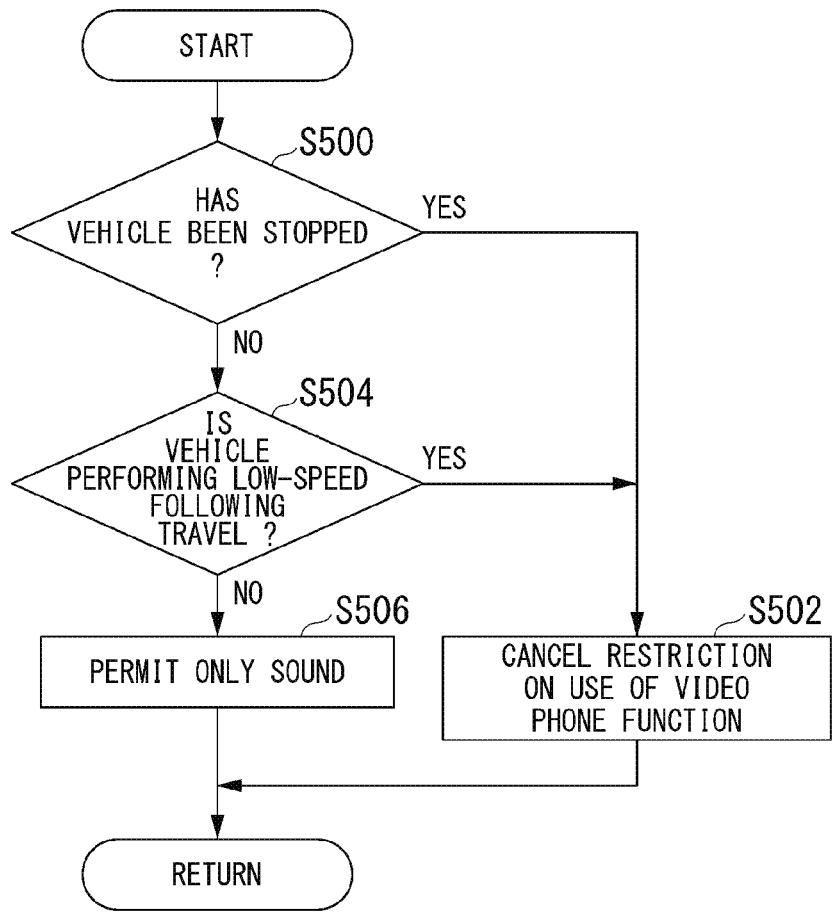
FIG. 28 is a flowchart showing a flow of a process of executing a specific function in an HMI controller 120.

FIG. 28 is a flowchart showing a flow of an execution process of the specific function by the HMI controller 120. In the process of the present flowchart, the specific function will be described as a video phone function. The video phone function is a function of transmitting and receiving an image (a real-time image) and a sound to perform communication while viewing an image showing the communication partner. The image of the communication partner is displayed on the third display 470. Also, the HMI controller 120 controls the communication device 20 so that the communication device 20 establishes communication with a communication device of the communication partner, thereby transmitting and receiving information including the image and the sound to implement the video phone function.

First, the HMI controller 120 determines whether or not the host vehicle M has been stopped on the basis of information acquired from the driving support controller 200 and the automated driving controller 300 (step S500). When the host vehicle M has been stopped, the HMI controller 120 cancels the use restriction on the video phone function (step S502). Therefore, the occupant may use the video phone function.

When the host vehicle M has not been stopped, the HMI controller 120 determines whether or not the host vehicle M is performing the low-speed following travel on the basis of the information acquired from the automated driving controller 300 (step S504). When the host vehicle M is performing the low-speed following travel, the HMI controller 120 cancels the use restriction on the video phone function (step S502). Thereby, the occupant can use the video phone function.

When the host vehicle has not been stopped and is not performing the low-speed following travel, the HMI controller 120 permits the use of only a sound (step S506). Thereby, a process of one routine of the present flowchart is ended.

Figure 29:
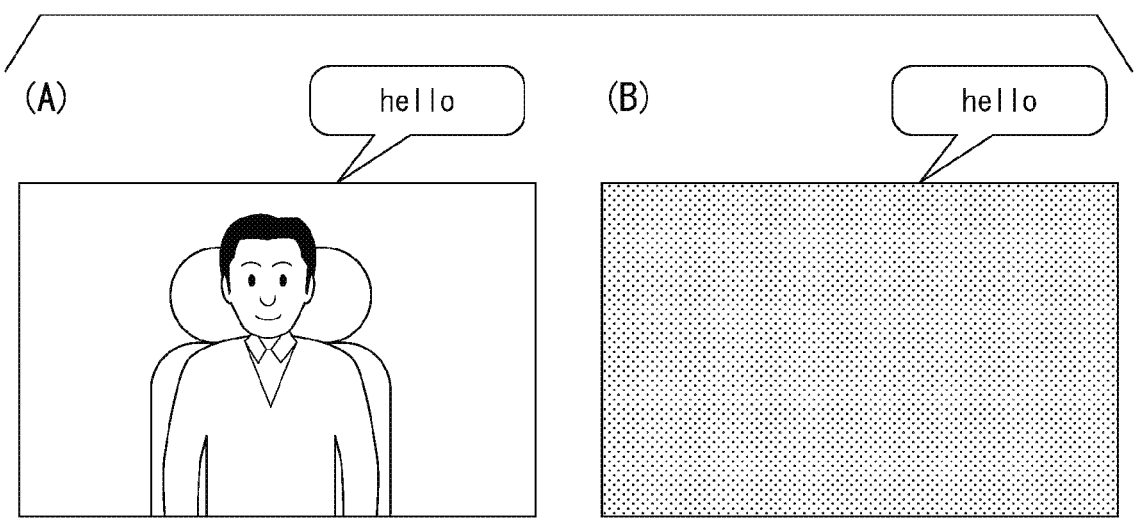
FIG. 29 is a diagram showing an example of a state in which an image displayed on the third display 470 is changed according to a degree of driving.

FIG. 29 is a diagram showing an example of a state in which an image displayed on the third display 470 is changed according to a degree of driving support. As shown (A) in FIG. 29, for example, when the driving support of the third degree is being executed, the image of the communication partner is displayed on the third display 470 and the sound of the communication partner is output from the speaker. Thereby, the occupant can use the video phone function. On the other hand, as shown (B) in FIG. 29, for example, when the driving support has transitioned from the driving support of the third degree to the driving support of another degree or the manual driving, the image of the communication partner displayed on the third display 470 is stopped and only the sound of the communication partner is output from the speaker. Thereby, the occupant can monitor the surroundings of the host vehicle M.

As described above, when the driving support transitions to the third degree and the occupant of the host vehicle M is not required to monitor the surroundings (when a time T4 of FIG. 37 to be described below has been reached), the HMI controller 120 can cancel the use restriction on the specific function to more appropriately control the specific function.

Figure 30:
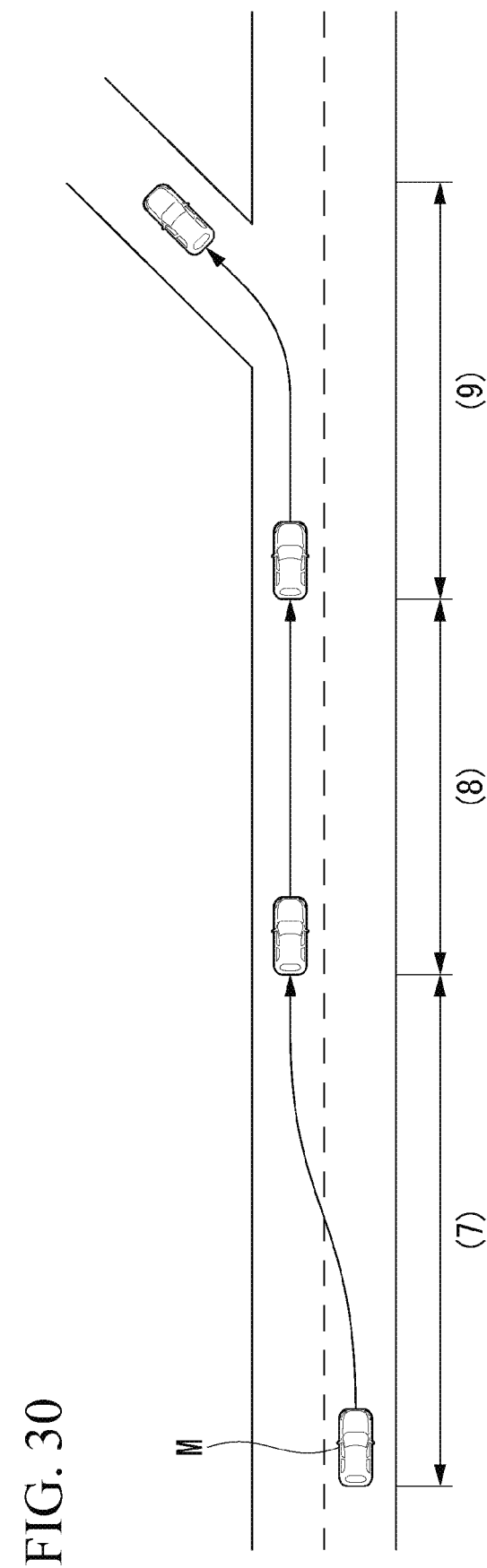
FIG. 30 is a diagram showing various types of scenes until the host vehicle M is switched from the driving support of the second degree to traveling of manual driving.

Next, scenes (7) to (9) will be described. FIG. 30 is a diagram showing various types of scenes until the host vehicle M is switched from the driving support of the second degree to the travel according to the manual driving. In an example of FIG. 30, the scene (7) is a scene in which the host vehicle M performs the lane change for leaving an expressway on the basis of the action plan. The scene (8) is a scene in which the host vehicle M is switched from the automated driving to the manual driving. The scene (9) is a scene in which the host vehicle M moves from the expressway to the general road according to the manual driving. Hereinafter, display control corresponding to each of the scenes (7) to (9) will be described.

<Scene (7)>

In the scene (7), the automated driving controller 300 executes driving support for enabling the host vehicle M to perform a lane change to the left side. In this case, the HMI controller 120 displays an image corresponding to the driving support on one or both of the first display 450 and the HUD 460. Also, because similar display is performed by replacing details of the lane change of the host vehicle M to the right lane shown in FIGS. 17 and 18 with the lane change to the left lane with respect to a display example at the time of the start or execution of the lane change, a detailed description thereof will be omitted.

<Scene (8)>

In the scene (8), the automated driving controller 300 performs control for switching the host vehicle M to the manual driving. In this case, the HMI controller 120 displays an image for causing the occupant to execute the manual driving on one or both of the first display 450 and the HUD 460.

Figure 31:
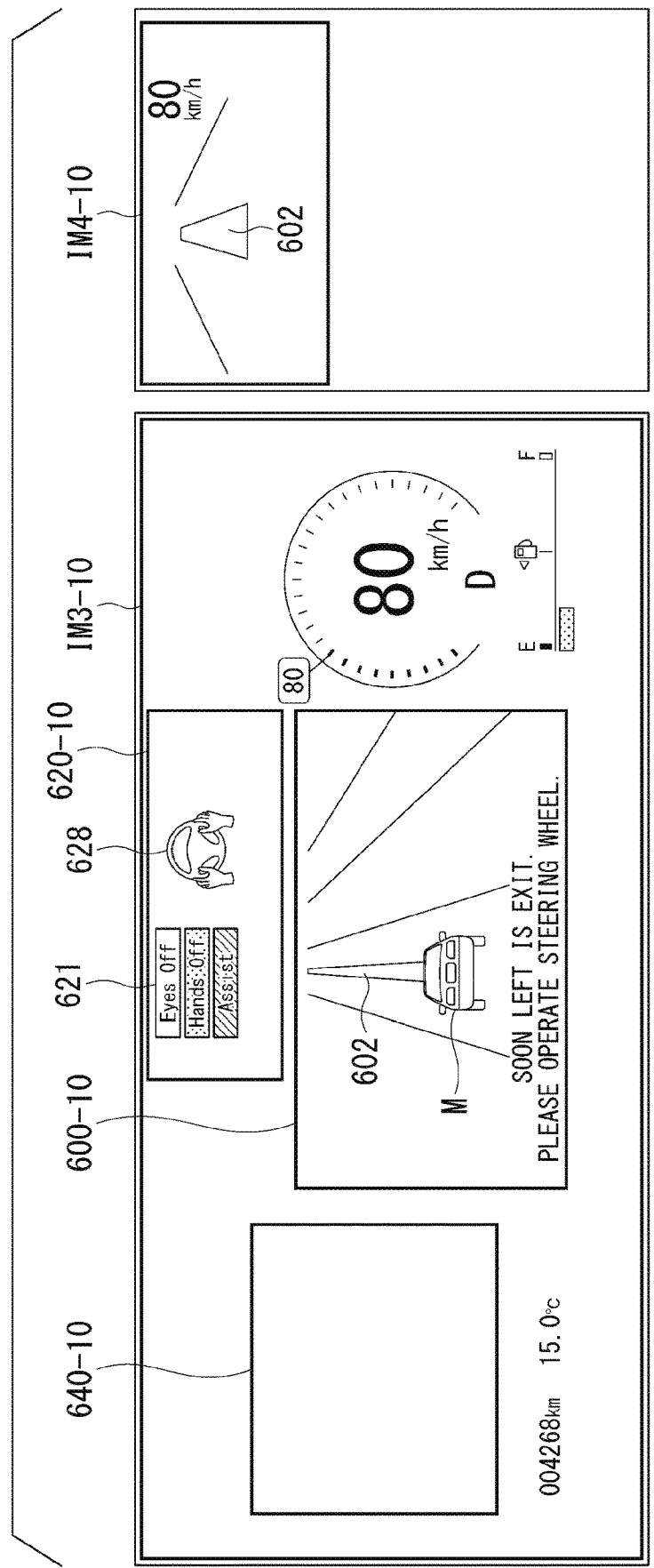
FIG. 31 is a diagram showing an example of a third screen IM3-1 and a fourth screen IM4-10 to be displayed at the time of a request for switching to a manual driving time.

FIG. 31 is a diagram showing an example of a third screen IM3-10 and a fourth screen IM4-10 displayed at the time of the request for switching the host vehicle to the manual driving. Because an exit of the expressway is approaching, the HMI controller 120 causes a requested action notification image 628 for requesting the occupant to operate the steering wheel 82 to be displayed in a surroundings detection information display area 600-10 of the third screen IM3-10. Also, the HMI controller 120 may cause an animation in which an image showing the hands of the occupant is approaching to an image showing the steering wheel 82 to be displayed as the requested action notification image 628.

Also, the HMI controller 120 causes an image of "Hands Off" corresponding to the driving support of the second degree and an image of "Assist" corresponding to the driving support of the first degree to be highlighted and displayed to be displayed in a driving support state display area 620-10 of the third screen IM3-10.

Here, the HMI controller 120 determines whether or not the occupant is gripping the steering wheel 82 on the basis of a determination result of the operation element state determiner 130. When the operation element state determiner 130 determines that the occupant is not gripping the steering wheel 82 continuously for a predetermined period of time, the HMI controller 120 causes an image for strengthening the warning step by step and causing the occupant to execute the manual driving to be displayed on one or both of the first display 450 and the HUD 460.

Figure 32:
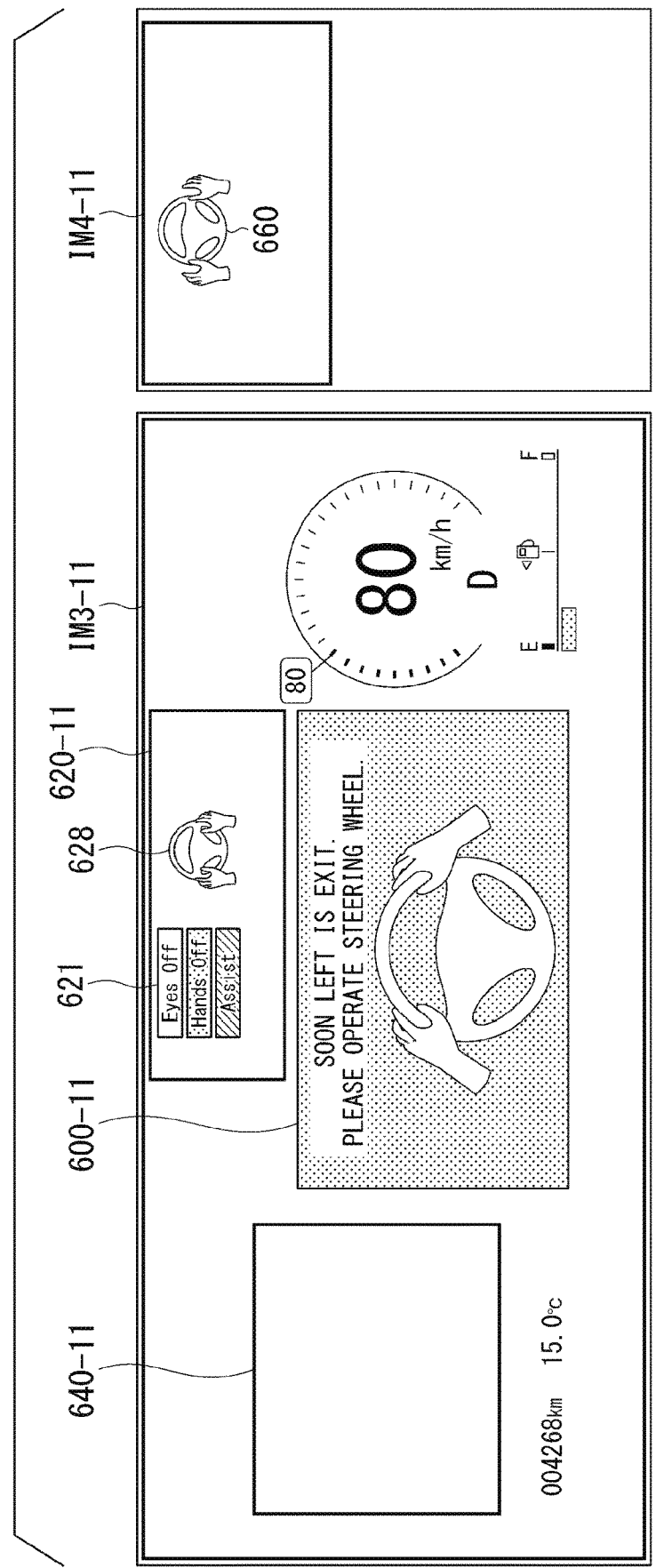
FIG. 32 is a diagram showing an example of a third screen IM3-11 and a fourth screen IM4-11 in which a warning for causing the occupant to execute manual driving is strengthened.

FIG. 32 is a diagram showing an example of a third screen IM3-11 and a fourth screen IM4-11 for strengthening the warning for causing the occupant to execute the manual driving. For example, the HMI controller 120 causes information indicating a target to be monitored or operated by the occupant to be displayed in a driving support state display area 600-11 of the third screen IM3-11 so that the information is more emphasized than the display of the surroundings situation of the host vehicle M. Specifically, instead of an image showing a road shape in front of the host vehicle M, an image showing the host vehicle M, and an image showing a future trajectory of the host vehicle M, the HMI controller 120 causes information indicating that the occupant operates the steering wheel 82 to be superimposed and displayed in the driving support state display area 600-11 of the third screen IM3-11.

Also, the HMI controller 120 causes a requested action notification image 660 schematically showing a positional relationship between the steering wheel 82 and the hands of the occupant to be displayed on the fourth screen IM4-11. The HMI controller 120 may cause an animation in which an image showing the hands of the occupant approaches an image showing the steering wheel 82 so that the hands of the occupant grip the steering wheel 82 to be displayed as the requested action notification image 660. Also, the HMI controller 120 may issue a warning by sound or the like to cause the occupant to grip the steering wheel 82.

Also, the HMI controller 120 causes the light emitters 430R and 430L provided in the steering wheel 82 to emit light, blink, or stop the light emission so as to cause the occupant to grip the steering wheel 82. Thereby, the occupant may easily recognize details required for the occupant according to a change in the degree of driving support.

Also, for example, when the occupant is requested to grip the steering wheel 82 in a state in which the light emitters 430R and 430L emit light and blink in accordance with the degree of driving support of the host vehicle M, the HMI controller 120 makes the light emission state of the light emitters 430R and 430L different from the current light emission state. For example, the HMI controller 120 makes at least one of light emission, blinking, a light emission color, and light emission luminance of the light emitters 430R and 430L different from the current light emission state.

Also, when the degree of driving support changes to a degree lower than the degree of current driving support, the HMI controller 120 causes the light emitters 430R and 430L to emit light, blink, or stop the light emission. Thereby, it is possible to notify the occupant that the driving support is driving support in which it is highly necessary to grip the steering wheel 82.

Also, when the operation element state determiner 130 determines that the occupant is not gripping the steering wheel 82 continuously for a predetermined time, the HMI controller 120 may cause the speaker to output a sound by strengthening the warning step by step. Also, the HMI controller 120 may cause a vibrator for vibrating the seat or the seat belt to be operated and issue a warning by vibrating the seat or the seat belt with stepwise strength.

Figure 33:
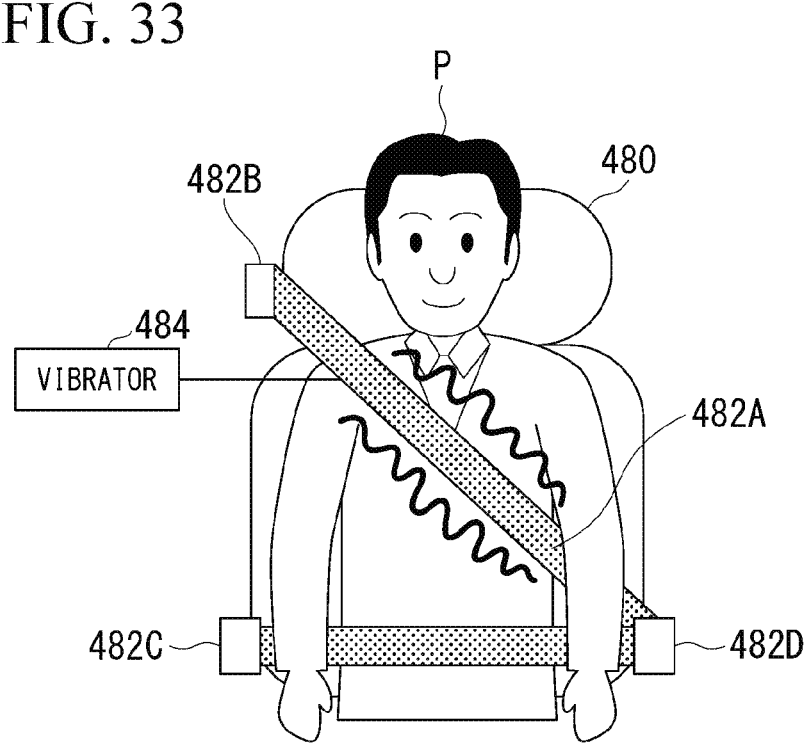
FIG. 33 is a diagram showing the issuance of a warning to the occupant by vibrating a seat belt.

FIG. 33 is a diagram showing the issuance of a warning to the occupant by vibrating the seat belt. In FIG. 31, for example, a seat 480 of the host vehicle M, a seat belt device 482, and a vibrator 484 are provided. The seat belt device 482 is a so-called three-point seat belt device. For example, the seat belt device 482 may include a seat belt 482A, a winding portion 482B for winding up the seat belt 482A, an anchor 482C for fixing the seat belt 482A at a predetermined position on the seat 480, and a buckle 482D detachable from a tongue provided on the seat belt 482A. The vibrator 484 vibrates the seat belt at predetermined time intervals and with predetermined strength according to control of the HMI controller 120.

The HMI controller 120 causes the vibrator 484 to be operated at a timing for causing the occupant to grip the steering wheel 82. Thereby, the occupant can intuitively ascertain that the manual driving is started by gripping the steering wheel 82.

Figure 34:
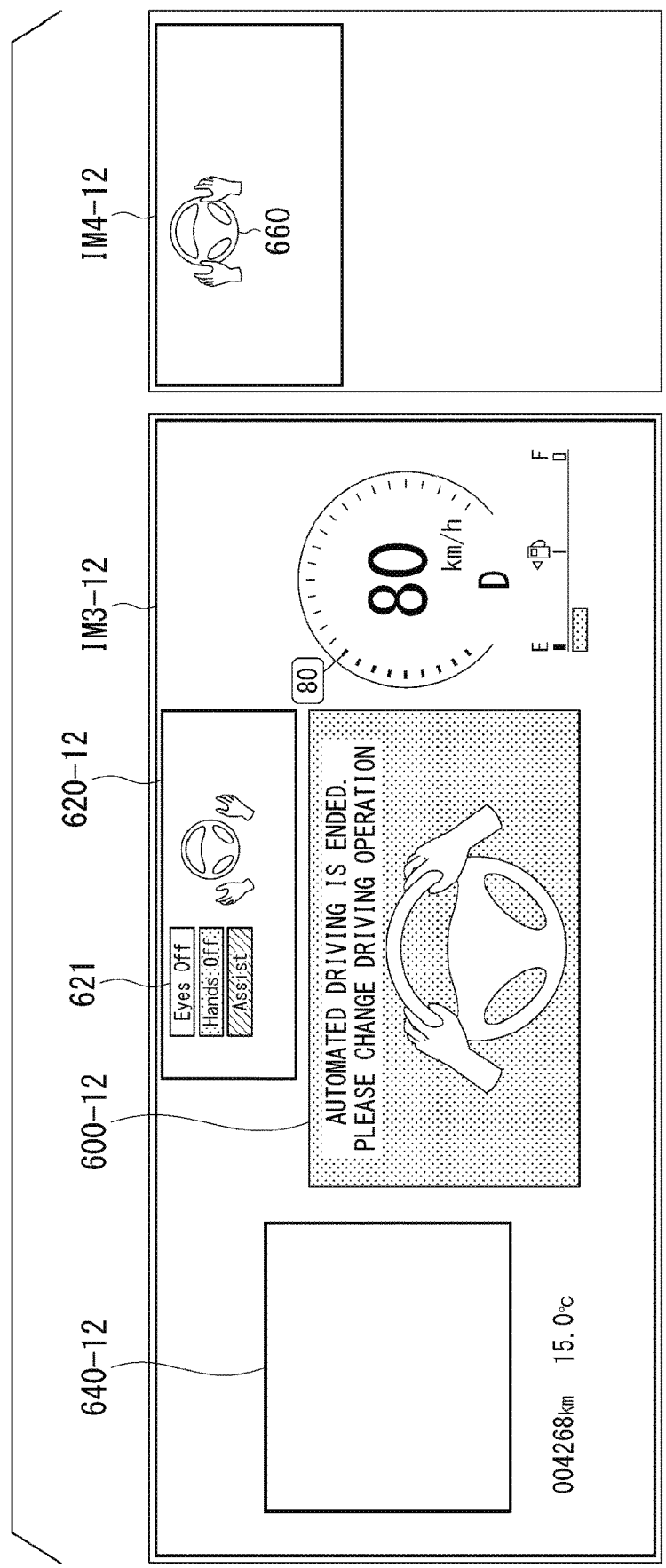
FIG. 34 is a diagram showing an example of a third screen IM3-12 and a fourth screen IM4-12 for displaying information indicating that automated driving is ended.

Also, when the operation element state determiner 130 determines that the occupant is not gripping the steering wheel 82 even when a predetermined period of time has elapsed after the HMI controller 120 performs the display shown in FIG. 32, the HMI controller 120 displays a screen for indicating that the driving support (for example, the automated driving) is ended as shown in FIG. 34.

FIG. 34 is a diagram showing an example of a third screen IM3-12 and a fourth screen IM4-12 that display information indicating that the automated driving is ended. The HMI controller 120 causes information for prompting the occupant to change the driving operation for ending the automated driving to be displayed in a driving support state display area 600-12 of the third screen IM3-12 so that the information is superimposed on an image showing a road shape in front of the host vehicle M, an image showing the host vehicle M, and an image showing a future trajectory of the host vehicle M. Also, the HMI controller 120 causes an image of "Hands Off" to be highlighted and displayed in a driving support state display area 620-12 of the third screen IM3-12, but may cause the image to be highlighted and displayed in a color or the like different from that highlighted and displayed shown in FIG. 29.

Also, the HMI controller 120 causes the requested action notification image 660 schematically showing a positional relationship between the steering wheel 82 and the hands of the occupant to be displayed on the fourth screen IM4-12. Also, the HMI controller 120 may issue a warning using a strong sound or the like as compared with the display on the third screen IM3-11 and the fourth screen IM4-12 shown in FIG. 30 in order to cause the occupant to grip the steering wheel 82. Also, the HMI controller 120 may cause the light emitters 430R and 430L to be turned on or blinked in order to cause the occupant to grip the steering wheel 82. For example, the HMI controller 120 shortens a blinking period or causes the light emitters 430R and 430L to be turned on or blinked in a plurality of colors in order to strengthen the warning.

Also, for example, the HMI controller 120 may cause the vibrator 484 to operate at a timing at which the third screen IM3-12 is displayed on the first display 450 and the fourth screen IM4-12 is displayed on the HUD 460 to vibrate the seat belt 482A. In this case, the HMI controller 120 may cause the vibrator 484 to be operated so that the vibration is stronger than the vibration of the seat belt 482A when the images are displayed on the third screen IM3-11 and the fourth screen IM4-11. Thereby, the occupant may intuitively ascertain that the automated driving is ended.

Also, when the operation element state determiner 130 determines that the occupant is not gripping the steering wheel 82 even when a predetermined period of time has elapsed after the HMI controller 120 performs the display shown in FIG. 32, the master controller 100 causes the automated driving controller 300 to execute the automated driving for emergently stopping the host vehicle M at a predetermined position (for example, a road shoulder or a nearest parking area). In this case, as shown in FIG. 35, the HMI controller 120 causes a screen indicating that the emergency stop of the host vehicle M is executed by the automated driving to be displayed on a third screen IM3-13.

Figure 35:
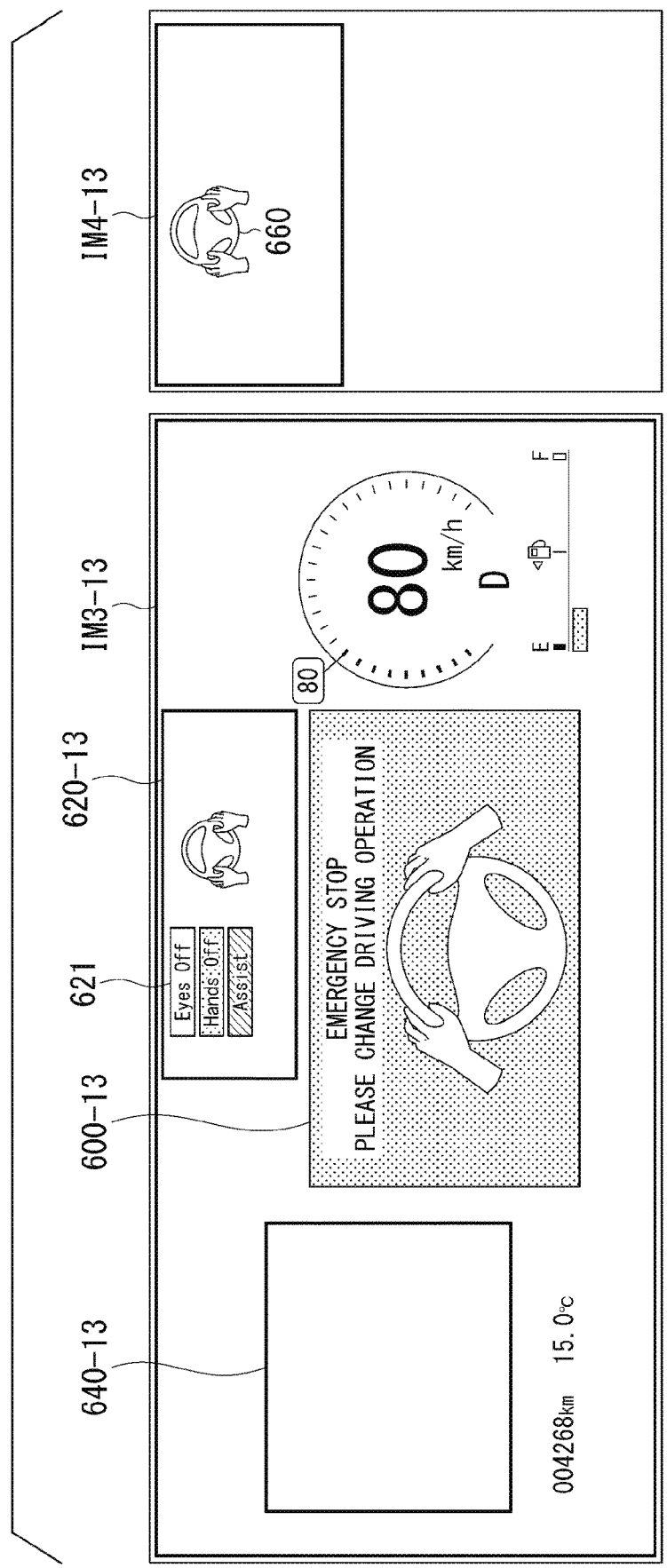
FIG. 35 is a diagram showing an example of a third screen IM3-13 and a fourth screen IM4-13 at the time of an emergency stop of the host vehicle M.

FIG. 35 is a diagram showing an example of a third screen IM3-13 and a fourth screen IM4-13 at the time of the emergency stop of the host vehicle M. The HMI controller 120 causes information indicating that an emergency stop is performed to be displayed in a driving support state display area 600-13 of the third screen IM3-13. Also, a notification of a form of the third screen IM3-13 has a stronger warning than notifications of forms of the third screens IM3-10 to IM3-12.

<Scene (9)>

In the scene (9), the occupant receives an instruction for causing the occupant to grip the steering wheel 82, the occupant grips the steering wheel 82 until the driving support is ended, the manual driving is started, and the host vehicle M enters the general road from the expressway. The switching controller 110 switches the driving state of the host vehicle M to a state in which the occupant performs manual driving of the host vehicle M. The HMI controller 120 causes the first screen IM1-1 to be displayed on the first display 450 and causes the second screen IM1-2 to be displayed on the HUD 460.

<Process Flow Corresponding to Scenes (7) to (9)>

Figure 36:
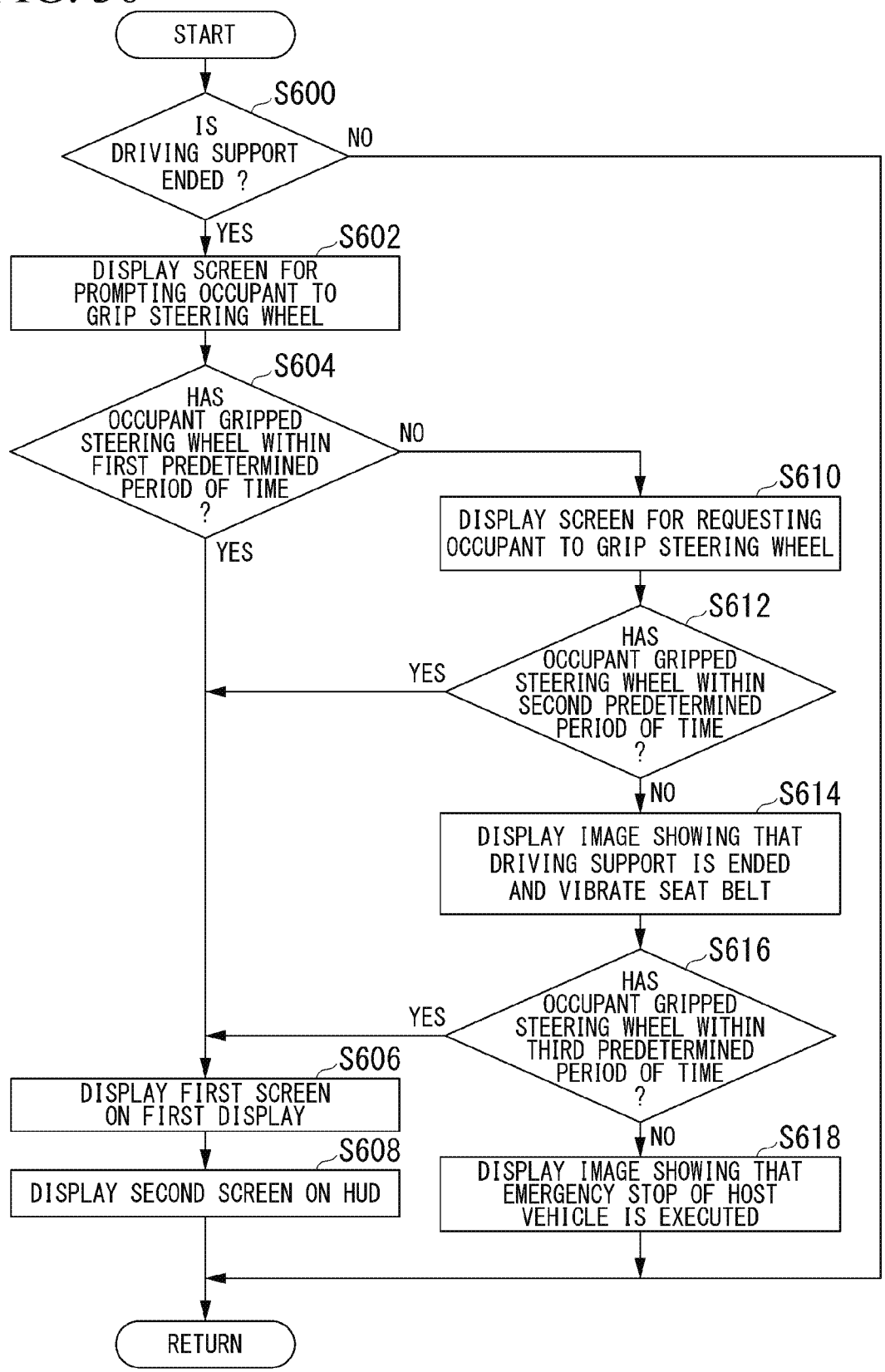
FIG. 36 is a flowchart showing an example of a flow of a process to be executed by the HMI controller 120 in scenes (7) to (9).

FIG. 36 is a flowchart showing an example of a flow of a process to be executed by the HMI controller 120 in the scenes (7) to (9). In the present process, as described above, when the automated driving is being executed, the HMI controller 120 provides a notification for requesting the occupant of the host vehicle M to perform a predetermined action (for example, the grip of the steering wheel 82) and causes the outputter to output the notification by changing a notification form so that the notification is emphasized step by step according to the passage of time from the start of the notification. The outputter is a display that displays an image, a speaker that outputs a sound, or the like. Also, in the present process, the predetermined action is the grip of the steering wheel 82 as an example, but, instead of (in addition to) the grip of the steering wheel 82, the predetermined action may be an action in which the occupant monitors the surroundings, an action in which the occupant puts the foot on the driving operation element 80 so that the occupant can operate the driving operation element 80 (for example, the accelerator pedal or the brake pedal), or the like.

First, the HMI controller 120 determines whether or not the driving support is ended (step S600). When the driving support is ended, the HMI controller 120 causes the image for prompting the occupant to grip the steering wheel 82 (for example, the screen IM3-10) in a state in which an image showing a trajectory along which the host vehicle M travels is maintained to be displayed on the first display 450 (step S602). The display of the image for prompting the occupant to grip the steering wheel 82 is an example of a "notification of a first step".

Next, the HMI controller 120 determines whether or not the occupant has gripped the steering wheel 82 within a first predetermined period of time from a determination result of the operation element state determiner 130 (step S604).

When it is determined that the occupant has gripped the steering wheel 82 within the first predetermined period of time, the HMI controller 120 causes a first screen IM1 to be displayed on the first display 450 (step S606) and causes a second screen IM2 to be displayed on the HUD 460 (step S608).

Also, when it is determined that the occupant has not gripped the steering wheel 82 within the first predetermined period of time in step S604, the HMI controller 120 causes the image for requesting the occupant to grip the steering wheel 82 (for example, the screen IM3-11) to be displayed on the first display 450 instead of an icon indicating the trajectory along which the host vehicle M travels (step S610). The image displayed in step S610 is an example of a "notification of a second step".

Next, the HMI controller 120 determines whether or not the occupant has gripped the steering wheel 82 within a second predetermined period of time from the determination result of the operation element state determiner 130 (step S612). When it is determined that the occupant has gripped the steering wheel 82 within the second predetermined period of time, the HMI controller 120 causes the first screen IM1 to be displayed on the first display 450 (step S606) and causes the second screen IM2 to be displayed on the HUD 460 (step S608).

In step S612, when it is determined that the occupant has not gripped the steering wheel 82 within the second predetermined period of time, the HMI controller 120 causes the image showing that the driving support is ended (for example, the third screen IM3-12) to be displayed on the first display 450 (step S614). Also, at this time, the HMI controller 120 causes the vibrator 484 for vibrating the seat belt 482A to be operated as a notification of a third step. Also, in the embodiment, the seat 480 may be provided with a vibrator that vibrates the seat 480. In this case, when it is determined that the occupant has not gripped the steering wheel 82 within the second predetermined period of time, the HMI controller 120 may cause the vibrator provided in the seat 480 to be operated.

Next, the HMI controller 120 determines whether or not the occupant has gripped the steering wheel 82 within a third predetermined period of time from a determination result of the operation element state determiner 130 (step S616). When it is determined that the occupant has gripped the steering wheel 82 within the third predetermined period of time, the HMI controller 120 causes the first screen IM1 to be displayed on the first display 450 (step S606) and causes the second screen IM2 to be displayed on the HUD 460 (step S608).

When it is determined that the occupant has not gripped the steering wheel 82 within the third predetermined period of time in step S616, the HMI controller 120 displays an image showing that the emergency stop of the host vehicle M is executed on the first display 450 (step S618). Thereby, the process of the present flowchart is ended.

<Switching Timings of Various Types of Equipment or Control Related to Driving Support>

Figure 37:
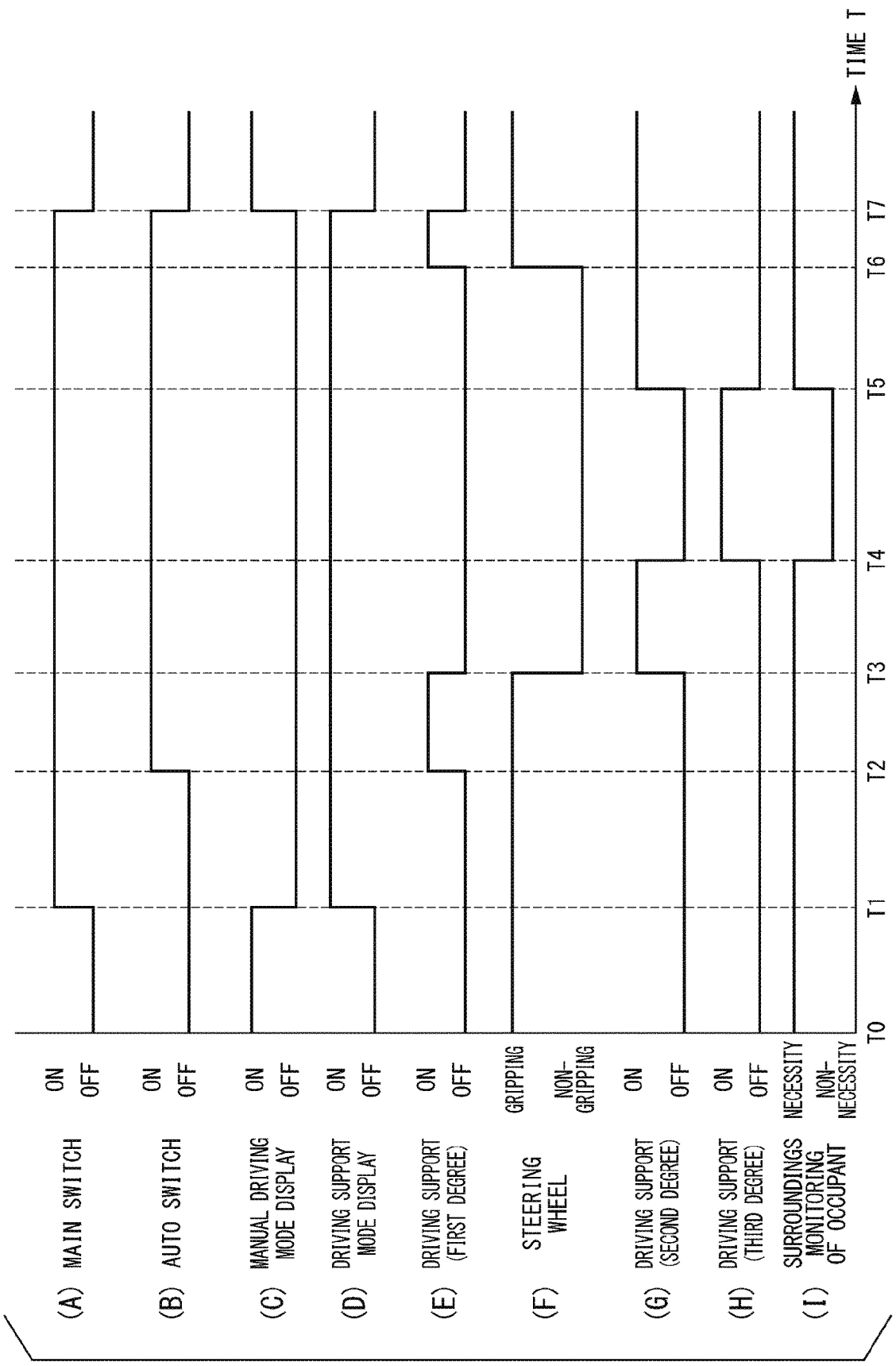
FIG. 37 is a diagram showing switching timings of various types of equipment or control related to the driving support.

Here, switching timings of various types of equipment or control related to the driving support of the host vehicle M will be described with reference to the drawings. FIG. 37 is a diagram showing the switching timings of various types of equipment or the control related to the driving support.

In FIG. 37, switching timings related to a passage of time of (A) on/off of the main switch 412, (B) on/off of the auto switch 414, (C) on/off of the manual driving mode display, (D) on/off of the driving support mode display, (E) on/off of the driving support of the first degree, (F) gripping/non-gripping of the steering wheel 82, (G) on/off of the driving support of the second degree, (H) on/off of the driving support of the third degree, and (I) necessity/non-necessity of the driving monitoring of the occupant are shown with respect to the switching related to the driving support.

At time T0, the host vehicle M is traveling according to the manual driving of the occupant. In this case, the main switch 412 and the auto switch 414 are not operated, and the screens (the first screen IM1 and the second screen IM2) of the manual driving mode are displayed on the first display 450 and the HUD 460. Also, at time T0, the driving support (the first degree to the third degree) for the host vehicle M is not performed and the occupant needs to grip the steering wheel 82 and monitor the surroundings.

At time T1, an operation of turning on the main switch 412 is being executed by the occupant. In this case, the screens (the third screen IM3 and the fourth screen IM4) of the driving support mode are displayed on the first display 450 and the HUD 460. In a state between times T1 and T2, the driving control of the driving support is not performed and manual driving is continued.

At time T2, an operation of turning on the auto switch 414 is being executed by the occupant. In this case, the master controller 100 causes the driving support controller 200 to execute the driving support of the first degree. The HMI controller 120 displays an image showing that the driving support of the second degree is executed when the occupant separates his/her hands from the steering wheel 82 in the driving support mode display.

At time T3, the occupant is separating his/her hands from the steering wheel 82 in a state in which the driving support of the second degree is possible in the host vehicle M. In this case, the switching controller 110 causes the driving support of the second degree by the automated driving controller 300 to be executed from the driving support of the first degree by the driving support controller 200.

At time T4, for example, the driving support of the third degree is executed by the host vehicle M performing the low-speed following travel. In this case, the surroundings monitoring of the occupant is unnecessary.

At time T5, the driving support of the third degree is ended and the driving support is switched to the driving support of the second degree. Therefore, the surroundings monitoring of the occupant is necessary. Also, at the time T5, the display for switching the host vehicle M from the driving support of the second degree to the manual driving is performed. In this case, the HMI controller 120 displays the information for causing the occupant to grip the steering wheel 82 in the driving support mode display.

At time T6, the occupant grips the steering wheel 82. In this case, the switching controller 110 switches the driving support from the driving support of the second degree by the automated driving controller 300 to the driving support of the first degree by the driving support controller 200. Also, the switching controller 110 performs switching to the manual driving when a predetermined period of time has elapsed in the driving support of the first degree.

At time T7, the host vehicle M is switched to the manual driving. In this case, the main switch 412 and the auto switch 414 are switched to an off state in correspondence with a timing when the host vehicle M is switched to manual driving.

Figure 38:
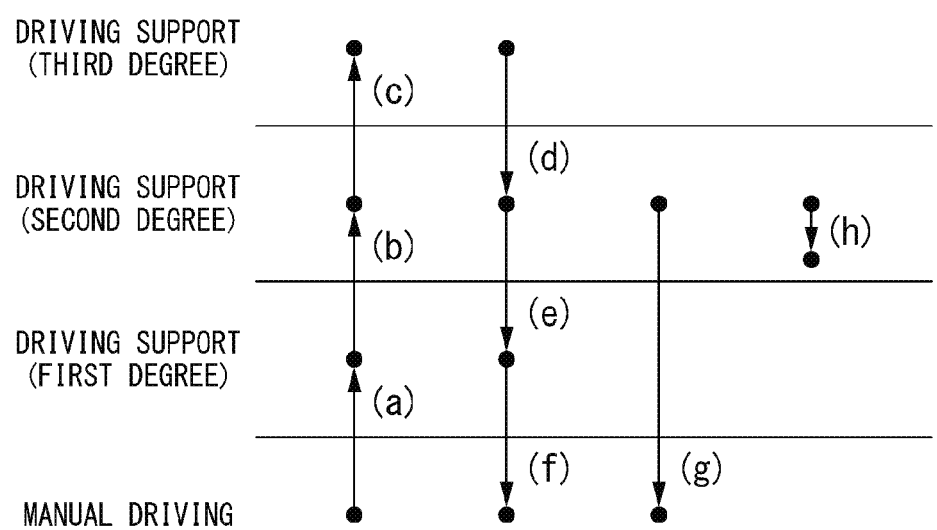
FIG. 38 is a diagram showing switching control of the driving support in the embodiment.

Next, the switching control of the driving support in the embodiment will be described. FIG. 38 is a diagram showing the switching control of the driving support in the embodiment. The driving control of the host vehicle M according to the embodiment includes driving control according to the driving support of the first to third degrees and driving control according to the manual driving of the occupant. For example, the switching controller 110 may switch the driving control in a switching pattern shown in (a) to (h) of FIG. 38 on the basis of a traveling state of the host vehicle M and a state of the occupant.

In the switching pattern (a), the switching controller 110 switches the driving control of the host vehicle M from the manual driving to the driving support of the first degree. In this case, the switching controller 110 causes the driving support controller 200 to execute the driving support of the first degree.

In the switching pattern (b), the switching controller 110 switches the driving control from the driving support of the first degree to the driving support of the second degree. In this case, the switching controller 110 causes the automated driving controller 300 to execute the driving support of the second degree.

In the switching pattern (c), the switching controller 110 performs switching from the driving support of the second degree to the driving support of the third degree. In this case, the switching controller 110 causes the automated driving controller 300 to execute the driving support of the third degree.

In the switching pattern (d), the switching controller 110 performs switching from the driving support of the third degree to the driving support of the second degree. In this case, the switching controller 110 causes the automated driving controller 300 to execute the driving support of the second degree.

In the switching pattern (e), the switching controller 110 performs switching from the driving support of the second degree to the driving support of the first degree. In this case, the switching controller 110 causes the driving support controller 200 to execute the driving support of the first degree.

In the switching pattern (f), the switching controller 110 performs switching from the driving support of the first degree to the manual driving. In this case, the switching controller 110 causes the host vehicle M to execute the driving control by the manual driving.

In the switching pattern (g), when a predetermined event has occurred in the host vehicle M while the driving support of the second degree is executed, the switching controller 110 performs switching from the driving support of the second degree to the manual driving. For example, the predetermined event is a case in which a value received by the automated driving controller 300 is different from a value of a predetermined range assumed in advance, a case in which a signal from other equipment is blocked, or a case in which the transmission of a signal to control target equipment is impossible.

In the switching pattern (h), when the occupant is gripping the steering wheel 82 in a specific scene, the switching controller 110 causes the automated driving controller 300 to continue the driving support of the second degree. For example, the specific scene is a scene in which the host vehicle M travels through a connection path such as an interchange or a junction. The switching controller 110 switches the driving control of the host vehicle M in correspondence with each of the switching patterns.

According to the embodiments described above, the vehicle control system 1 includes an outputter provided in the host vehicle M and configured to output information, a controller configured to execute driving support for the host vehicle M, and an output controller configured to provide a notification for requesting an occupant of the host vehicle M to perform a predetermined action when the driving support is being executed by the controller, cause a form of the notification to be changed so that the notification is emphasized in accordance with a passage of time from a start of the notification, and cause the outputter to output the notification, thereby more appropriately providing a notification of switching from automated driving to manual driving.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

REFERENCE SIGNS LIST

1 Vehicle system
10 Camera
12 Radar device
14 Finder
16 Physical object recognition device
20 Communication device
50 Navigation device
60 MPU
70 Vehicle sensor
80 Driving operation element
90 Vehicle interior camera
100 Master controller
110 Switching controller
120 HMI controller
130 Operation element state determiner
140 Occupant state monitor
140, 200 Driving support controller
300 Automated driving controller
320 First controller
340 Second controller
400 HMI
500 Travel driving force output device
510 Brake device
520 Steering device
M Host vehicle

What is claimed is:

1. A vehicle control system comprising:
a display configured to display an image;
a first processor configured to execute at least a driving support that is capable of being executed without an operation of a steering wheel of a vehicle by a driver for the vehicle; and
a second processor configured to provide a notification for requesting the driver of the vehicle to perform a predetermined action when the driving support is being executed by the first processor, cause a form of the notification to be changed so that the notification is emphasized in accordance with a passage of time from a start of the notification, and cause the display to display the image, wherein the first processor is further configured to cause the vehicle to move from a second lane to a first lane when the vehicle reaches a position at a predetermined distance before the exit in a case in which the vehicle is travelling on the second lane different from the first lane by executing the driving support and end of the driving support is scheduled just before the exit, wherein the road includes the first lane and the second lane, wherein the first lane is connected to the exit and the second lane is not connected to the exit, wherein the second processor is further configured to:
cause the display to display a first image requesting the driver to grip the steering wheel of the vehicle at time after the vehicle had moved from the second lane to the first lane and before the driving support ends, in response to determining that the driving support is about to end, the driving support is still being executed, and the vehicle had moved from the second lane to the first lane,
cause the display to display a second image different from the first image indicating a request for the driver to grip the steering wheel of the vehicle, in response to determining that the driver is not gripping the steering wheel within a first predetermined period of time since the first image was displayed on the display,
cause the display to display a third image indicating the driving support has ended, in response to determining that the driver has not gripped the steering wheel within a second predetermined period of time since the second image was displayed on the display,
cause the display to display a fourth image indicating the vehicle will stop, in response to determining that the driver has not gripped the steering wheel within a third predetermined period of time since the third image was displayed on the display, and
notify the driver of information for requesting to grip the steering wheel, in response to determining that the driving support is about to end and the driving support is still being executed, wherein:
the first image includes a scheduled trajectory along which the vehicle is travelling according to the driving support,
the second image does not include the scheduled trajectory along which the vehicle travels according to the driving support,
the second image includes information requesting the driver to grip the steering wheel of the vehicle, and
the requesting in the second image is emphasized more than the requesting in the first image.

2. The vehicle control system according to claim 1, wherein the second processor is configured to cause the form of the notification to be changed step by step.

3. The vehicle control system according to claim 2, comprising a plurality of displays, wherein the second processor increases a number of displays that display the notification in accordance with progress of a step of the notification.

4. The vehicle control system according to claim 3, wherein the second processor is configured to cause the display to output a notification of a first step in a state in which the image displayed before the notification of the first step is displayed on the display in the notification of the first step of requesting the driver of the vehicle to perform a predetermined action.

5. The vehicle control system according to claim 4, wherein the second processor is configured to cause at least some of details included in the image displayed on the display in the notification of the first step to be omitted in a notification of a second step and cause the display to display the image including details showing the predetermined action required to be performed by the driver.

6. The vehicle control system according to claim 5, wherein the image displayed on the display in the notification of the first step includes details showing the scheduled trajectory along which the vehicle travels according to the driving support, and
wherein the omitted details are the details showing the scheduled trajectory along which the vehicle travels.

7. The vehicle control system according to claim 5, wherein the predetermined action is a state in which the driver grips the steering wheel of the vehicle.

8. The vehicle control system according to claim 4, wherein the predetermined action is a state in which the driver grips the steering wheel of the vehicle.

9. The vehicle control system according to claim 2, wherein the second processor is configured to cause the display to output a notification of a first step in a state in which the image displayed before the notification of the first step is displayed on the display in the notification of the first step of requesting the driver of the vehicle to perform a predetermined action.

10. The vehicle control system according to claim 9, wherein the second processor is configured to cause at least some of details included in the image displayed on the display in the notification of the first step to be omitted in a notification of a second step and cause the display to display the image including details showing the predetermined action required to be performed by the driver.

11. The vehicle control system according to claim 10, wherein the image displayed on the display in the notification of the first step includes details showing the scheduled trajectory along which the vehicle travels according to the driving support, and
wherein the omitted details are the details showing the scheduled trajectory along which the vehicle travels.

12. The vehicle control system according to claim 11, wherein the predetermined action is a state in which the driver grips the steering wheel of the vehicle.

13. The vehicle control system according to claim 10, further comprising a vibrator configured to vibrate a seat of the vehicle or a seat belt for restraining the driver, and
wherein the second processor is configured to cause the vibrator to be operated in a notification of a third step which is a notification after the notification of the second step.

14. The vehicle control system according to claim 10, wherein the predetermined action is a state in which the driver grips the steering wheel of the vehicle.

15. The vehicle control system according to claim 9, wherein the predetermined action is a state in which the driver grips the steering wheel of the vehicle.

16. A vehicle control method using a vehicle control device, the vehicle control method comprising:
- executing at least a driving support that is capable of being executed without an operation of a steering wheel of a vehicle by a driver for the vehicle;
- providing notification for requesting a driver of the vehicle to perform a predetermined action when the driving support is being executed;
- causing a form of the notification to be changed so that the notification is emphasized in accordance with a passage of time from a start of the notification and causing a display to display an image;
- causing the vehicle to move from a second lane to a first lane when the vehicle reaches a position at a predetermined distance before the exit in a case in which the vehicle is travelling on the second lane different from the first lane by executing the driving support and end of the driving support is scheduled just before the exit, wherein the road includes the first lane and the second lane, wherein the first lane is connected to the exit and the second lane is not connected to the exit;
- causing the display to display a first image requesting the driver to grip the steering wheel of the vehicle at time after the vehicle had moved from the second lane to the first lane and before the driving support ends, in response to determining that the driving support is about to end, and the driving support is still being executed, and the vehicle had moved from the second lane to the first lane,
- causing the display to display a second image different from the first image indicating a request for the driver to grip the steering wheel of the vehicle, in response to determining that the driver is not gripping the steering wheel within a first predetermined period of time since the first image was displayed on the display,
- causing the display to display a third image indicating the driving support has ended, in response to determining that the driver has not gripped the steering wheel within a second predetermined period of time since the second image was displayed on the display;
- causing the display to display a fourth image indicating the vehicle will stop, in response to determining that the driver has not gripped the steering wheel within a third predetermined period of time since the third image was displayed on the display, and
- notifying the driver of information for requesting to grip the steering wheel, in response to determining that the driving support is about to end and the driving support is still being executed, wherein:
  - the first image includes a scheduled trajectory along which the vehicle is travelling according to the driving support,
  - the second image does not include the scheduled trajectory along which the vehicle travels according to the driving support,
  - the second image includes information requesting the driver to grip the steering wheel of the vehicle, and
  - the requesting in the second image is emphasized more than the requesting in the first image.

* * * * *